(12) United States Patent
Van Egmond

(10) Patent No.: US 12,091,150 B2
(45) Date of Patent: Sep. 17, 2024

(54) LOW-DENSITY STRUCTURED MATERIALS AND METHODS OF MAKING AND USING SAME

(71) Applicant: Jan Willem Van Egmond, Charleston, WV (US)

(72) Inventor: Jan Willem Van Egmond, Charleston, WV (US)

(*) Notice: Subject to any disclaimer, the term of this patent is extended or adjusted under 35 U.S.C. 154(b) by 158 days.

(21) Appl. No.: 17/920,982

(22) PCT Filed: Apr. 21, 2021

(86) PCT No.: PCT/US2021/028380
§ 371 (c)(1),
(2) Date: Oct. 24, 2022

(87) PCT Pub. No.: WO2021/216695
PCT Pub. Date: Oct. 28, 2021

(65) Prior Publication Data
US 2023/0141407 A1    May 11, 2023

Related U.S. Application Data

(60) Provisional application No. 63/137,148, filed on Jan. 14, 2021, provisional application No. 63/014,094, filed on Apr. 22, 2020.

(51) Int. Cl.
*B64B 1/08* (2006.01)
*B64C 1/08* (2006.01)
(Continued)

(52) U.S. Cl.
CPC ............ *B64C 1/08* (2013.01); *B64B 1/08* (2013.01); *E04B 1/3211* (2013.01); *F17C 1/00* (2013.01);
(Continued)

(58) Field of Classification Search
CPC ..... B64C 1/08; B64B 1/06; B64B 1/08; B64B 1/16; E04B 1/3211; F17C 2201/0128;
(Continued)

(56) References Cited

U.S. PATENT DOCUMENTS 5,110,070 A * 5/1992 Hagenlocher ............ B64B 1/24
244/30
5,906,530 A * 5/1999 Lindsey ............... A63H 33/048
446/221

(Continued)

FOREIGN PATENT DOCUMENTS

EP       3480106 A1    10/2018
WO    2021216695 A1   10/2021

OTHER PUBLICATIONS

"Desert Domes—Dome Formulas" (available on the Desert Dome website domain at "desertdomes.com/formula.html" circa Jul. 4, 2019) ("Dome Formulas").

(Continued)

*Primary Examiner* — Tye William Abell
(74) *Attorney, Agent, or Firm* — Dickinson Wright PLLC; Ross Spencer Garsson

(57) ABSTRACT

A low-density structured material with good mechanical stability that can be used for three-dimensional structures, and methods to make and use same. In embodiments, the low-density structured material includes a first surface of interconnected polyhedrons, a plurality of tetrahedral arrangements whose base is the polyhedrons of the first surface, a second surface that is a web attached to the tetrahedral vertices of the tetrahedral arrangements, and panel materials overlying the web. The low-density structured material can be utilized in a variety of different structures.

28 Claims, 66 Drawing Sheets

(51) Int. Cl.
*E04B 1/32* (2006.01)
*F17C 1/00* (2006.01)

(52) U.S. Cl.
CPC .................... *F17C 2201/0128* (2013.01); *F17C 2201/054* (2013.01); *F17C 2201/056* (2013.01); *F17C 2203/012* (2013.01); *F17C 2223/0123* (2013.01); *F17C 2223/033* (2013.01)

(58) Field of Classification Search
CPC .......... F17C 2201/054; F17C 2201/056; F17C 2203/012
See application file for complete search history.

(56) References Cited

U.S. PATENT DOCUMENTS

| | | | | |
|---|---|---|---|---|
| 6,056,240 | A * | 5/2000 | Hagenlocher | E04C 3/28 244/125 |
| 6,418,673 | B1 * | 7/2002 | Flowerday | E04B 1/3211 52/81.1 |
| 9,266,597 | B1 * | 2/2016 | Pasternak | B64B 1/08 |
| 9,828,081 | B1 * | 11/2017 | DeVaul | B64B 1/44 |
| 10,625,842 | B2 * | 4/2020 | Rapport | B64B 1/14 |
| 10,843,783 | B1 * | 11/2020 | Cranston | B64B 1/16 |
| 2007/0001053 | A1 * | 1/2007 | Akhmeteli | B64B 1/58 244/125 |
| 2010/0192506 | A1 * | 8/2010 | Allred, III | F16B 11/008 403/205 |
| 2011/0052845 | A1 * | 3/2011 | Dermond | B64F 5/10 156/185 |
| 2015/0037766 | A1 * | 2/2015 | Schein | G09B 25/04 434/211 |
| 2017/0021907 | A1 * | 1/2017 | Rapport | B64B 1/14 |
| 2018/0207726 | A1 * | 7/2018 | Robrecht | B33Y 80/00 |
| 2019/0390454 | A1 * | 12/2019 | Kalenak | E04B 1/3211 |
| 2021/0197946 | A1 * | 7/2021 | Brin | F16B 7/044 |

OTHER PUBLICATIONS

Hardin, D.P., et al., "A Comparison of Popular Point Configurations on S2," Solomites Research Notes on Approximation, 2016, vol. 9, 16-49 ("Hardin 2016").

Wikipedia webpage for "Geodesic Polyhedron" (available on the Wikipedia website domain at "en.wikipedia.org/wiki/Geodesic_polyhedron" circa Mar. 22, 2020) ("Geodesic Polyhedron Wikipedia Page").

Wikipedia webpage for "Goldberg Polyhedron" (available on the Wikipedia website domain at "en.wikipedia.org/wiki/Goldberg_polyhedron" circa Mar. 22, 2020) ("Goldberg Polyhedron Wikipedia Page").

Wikipedia webpage for "List of geodesic polyhedra and Goldberg polyhedra—Wikipedia" (available on the Wikipedia website domain at "en.wikipedia.org/wiki/List_of_geodesic_polyhedra_and_Goldberg_polyhedra#Icosahedral" circa Oct. 6, 2019) ("List of Geodesic Polyhedra and Goldberg Polyhedra Wikipedia Page").

Wikipedia webpage for "Vacuum Airship" (available on the Wikipedia website domain at "en.wikipedia.org/wiki/Vacuum_airship" (circa Mar. 19, 2019 ("Vacuum Airship Wikipedia Page").

International Searching Authority, International Search Report and Written Opinion for PCT/US2021/028380, dated Jul. 21, 2021; 10 pages.

International Searching Authority, International Preliminary Report on Patentability for PCT/US2021/028380, dated Oct. 25, 2022; 8 pages.

* cited by examiner

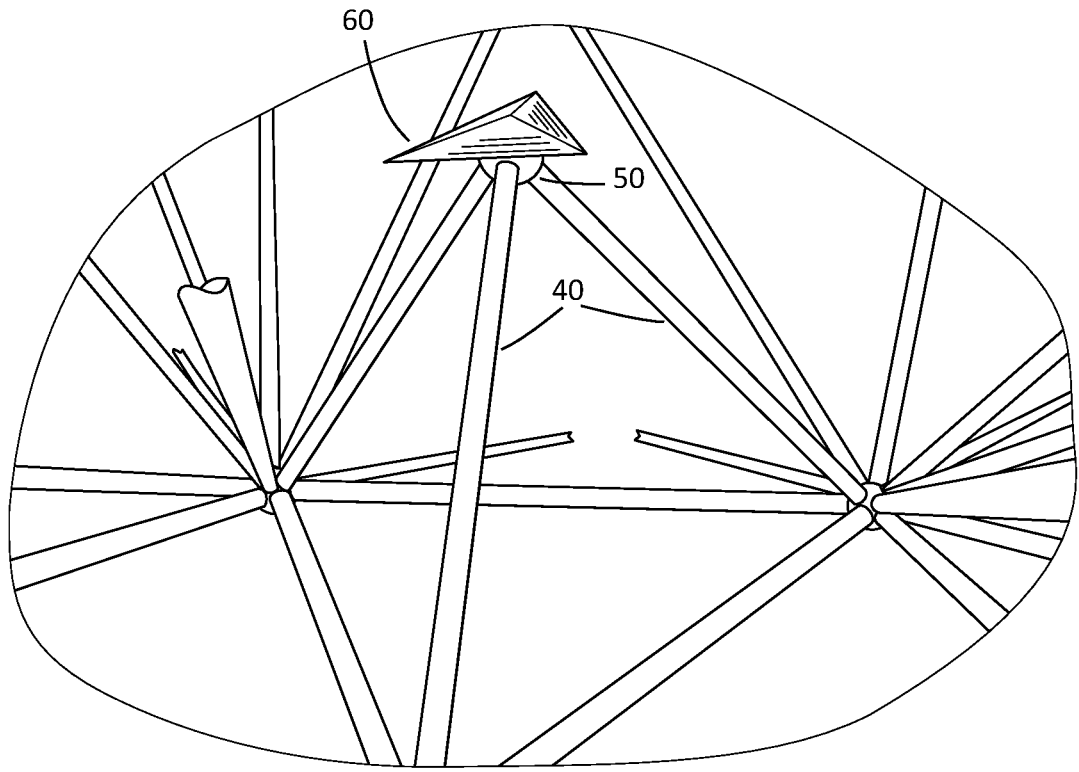
Fig. 3A
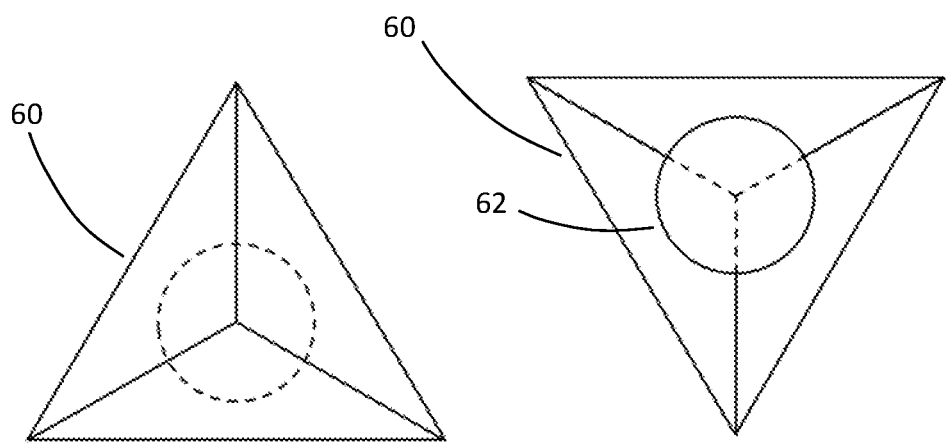
Fig. 3B
Fig. 3C

| b | c | T | Inner Polyhedron Faces | Inner Polyhedron Symbol | Inner Polyhedron Image | Outer Polyhedron Faces | Outer Polyhedron Symbol | Outer Polyhedron Image | Total Number of Struts |
|---|---|---|---|---|---|---|---|---|---|
| 1 | 0 | 1 | 20 | {3,5+}(1,0) | | 12 | {5+,3}(1,0) | | 90 |
| 1 | 1 | 3 | 60 | {3,5+}(1,1) | | 32 | {5+,3}(1,1) | | 270 |
| 2 | 0 | 4 | 80 | {3,5+}(2,0) | | 42 | {5+,3}(2,0) | | 360 |
| 2 | 1 | 7 | 140 | {3,5+}(2,1) | | 72 | {5+,3}2,1 | | 630 |
| 3 | 0 | 9 | 180 | {3,5+}(3,0) | | 92 | {5+,3}3,0 | | 810 |
| 2 | 2 | 12 | 240 | {3,5+}(2,2) | | 122 | {5+,3}2,2 | | 1080 |
| 3 | 1 | 13 | 260 | {3,5+}(3,1) | | 132 | {5+,3}3,1 | | 1170 |
| 4 | 0 | 16 | 320 | {3,5+}(4,0) | | 162 | {5+,3}4,0 | | 1440 |

Fig. 10

LOW-DENSITY STRUCTURED MATERIALS AND METHODS OF MAKING AND USING SAME

RELATED PATENTS/PATENT APPLICATIONS

This application is a 35 U.S.C § 371 national application of PCT Application No. PCT/US2021/028380, filed on Apr. 21, 2021, entitled "Low-Density Structured Materials And Methods Of Making And Using Same," which claims priority to U.S. Patent Appl. Ser. No. 63/014,094, filed Apr. 22, 2020, and U.S. Patent Appl. Ser. No. 63/137,148, filed Jan. 14, 2021, which are each entitled "Low Density Structure." These patent applications are commonly owned by the owner of the present invention and are hereby incorporated herein by reference in their entirety for all purposes.

TECHNICAL FIELD

The present invention relates to low-density structured materials and methods of making and using same.

BACKGROUND

Advanced materials that enable substantial reduction in system weight provide significant enhancements in performance and function. For instance, the import of low-density structured materials is illustrated in structures like those which could be used for a vacuum balloon. The vacuum balloon was proposed by Francesco Lana de Terzi in 1670 as a thin rigid shell that is evacuated to achieve positive buoyancy. For a long time, it was envisioned that this would become the primary means of flight. Because of the load exerted by atmospheric pressure, the shell material of the vacuum balloon would need sufficient strength against compressive failure. However, although materials with such strength exist, thin shells under pressure fail by buckling before the material undergoes compressive failure. Therefore, the material making up the shell would require sufficient stiffness to avoid shell buckling and low enough density to achieve positive buoyancy. However, no homogeneous material exists with sufficiently high stiffness to be able to manufacture a homogeneous thin shell that avoids buckling while having low enough density to achieve sufficient buoyancy required for positive lift.

A recent proposal is a vacuum balloon provided by a rigid exoskeleton made of struts over which an envelope of skin is stretched. See DeVaul '083 Patent. However, the structure seems to have similar mechanical stability issues as a thin shell.

Akhmeteli and Gavrilin proposed a shell made up of a honeycomb core between two thin solid layers. See Akhmeteli '053 Application. Examples of the types of materials needed for this to work are listed as diamond-like carbon, boron, and beryllium.

While the vacuum balloon is an example of a three-dimensional structure that benefits by an improved low-density structured material, the need for such low-density structured materials extends well beyond vacuum balloons. The need remains for a low-density structured material that can be utilized in a myriad of structures and applications, including to perform light-weight and stiff structures of all shapes and sizes. The need further remains for a simple light-weight structure material that is conducive to modular components and is flexible/modifiable during and after construction.

SUMMARY OF THE INVENTION

The present invention relates to low-density structured materials that can be used to make three-dimensional objects of all shapes and sizes. The present invention further relates to methods of making the low-density structured materials and using such low-density structured materials in three-dimensional objects.

In some embodiments, the present invention is a stiff, low density, three-dimensional structure made of interconnected struts and enveloped or partially enveloped by a skin. If desired, to further lower density (or weight), the air within the enveloped structure can be removed. The resulting structure can then be used to take advantage of the low density/high strength properties, such as in, for example, a vacuum balloon to provide buoyancy for a variety of purposes.

In some embodiments, the struts can be arranged in such a way that they define the edges of a polyhedron, referred to as the inner polyhedron, that includes triangular faces. As used herein, a "polyhedron" is a set of polygons each of which has at least one common edge and at least two common vertices with another polygon in the set. The inner polyhedron can describe a surface that encloses a volume or one that does not enclose a volume. The inner polyhedron can be a surface that has one or more holes (areas where there are no faces) in it. The struts can be connected at their ends by means of hubs or connectors located at the vertices of the inner polyhedron. Each triangular strut arrangement of the inner polyhedron can be the base of an outward pointing tetrahedron of struts connected at a vertex. In some embodiments, the triangular arrangements of the inner polyhedron are the bases of inward pointing tetrahedra. In some embodiments, the tetrahedra are on both sides of the surface of triangular faces of the inner polyhedron. The vertices of the tetrahedrons are then interconnected. In some embodiments, caps of high tensile material can be attached to the vertices of the tetrahedra. The caps can be connected to neighboring caps by means of a web of tape.

A skin of sheet material can be attached to the web to envelope or partially envelope the structure. The skin of sheet material can be applied piece-wise in panels. The panels can take on different shapes. In some embodiments, the panels are arranged in a tri-axial pattern around each vertex. In some embodiments the panels are arranged so as to describe a tri-axial kagome weave. The tri-axial pattern can be achieved by attaching panels of skin piece-wise. In some embodiments, the holes in the tri-axial pattern are closed by means including attaching further panels.

In some embodiments air can be pumped out of the structure to achieve buoyancy that is equal to the weight of the air removed from the structure. When the buoyancy is greater than the weight of the structure, lift is achieved. While removing the air can further decrease the density of the low-density structured material, even without the removal of air, low density materials of the present invention, retain advantages over higher density structure materials.

In some embodiments, the structure is filled with a fluid. The fluid can be pressurized. These embodiments can be used as light weight pressure tanks.

Embodiments of the present invention further include design formulas and a method of using these formulas to determine the geometry and size of low-density structured materials, such as vacuum balloons and other objects, which low-density structured materials can provide lift for a desired weight given a certain strut composition and geometry.

Embodiments of the present invention further include low-density structured materials that include an assemblage of a multitude of struts interconnected at their ends in tetrahedral arrangements, where the set of outward pointing vertices of the interconnected struts defines the surface of a finite volume. Such low-density structured materials further include a multitude of connector members, which can include hubs, each having a means for attachment to the ends of a plurality of struts, thereby interconnecting the struts. The low-density structured materials further include lengths of material, such as tape, for interconnecting neighbors in the set of outward pointing vertices that defines the surface. The low-density structured materials (and the structures made from such materials) are light and stiff.

Various embodiments of low-density structured material and methods of making same can provide some or all of the following advantages:

The structure is stabilized against buckling

The low-density structured material can be made from off-the shelf materials, which can be used for the struts, hubs, caps, skin, etc..

The structure can have an increased lifting efficiency (such as, for example, the vacuum balloon can have increased lifting efficiency with an increase of size).

Embodiments of the present invention can be used for a range of purposes. Some example applications using the low-density structured material may include the following:

(1) As a vacuum balloon. Vacuum balloons can be used for personal transportation, public transportation, airborne package delivery, floating platforms, surveillance, exploration, arranged in a network for aerial cell-phone transmitters and the like.

(2) Part of an aircraft fuselage, wing, body, frame, etc.

(3) Part of an architectural structure (floors, walls, pillars, structure, roof, outer cladding)

(4) As part of a fixed structure such as a tower, a stadium, a tunnel cladding, spans/decking of a bridge, and the like.

(5) As a pressure vessel, fuel tank, etc.

(6) A frame structure for a machine, a robot, a lift, etc.

(7) A body panel, part of a frame, door, roof, floor of an automobile, train, bus, tram, etc.

(8) A marine structure, for example body, hull, frame, deck, partition, etc. of a ship, submarine, yacht, etc.

(9) A body of a rocket.

(10) As part of personal protective gear, part of a helmet.

(11) In sports equipment.

(12) A part of a space craft structure.

(13) A blast, ballistic, shock, impact resistant structure.

(14) As prosthetic and graft implants.

(15) The structure can be used in a heat exchanger, with fluid flowing through the structure.

(16) As part of three-dimensional artwork, such as a sculpture.

Embodiments provide for a method of determining the geometric arrangement, number and length of struts.

In general, in one aspect, the invention features a structured material. The structured material includes a first surface including a plurality of first surface struts that are interconnected in a first polyhedron form including a plurality of first surface polygon faces. The structured material further includes a plurality of tetrahedral struts that are interconnected to the first surface to form a plurality of tetrahedral arrangements each having a base and a tetrahedral vertex. For each tetrahedral arrangement in the plurality of tetrahedral arrangements, the base of the tetrahedral arrangement includes a first surface polygon face in the plurality of first surface polygon faces, and the tetrahedral vertex is positioned apart from the first surface polygon face of the tetrahedral arrangement. The structured material further includes a second surface. The second surface includes a web having a plurality of second surface materials. Each second surface material in the plurality of second surface materials is attached to at least two tetrahedral vertices in the plurality of tetrahedral vertices. The web is in a form of a second polyhedron including a plurality of second surface polygon faces. Each second surface polygon face in the plurality of second surface polygon faces includes a plurality of second surface polygon vertices. The first surface and the second surface are interconnected and separated by the plurality of tetrahedral arrangements. The second surface further includes a plurality of panel materials. Each panel material in the plurality of panel materials is attached to the web of the second surface.

Implementations of the invention can include one or more of the following features:

The first surface struts can each have a first end and a second end. The first surface polygon faces in the plurality of first surface polygon faces can have edges that are the first surface struts interconnected at the first ends and the second ends. The first surface polygons faces can have at least three first surface vertices. The first surface vertices can be interconnected by at least two of the first surface struts at one of the first end or second end of each of the at least two first surface struts.

The structured material can further include a plurality of connectors for interconnecting the struts.

The connectors can be hubs.

The hubs can be 3d printed hubs.

The connectors can include a plurality of first surface hubs, wherein the first surface hubs are positioned at the first surface vertices.

The first surface hubs can be 3D printed hubs.

The shape of the first surface can be a spherical polyhedron.

The spherical polyhedron can have a symmetry selected from a group consisting of icosahedral, octahedral and tetrahedral.

The tetrahedral struts of the tetrahedral arrangement can each have a first end and a second end. The first surface vertices of the polygon face can be interconnected to one of the tetrahedral struts of the tetrahedral arrangement at the first end of the tetrahedral strut. The second ends of the tetrahedral struts can be interconnected at the tetrahedral vertex of the tetrahedral arrangement.

The structured material can further include a skin that surrounds the structured material. The skin can seal the structured material.

The skin can be a plurality of skin panel materials attached to seal the structured material.

The plurality of skin materials can be in a three-way weave pattern.

The structured material can further include one or more openings in the skin to permit a gas to be introduced or removed from the structured material.

The pressure inside the structured material can be less than atmospheric pressure.

The absolute pressure inside the structured material can be at or near zero.

The structured material can be buoyant.

The pressure inside the structured material can be greater than atmospheric pressure.

The skin can include a high tensile strength material.

The high tensile strength material can be selected from a group consisting of polymeric materials, composite materials, ceramics, glass materials, metallic materials, and combinations thereof.

The high tensile strength material can be selected from a group consisting of polyesters, biaxially-oriented polyethylene terephthalate, aromatic polyamides, poly-paraphenylene terephthalamide, and combinations thereof.

The tetrahedral vertices can be faced outward from the base of the tetrahedral arrangement in the structured material.

The tetrahedral vertices can be faced inward from the base of the tetrahedral arrangement in the structured material.

The plurality of panel materials can be attached to the second surface polyhedron in a piece-wise kagome weave pattern.

A first subset of the plurality of panel materials can be in left-handed chiral direction around the second surface polygon vertices and a second subset of the plurality of panel materials can be in a right-handed chiral direction around the second surface polygon vertices.

The each of the panels in the plurality of panels is overlapping at least one other panel in the plurality of panels.

The structured material can be in a substantially spherical shape.

The structured material can be in a substantially cylindrical shape.

The structured material is in a free-form shape.

The structured material can be in a shape having a plurality of branched volumes.

The plurality of first surface polygon faces can include at least two first surface polygon faces having a different number of edges.

The plurality of second surface polygon faces can include polygon faces selected from a group consisting of polygon faces having 3 to 10 edges and combinations thereof.

The plurality of first surface struts and the plurality of tetrahedral struts can be tubular struts.

The first surface struts can have a diameter greater than the diameter of the tetrahedral struts.

The plurality of first surface struts and the plurality of tetrahedral struts can include struts of substantially the same length.

The first surface struts in the plurality of first surface struts can have an average strut length. The first surface struts in the plurality of first surface struts can have a length that is less than 110% of the average strut length.

The plurality of first surface struts and the plurality of tetrahedral struts can include a strut material selected from a group consisting of composite materials, metallic materials, polymeric materials, and combinations thereof.

The strut material can be selected from a group consisting of carbon fiber composite, carbon nanofiber composite, steel, aluminum, and combinations thereof.

The second surface materials can be adhesive materials.

The structured material can further include a third surface. The first surface can be between the second surface and the third surface. The first surface and the third surface are interconnected and separated by a plurality of additional tetrahedral arrangements. The plurality of additional tetrahedral arrangements can include a plurality of additional tetrahedral struts that are interconnected to the first surface to form the plurality of additional tetrahedral arrangements. For each additional tetrahedral arrangement in the plurality of additional tetrahedral arrangements, the base of the additional tetrahedral arrangement can include one of the first surface polygon faces in the plurality of the first surface polygon faces, and the additional tetrahedral arrangement can have an additional tetrahedral vertex that is positioned apart from the first surface polygon face of the additional tetrahedral arrangement.

The third surface can include an additional web having a plurality of third surface materials. Each third surface material in the plurality of third surface materials can be attached to at least two additional tetrahedral vertices in the plurality of additional tetrahedral vertices. The additional web can be in a form of a third polyhedron including a plurality of third surface polygon faces. Each third surface polygon face in the plurality of third surface polygon faces can include a plurality of third surface polygon vertices.

The third surface can further include a plurality of additional panel materials. Each additional panel material in the plurality of additional panel materials can be attached to two adjacent third surface polygon vertices of the third surface polygon vertices. Each third surface polygon vertex of the third surface polygons can be connected to at least one adjacent third surface polygon vertex by the additional panel material in the plurality of additional panel materials.

For a majority of tetrahedral arrangements in the plurality of tetrahedral arrangements, the tetrahedral arrangements can be paired in tetrahedral arrangement pairs having a first tetrahedral arrangement and a second tetrahedral arrangement. In each tetrahedral arrangement pair, the first tetrahedral arrangement and the second tetrahedral arrangement can be adjacent, the base of the first tetrahedral arrangement and the base of the second tetrahedral arrangement can share at least one edge, and the tetrahedral vertex of the first tetrahedral arrangement and the tetrahedral vertex of the second tetrahedral arrangement can be at the same position.

Each tetrahedral arrangement pair can have a tetrahedral vertex hub in which the tetrahedral vertex hub is a tetrahedral vertex hub for both the first tetrahedral arrangement and the second tetrahedral arrangement of the tetrahedral arrangement pair.

In general, in another aspect, the invention features a structured material. The structured material includes a first surface including a plurality of first surface polygon plates that are interconnected in a first polyhedron form. Each first surface polygon plate in the plurality of first surface polygon plates has three or more first surface polygon plate edges and an equal number of first surface polygon plate vertices. The structured material further includes a plurality of tetrahedron plates that are interconnected to the first surface to form a plurality of tetrahedral arrangements having a base, at least three sides, and a tetrahedral vertex. For each tetrahedral arrangement in the plurality of tetrahedral arrangements, the base of the tetrahedral arrangement includes a first surface polygon plate in the plurality first surface polygon plates, each of the at least three sides of the tetrahedral arrangements is a tetrahedron triangular plate in the plurality of tetrahedron triangular plates, and the tetrahedral arrangement has a tetrahedral vertex that is positioned apart from the first surface polygon material of the tetrahedral arrangement. The structured material further includes a second surface. The second surface includes a web having a plurality of second surface materials. Each second surface materials in the plurality of second surface materials is attached to at least two tetrahedral vertices in the plurality of tetrahedral vertices. The web is in a form of a second polyhedron including a plurality of second surface polygon faces. Each second surface polygon face in the plurality of second surface polygon faces include a plurality of second surface polygon vertices. The first surface and the second surface are interconnected and separated by the plurality of tetrahedral arrangements. The second surface further includes a plurality of panel materials. Each panel material in the plurality of panel materials is attached to the web of the second surface.

Implementations of the invention can include one or more of the following features:

For each tetrahedral arrangement in the plurality of tetrahedral arrangements, one edge of the tetrahedron plates in the tetrahedral arrangement can be connected to a first surface polygon plate edge from one first surface polygon plate vertex to an adjacent first surface polygon plate vertex, a second edge of the tetrahedron plates in the tetrahedral arrangement can be connected to a second edge of a first adjacent tetrahedron plates from one first surface tetrahedron plate vertex to the tetrahedral vertex, and a third edge of the tetrahedron plates in the tetrahedral arrangement can be connected to a second edge of a second adjacent tetrahedron plates from a second surface tetrahedron plate vertex to the tetrahedral vertex.

In general, in another aspect, the invention features a composite structure material that includes a plurality of structured materials selected from any of the above-described structured materials.

Implementations of the invention can include one or more of the following features:

A first structured material in the plurality of structured materials can have at least one other structure material in the plurality of structured materials packed within.

The first structured material can be in a substantially spherical shape. The at least one other structure material can be in a substantially spherical shape.

In general, in another aspect, the invention features a structure that includes a structured material of any one of the above-described structured materials or a composite structured material of any one of the above-described composite structured materials. The structure is selected from a group consisting vacuum lift aircraft, geodesic domes, light-weight flat decking for roofs and floors in buildings, spans/decking of bridges, free form architecture construction systems, earthquake-resistant constructions, claddings for blast/explosion protection, light-weight panels for cars, trucks, buses, and trains, airplane fuselages and wings, rocket bodies, rocket parts, hulls for a ship, yacht, and submarine, hyperloop tube systems, space telescope parabolic mirror support, lightweight pressure vessels/tanks, spaceship construction system, solar sails, tunnel cladding, helmets/personal protective gear, sports equipment, heat exchangers, prosthetic implants, three-dimensional art, and sculpture.

In general, in another aspect, the invention features a method of forming a structured material. The method includes forming a first surface by interconnecting a plurality of first surface struts to form a plurality of first surface polygon faces. The method further includes interconnecting a plurality of tetrahedral struts to the first surface to form a plurality of tetrahedral arrangements having a base and a tetrahedral vertex. For each tetrahedral arrangement in the plurality of tetrahedral arrangements, the base of the tetrahedral arrangement includes a first surface polygon face in the plurality first surface polygon faces, and the tetrahedral vertex is positioned apart from the first surface polygon face of the tetrahedral arrangement. The method further includes forming a second surface including a web having a plurality of second surface materials and further including a plurality of panel materials. The forming of the second surface includes attaching second surface material in the plurality of second surface materials to at least two tetrahedral vertices in the plurality of tetrahedral vertices. The web is in the shape of a plurality of second surface polygon faces. Each second surface polygon face in the plurality of second surface polygon faces includes a plurality of second surface polygon vertices. The first surface and the second surface are interconnected and separated by the plurality of tetrahedral arrangements. The forming of the second surface further includes attaching a plurality of panel materials to the second surface polygon vertices. The attaching the plurality of panel materials includes attaching each panel material in the plurality of panel materials to the web of the second surface.

Implementations of the invention can include one or more of the following features:

The first surface struts can each have a first end and a second end. The first surface polygon faces in the plurality of first surface polygon faces can have edges that are the first surface struts interconnected at the first ends and the second ends. The first surface polygons faces can have at least three first surface vertices. The first surface vertices can be interconnected by at least two of the first surface struts at one of the first end or second end of each of the at least two first surface struts.

The tetrahedral struts of the tetrahedral arrangement can each have a first end and a second end. The first surface vertices of the polygon face can be interconnected to one of the tetrahedral struts of the tetrahedral arrangement at the first end of the tetrahedral strut. The second ends of the tetrahedral struts can be interconnected at the tetrahedral vertex of the tetrahedral arrangement.

The plurality of panel materials can be attached to the second surface polyhedron in a piece-wise kagome weave pattern.

The method can further include, after the forming of the second surface, removing the first surface, removing the plurality of tetrahedral struts, and removing at least some of the second surface materials of the web.

The structured material can be selected from a group consisting of the above-described structured materials.

BRIEF DESCRIPTION OF THE DRAWINGS

FIG. 3A depicts a partial view of the struts in a tetrahedral arrangement with the hub and cap attached to the outward pointing vertex, in accordance with an embodiment.

FIG. 3B depicts a detail of a cap as seen from above in accordance with an embodiment.

FIG. 3C depicts a cap as seen from below in accordance with an embodiment.

FIG. 10 depicts a partial list of the inner and outer polyhedra when the inner polyhedron is based on the regular icosahedron in accordance of an embodiment

FIG. 24A depicts the inner polyhedron of a stadium roof. FIG. 24B depicts the stadium roof with the tri-axial weave defining the outer polyhedron. FIG. 24C depicts additional panels covering the openings of the tri-axial pattern.

FIG. 26A depicts the inner polyhedron of a tube junction. FIG. 26B depicts the outer struts attached to the inner polyhedron. FIG. 26C depicts the tube junction with the tri-axial weave defining the outer polyhedron. FIG. 26D depicts additional panels covering the openings and overlapping the panels of the tri-axial pattern. FIG. 26E is a partial view of the inside of the tube junction.

FIG. 27A depicts the inner polyhedron of a part of a tube. FIG. 26B depicts the outer struts attached to the inner polyhedron. FIG. 27C depicts the tube junction with overlapping panels defining the outer polyhedron. FIG. 27D depicts additional panels covering the openings and overlapping the panels of the tri-axial pattern. FIG. 27E is a partial view of the inside of the hyperloop tube as it enters a curve.

DETAILED DESCRIPTION OF THE INVENTION

The present invention relates to low-density structured materials and methods of making and using same.

The low-density structured materials can be utilized in a range of light-weight and stiff structures that can take on a myriad of different shapes. The low-density structured materials integrate load-carrying and cladding properties, with a cladding layer that can have barrier and structure capabilities. The range of purposes include as at least a portion of a vacuum balloon, or a portion of a body of vehicle, such as an airplane fuselage, a wing, lightweight pressure vessels, sports equipment, cladding for blast protection, as part of an architectural structure, etc. Vacuum balloons can be used for public and personal airborne transportation, airborne cargo transportation, package delivery, exploration, for an aerial network of cell phone transmitters, etc.

To illustrate the low-density structured materials, the methods of making such materials, and its potential uses thereof, embodiments that can be used as a vacuum balloon will first be discussed and described. Such disclosure and teachings are representative of other applications of the low-density structured materials of the present invention.

Vacuum Balloon

The present invention of low-density structured materials are stiff, light structure materials that can be used as a vacuum balloon. For instance, in an embodiment, the structure can be made of several levels of struts interconnected at their ends. For the inner level, the struts are arranged in such a way that they define a polyhedron with triangular faces. The polyhedron can approximate a sphere or some other shape, it can be concave or convex, symmetrical or non-symmetrical. This polyhedron is referred to as the "inner polyhedron," and the struts making it up are referred to as the "inner struts."

Figure 1:
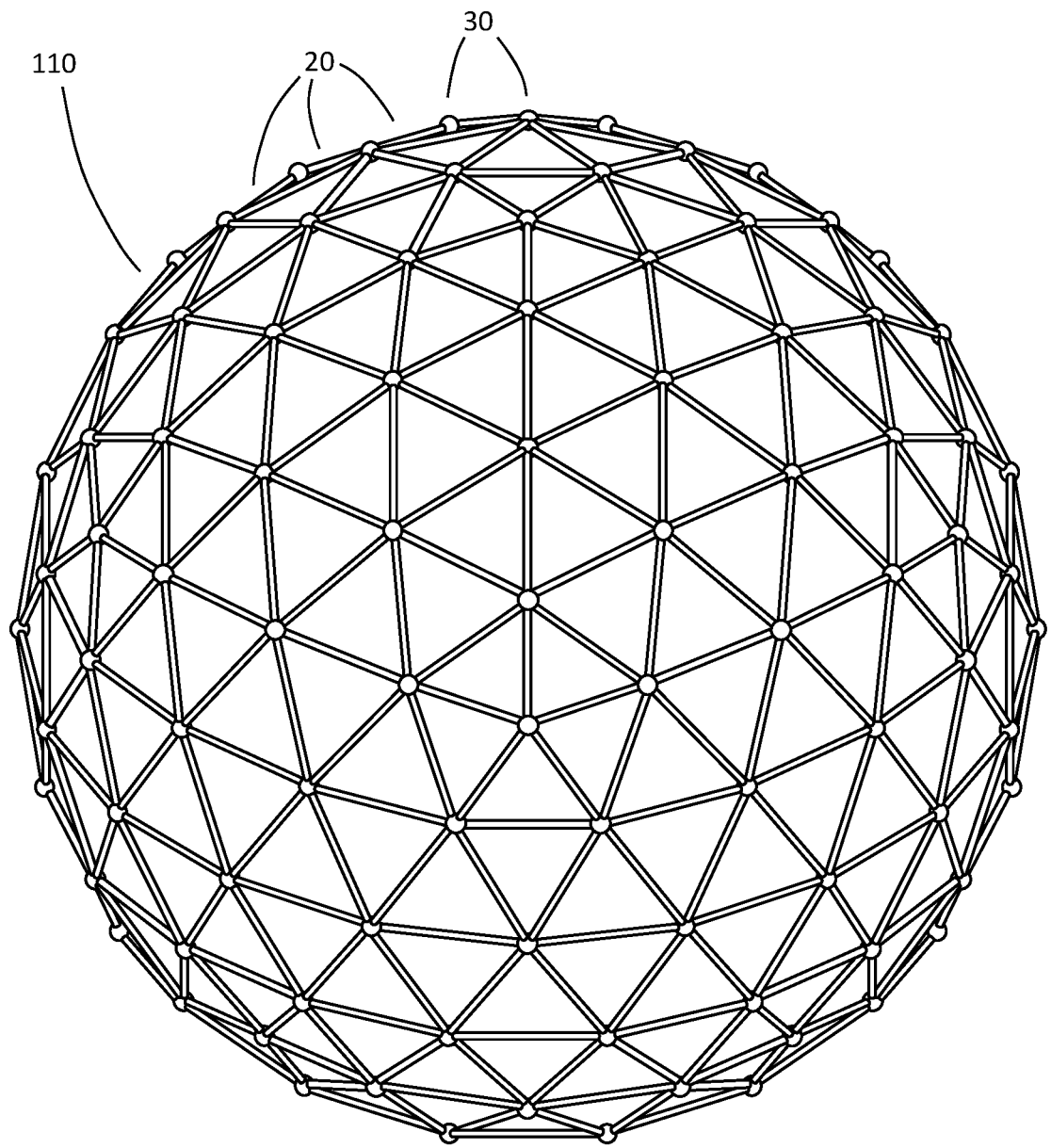
FIG. 1 depicts the inner polyhedron with the inner struts in triangular arrangements in accordance with an embodiment.

Referring to the figures, FIG. 1 shows an embodiment of the inner polyhedron 110 that has triangular faces and approximates a sphere. The inner struts 20 are interconnected in triangular arrangements that correspond to the faces of the inner polyhedron. In an embodiment, struts 20 are connected to each other at their ends by means including hubs 30, each hub having a plurality of means of attachment to the ends of the struts.

Figure 2:
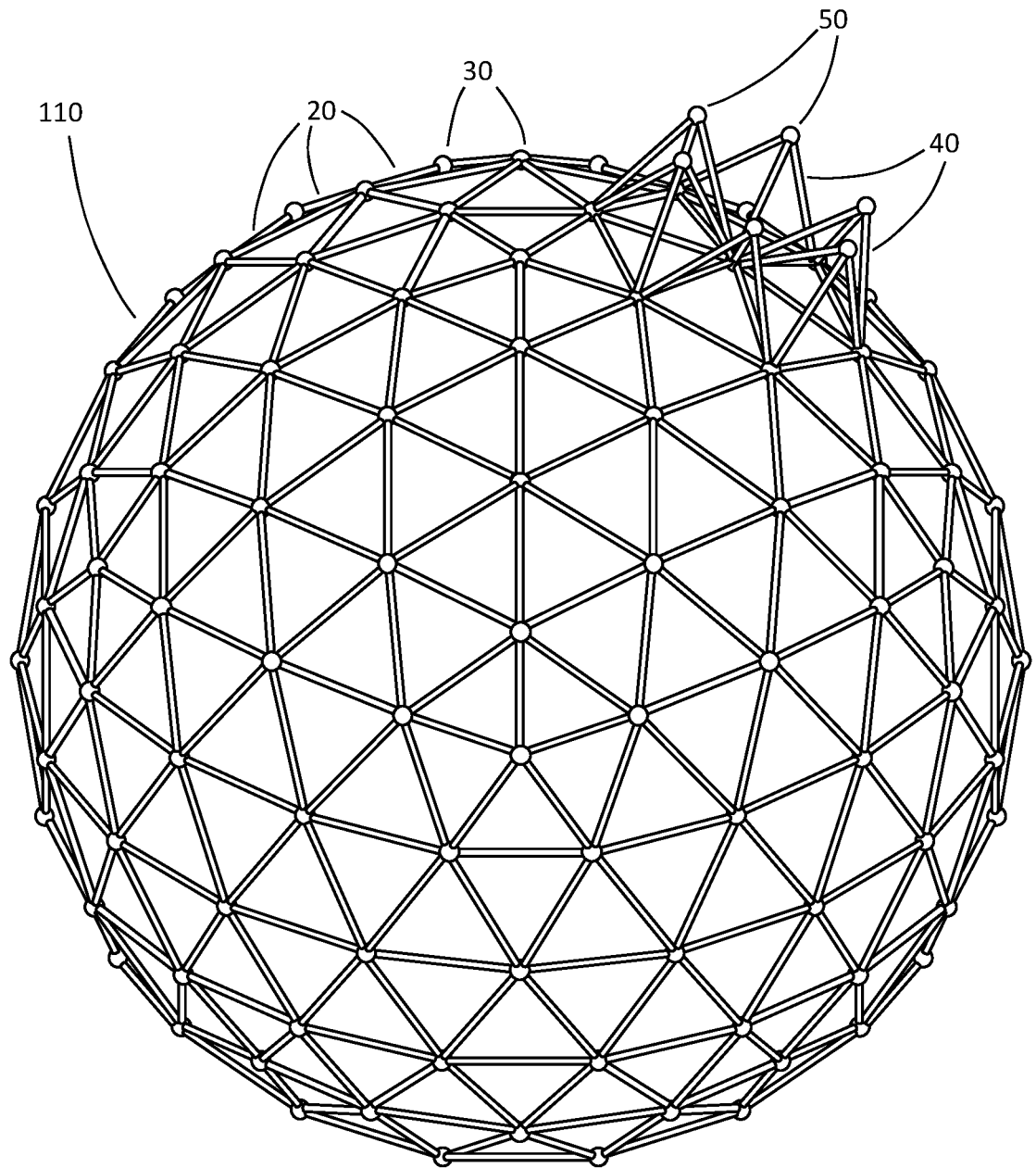
FIG. 2 depicts several of the outer struts connected in tetrahedral arrangements to the inner polyhedron of FIG. 1 in accordance with an embodiment.

A second level of structure comprises struts 40 connected at each vertex of the inner polyhedron 110 and pointing outward from the surface of the inner polyhedron as shown in FIG. 2. These outward pointing struts are referred to as "outer struts" in order to differentiate them from the inner struts. The outer struts 40 complete the tetrahedral arrangements that are attached to the triangular faces of the inner polyhedron. Each triangular face forms the base of a tetrahedron that is oriented outwards from the inner polyhedron. Outer struts 40 are connected at their ends to hubs 50 to form the outward pointing vertex of each tetrahedron.

In FIG. 2, a group of six of the tetrahedra is shown. It can be appreciated from the drawing how the entire surface of the inner polyhedron can be covered by outward pointing tetrahedra. In an embodiment, the vertices of the outer polyhedron are located on a line radially projected outwards from the center of the inner polyhedron through the center of the corresponding triangular face of the inner polyhedron onto the surface of another, concentric sphere. These outward pointing vertices define the vertices of the outer polyhedron.

Figure 3D:
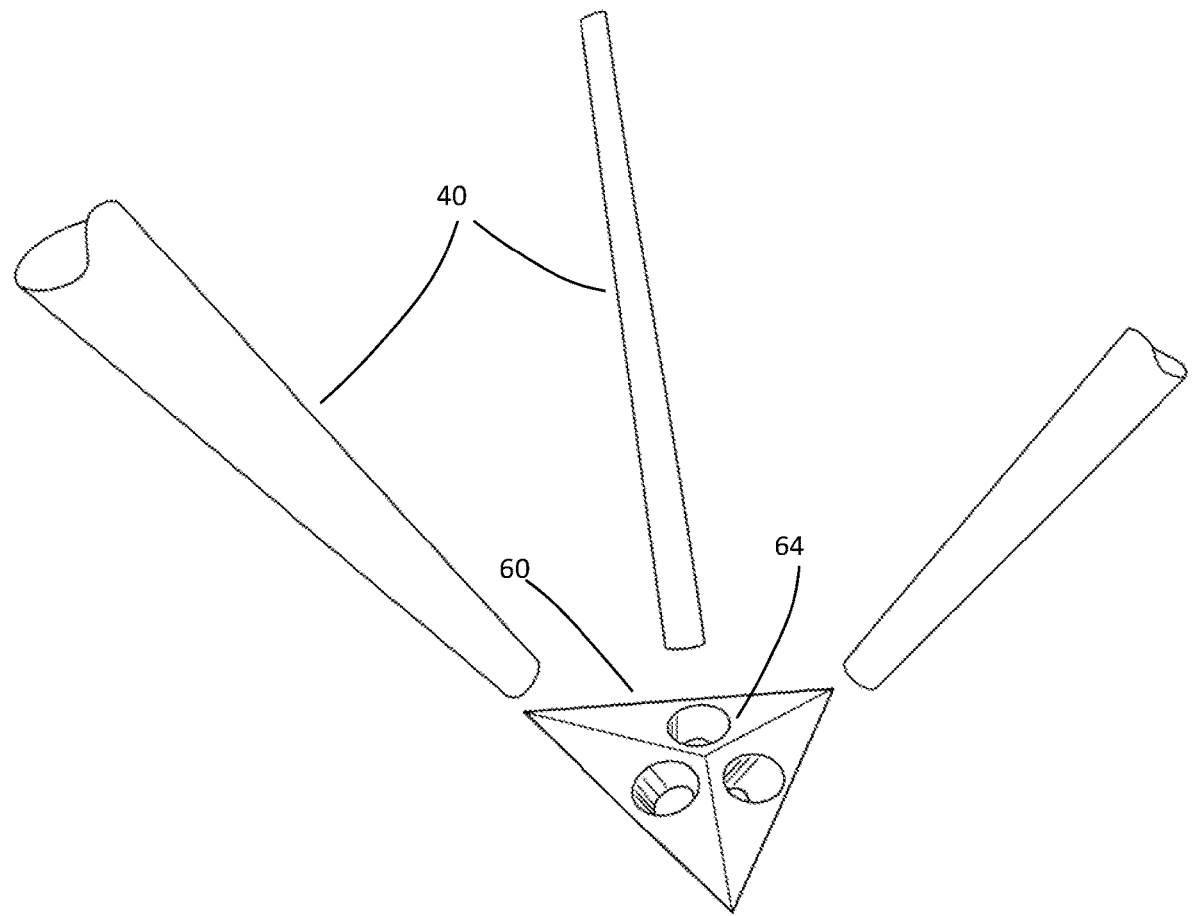
FIG. 3D depicts a view of a cap with three slots where the outer struts attach in accordance with an embodiment.

A cap is attached to the hub at the vertex of each tetrahedron. A detail of an embodiment of one of the caps 60 attached to the vertex of one of the tetrahedra is shown in FIG. 3A. In an embodiment, the shape of the cap is that of a shallow tetrahedron. In an embodiment, the hub has a hemispherical top and the underside of the cap 60 has a rounded depression 62 of the same shape as shown in FIGS. 3B-3C. This allows the connector and the cap to fit together. In another embodiment, the cap has three slots 64 on its underside into which the struts 40 are attached without a connector, as shown in FIG. 3D. As can be appreciated these are but a few of the embodiments for attaching the outer struts to the cap.

Figure 4:
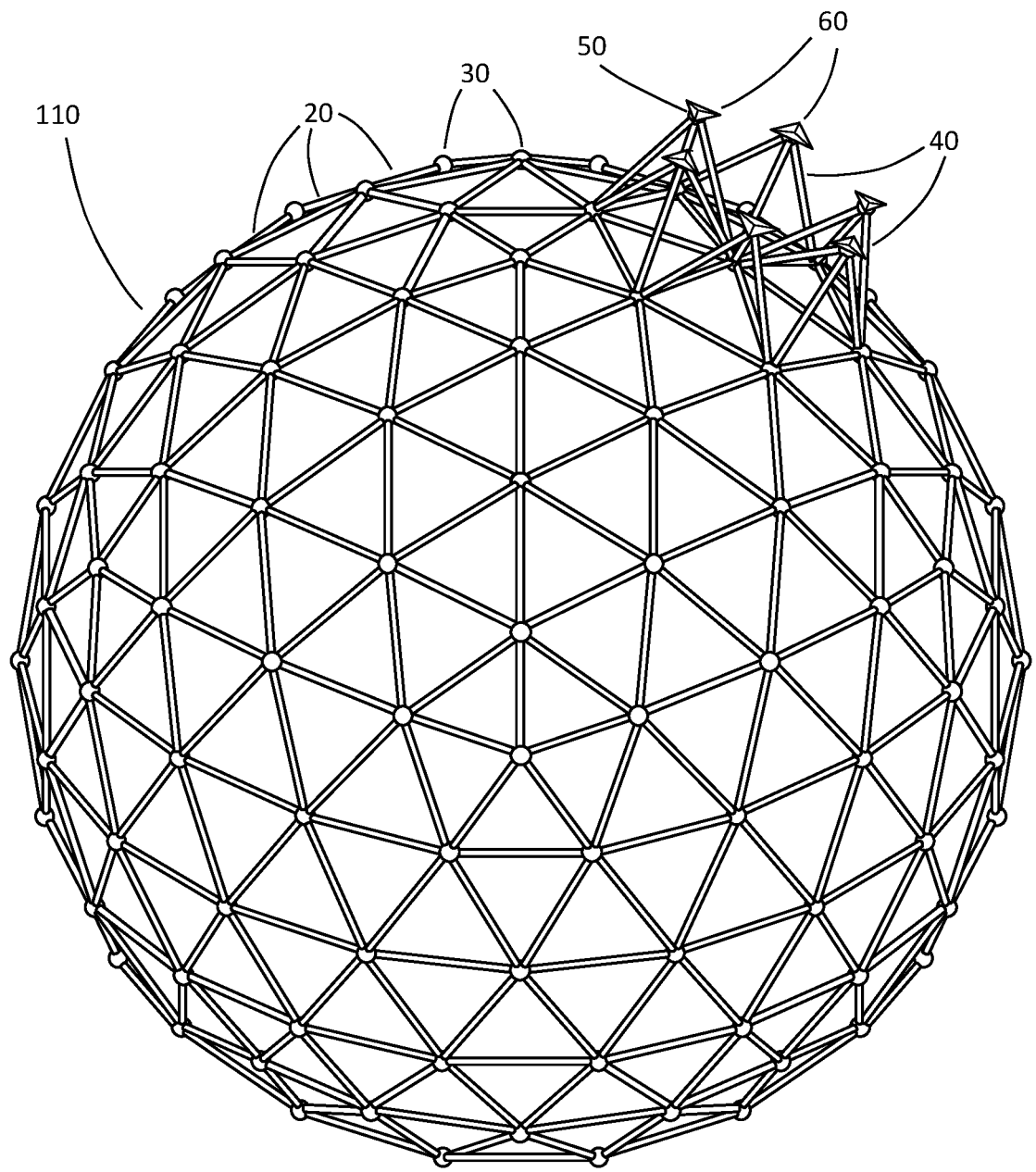
FIG. 4 depicts a view of caps attached at the outward pointing vertices of the tetrahedrons in accordance with an embodiment.

FIG. 4 shows the outer struts 40 from FIG. 2 with caps 60 attached to hubs 50. In the same manner as shown in FIG. 4, each hub of the inner polyhedron is attached to outer struts 40 that form tetrahedra with outer struts from neighboring hubs and meeting at vertices with caps attached.

Figure 5A:
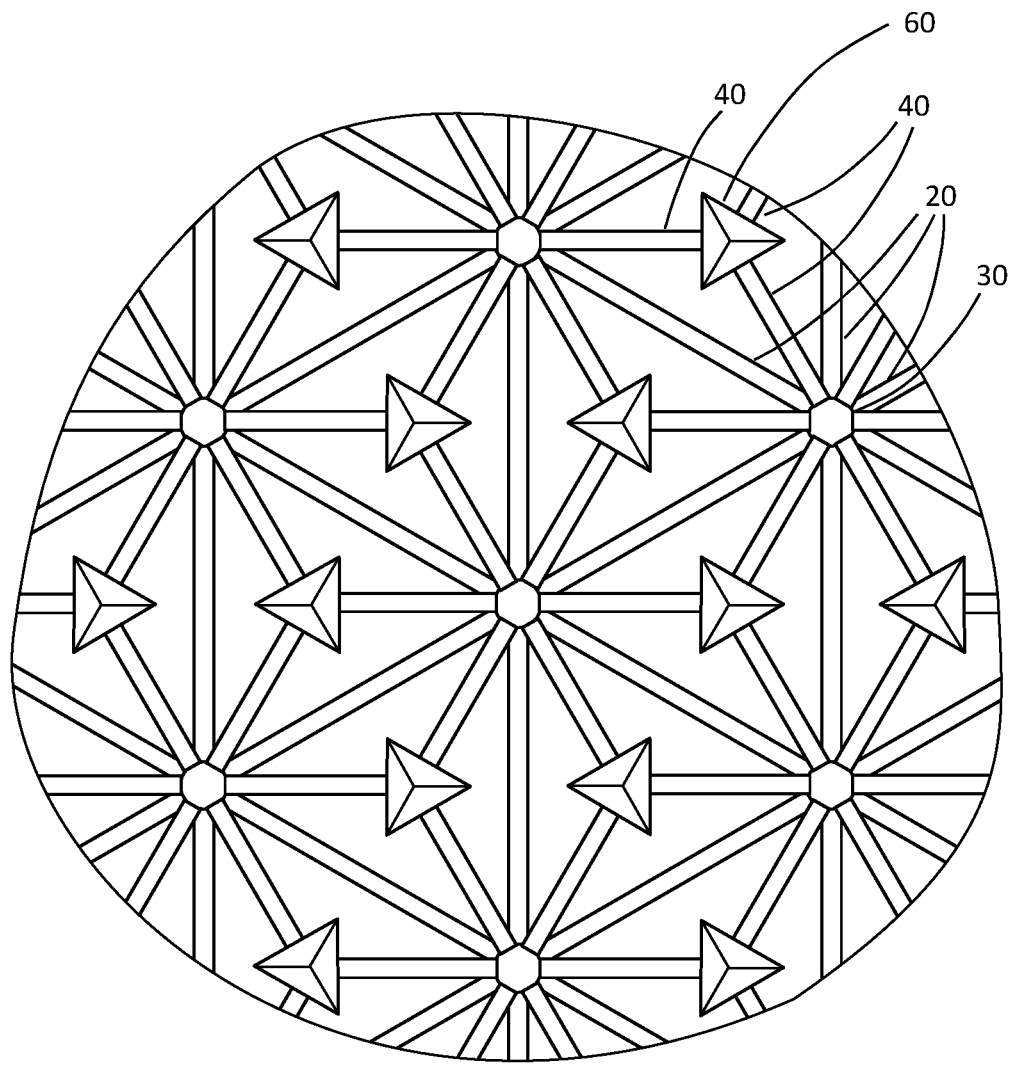
FIG. 5A depicts a partial view of the inner polyhedron with caps attached to the outer struts in accordance with an embodiment.

FIG. 5A is a partial view of the inner polyhedron from above, showing outer struts 40 and caps 60. Each cap 60 is positioned so that the top edges of the triangular faces of the cap point towards the three nearest neighboring caps. Inner struts 20 and hubs 30 are also shown.

Figure 5B:
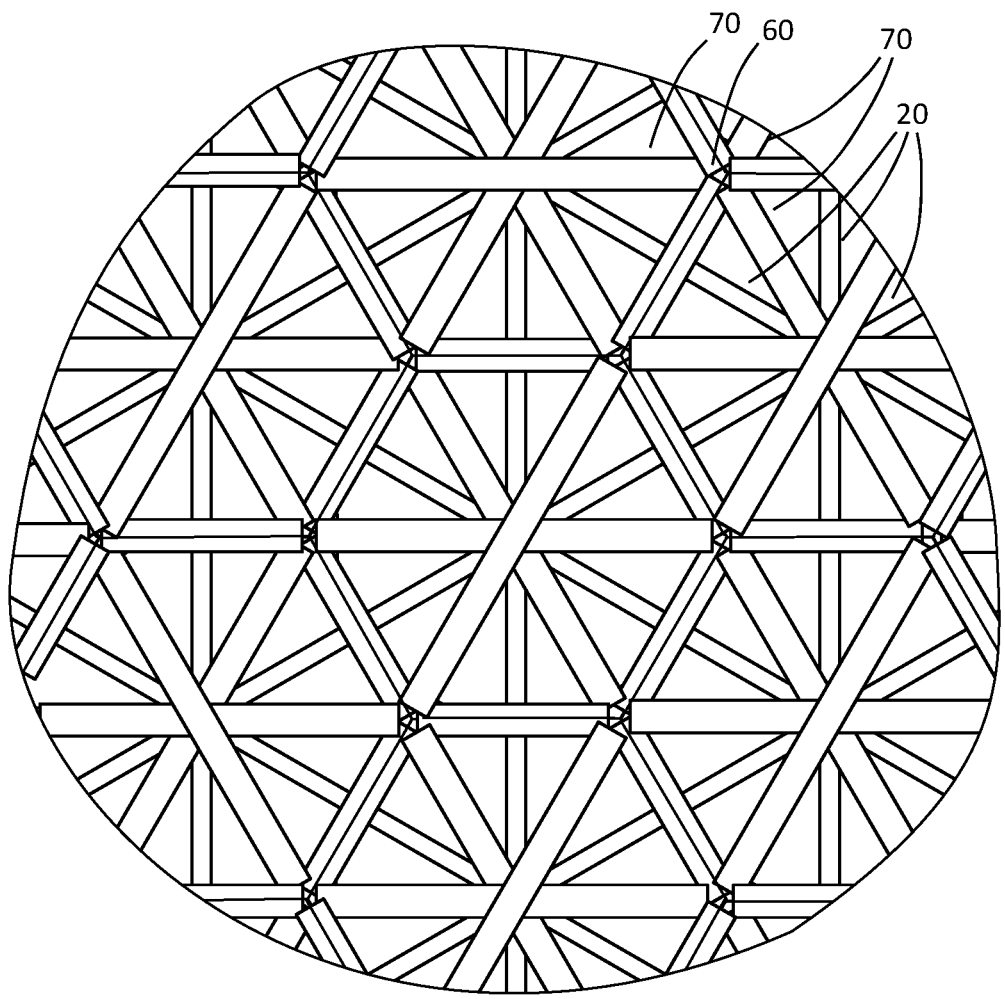
FIG. 5B depicts a partial view of the inner polyhedron and outer struts with the web of tape attached to the caps in accordance with an embodiment.

Caps 60 are connected to nearest neighbors by means of lengths of tape 70 as shown in FIG. 5B. Other means can also be used to connect nearest neighboring vertices, selected from a group including wire, sheets of stiff material, and panels of skin. Lengths of tape 70 define the edges and surface of a polygon. In the case of FIG. 5B the polygon is a hexagon but it can also be a pentagon, a triangle, a square, a heptagon, an octagon, a nonagon or some other shape. The polygons do not need to be flat and can have vertices that are not in the same plane. The type of polygon depends on how many inner struts 20 meet at the hub of the inner polyhedron underlying the polygon. In the embodiment shown in FIG. 5B, six inner struts 20 meet at a vertex and the polygon defined by the web of tape above it is a hexagon. For vertices of the inner polyhedron, where five inner struts meet, the polygon defined by the web of tape is a pentagon. The number of edges of the polygon above each inner polyhedron vertex is equal to the number of inner struts meeting at that vertex.

As can be appreciated, when the caps are interconnected, a web of tape envelopes the inner polyhedron. The shape of this web defines the faces and edges of an outer polyhedron. The vertices of the outward pointing tetrahedra define the vertices of this outer polyhedron. The dihedral angles between the faces of the cap 60 are the same as the dihedral angles between the faces of the outer polyhedron. The tape can be under some tension thus defining the surfaces and edges of the outer polyhedron while at the same time stabilizing the structure. In an embodiment, the outer polyhedron is a spherical polyhedron.

Figure 5C:
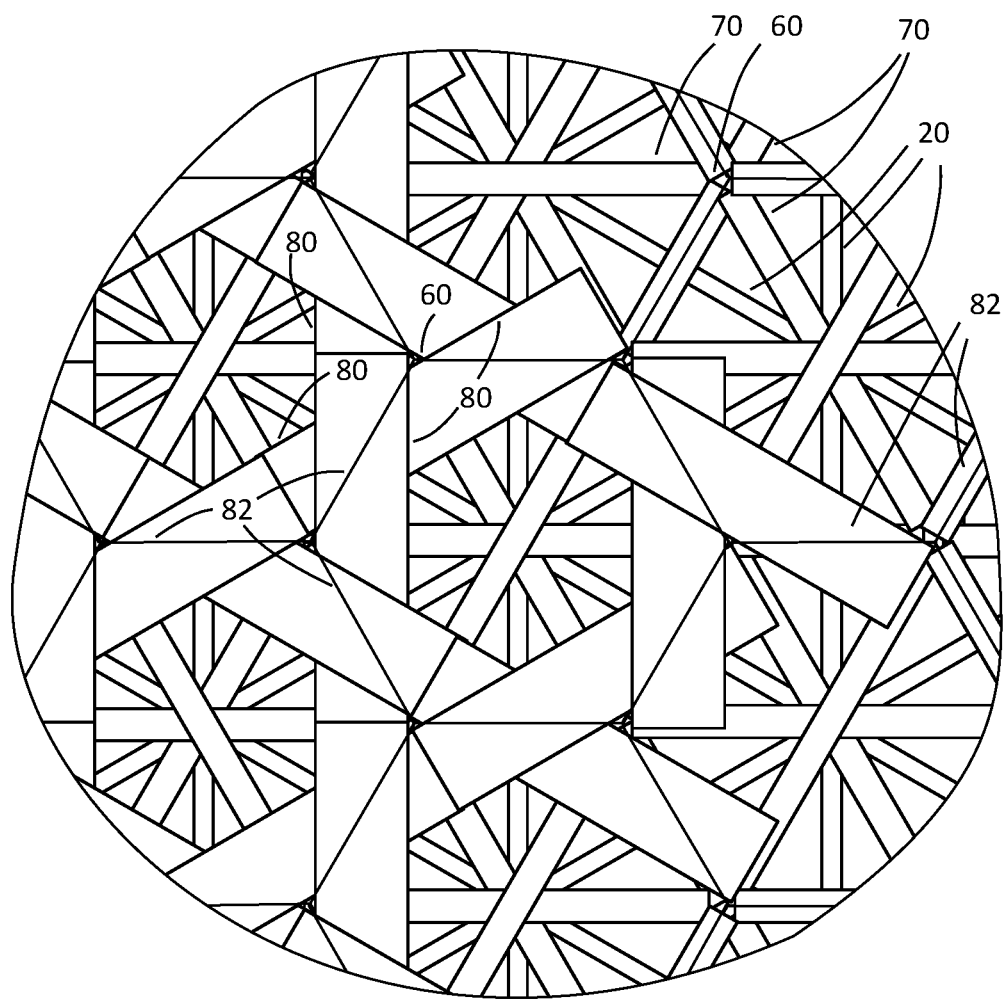
FIG. 5C depicts a partial view of the strips of skin material attached to the web of tape in the three-way pattern in accordance with an embodiment.

Strips of a skin panel material 80 are attached to the web of tape as shown in FIG. 5C. The skin material is a thin, high tensile strength film material and can be attached by adhesive or some other means. The strips are approximately rectangular in shape. The strips are attached to the web of tape so as to extend diagonally over the edges of the faces of the outer polyhedron. In an embodiment, the strips are sections of adhesive tape. The edges 82 of the faces of the outer polyhedron are indicated by the thin lines.

In an embodiment shown in FIG. 5C, the strips of skin material are attached in a three-way weave pattern around each of the caps 60 so as to avoid seams that run along the edges of the outer polyhedron. This pattern is advantageous because it means that there is a double layer of skin material near the vertices and edges of the outer polyhedron where a high concentration of stress develops when the skin is under load.

In some embodiments that pattern is a triaxial pattern (such as a kagome weave). For a given outer polyhedron, a plurality of adhesive strips sections are placed in a first chiral direction (either a right handed chirality or a left handed chirality). For instance, in the embodiment shown in FIG. 5C, there are three panel sections that have been placed with a left-handed chirality around outer polyhedron vertices (that is with the thumb of the left hand pointing outward from the outer polyhedron, the fingers point along the long axis of the panels). A second set of three panel sections is then attached with a right-handed chirality around the vertices. As can be appreciated the panel strips could also have been placed in a right-handed chirality first and then overlayed with the left-handed panels.

Figure 5D:
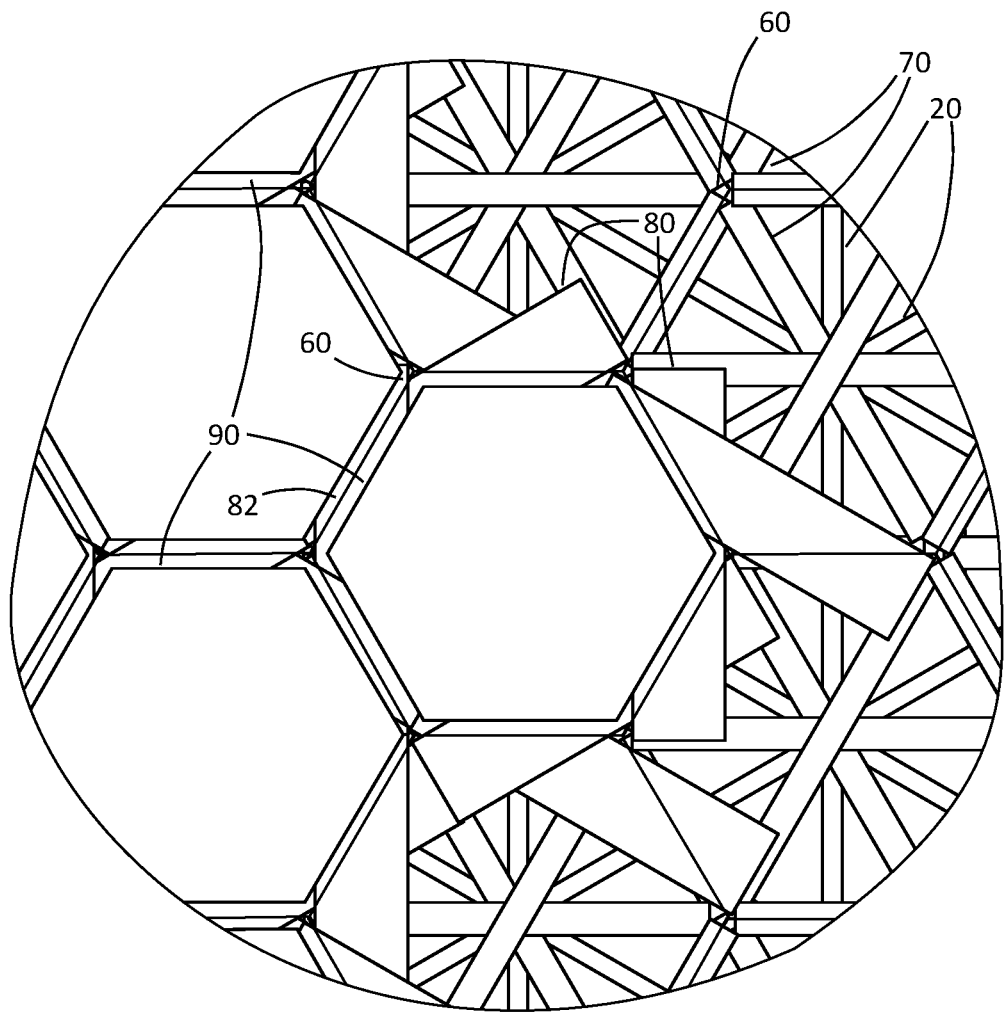
FIG. 5D depicts a partial view of the panels of skin material attached to the strips arranged in the three-way pattern in accordance with an embodiment.

Panels 90 of skin material are attached to strips of skin material 80 to close openings left by the three-way weave pattern above each vertex of the inner polyhedron as shown in FIG. 5D. Repeating this for each opening results in the outer polyhedron enclosed by strips 80 and panels 90 of skin material.

Figure 5E:
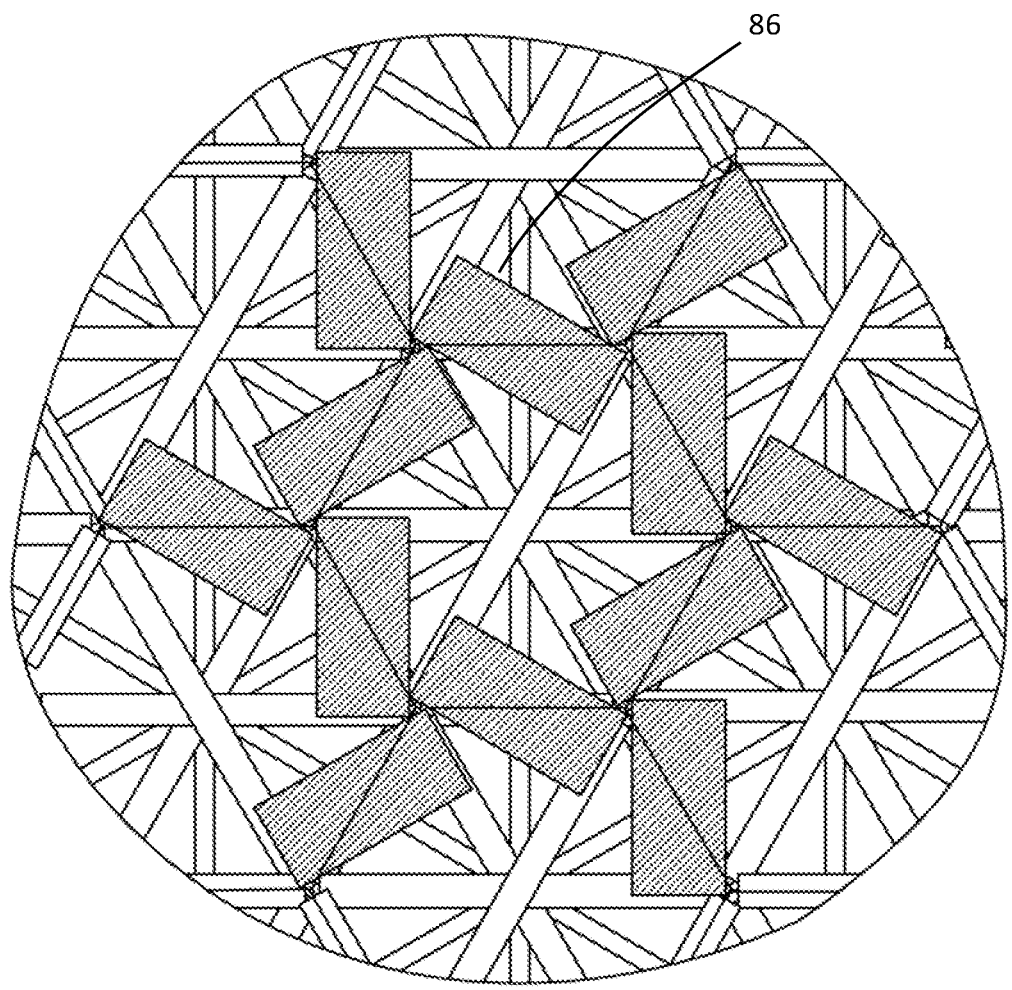
FIG. 5E depicts a partial view of a portion of the rectangular strips attached to the web of tape and arranged in a left-handed (clockwise) manner around each vertex.
Figure 5F:
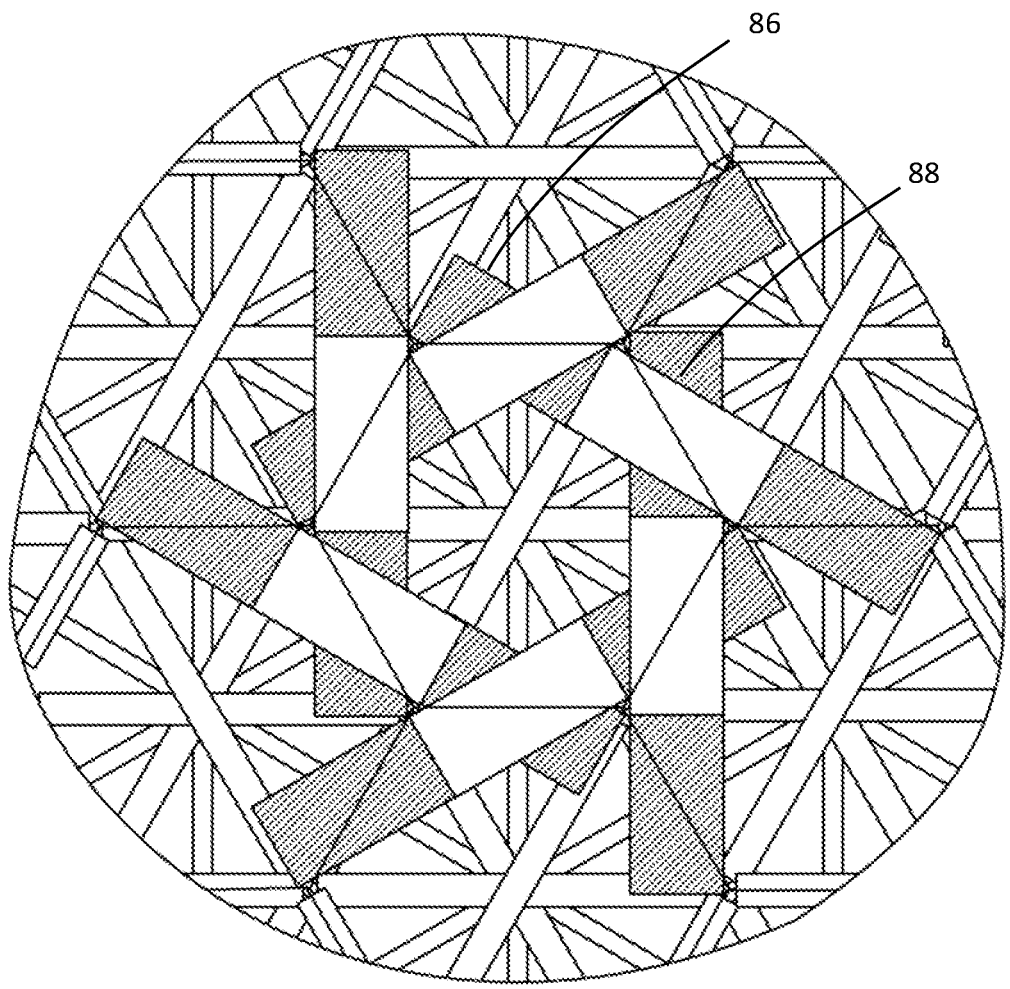
FIG. 5F depicts a partial view of a portion of the rectangular strips attached to the web of tape and to the left-handed strips and arranged in a right-handed (counter-clockwise) manner around each vertex.
Figure 5G:
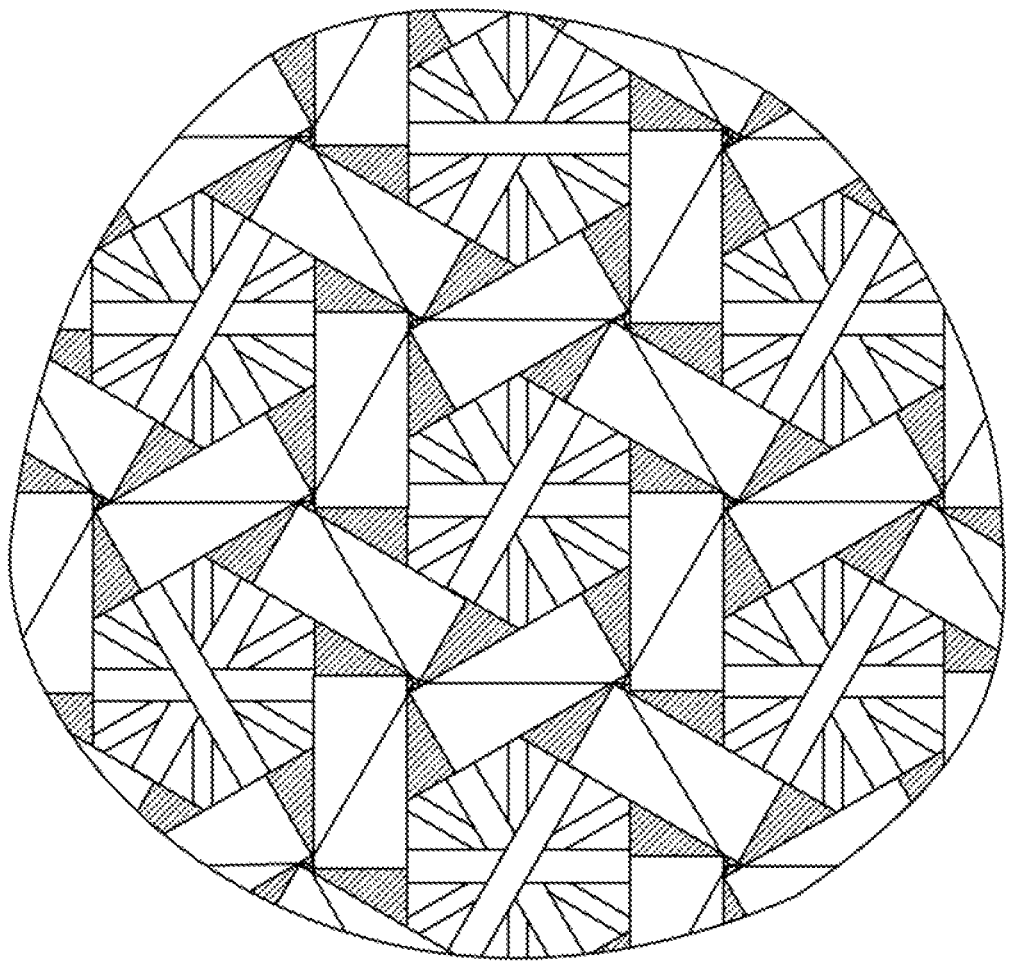
FIG. 5G depicts a partial view of the rectangular strips attached to the web of tape and left-handed strips and arranged in a right-handed (counter-clockwise) manner around each vertex, thus forming a tri-axial kagome weave pattern.
Figure 5H:
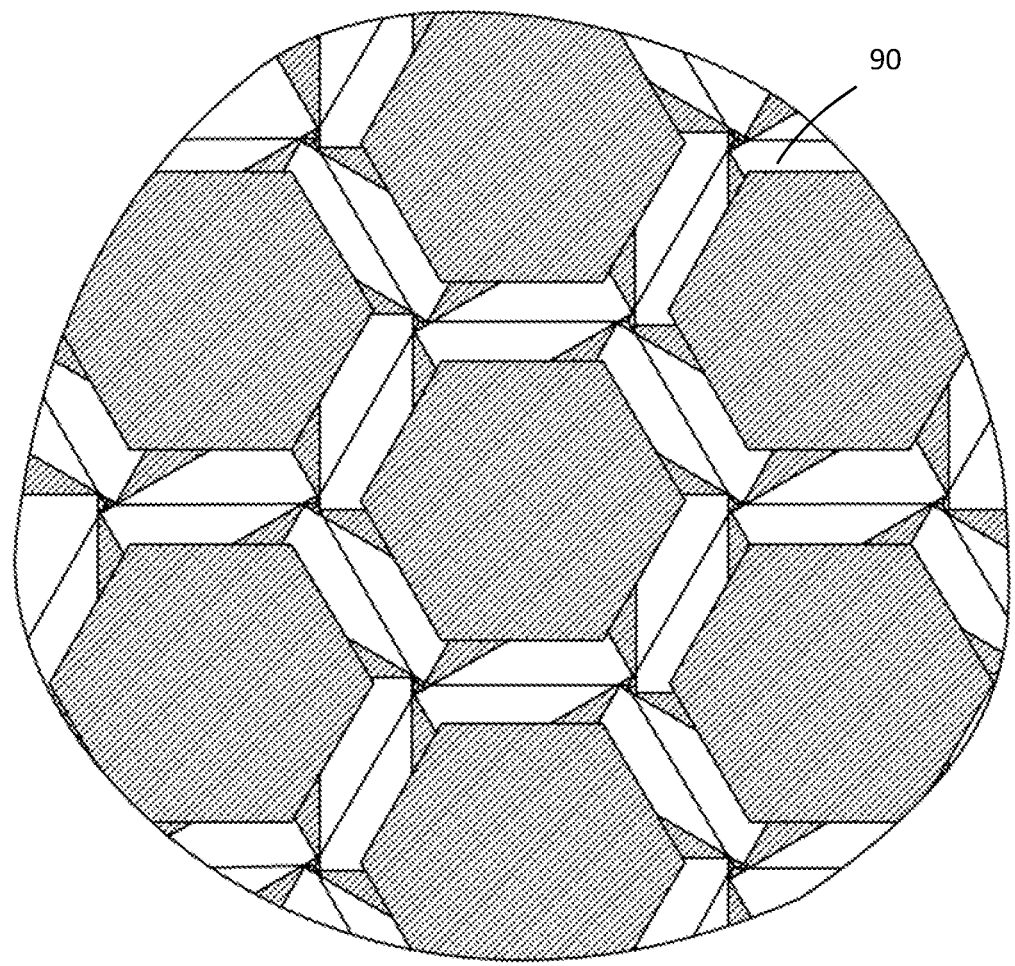
FIG. 5H depicts a partial view of rectangular strips arranged in a tri-axial kagome weave pattern with panels of skin closing off the holes in each face.

In additional to as shown in FIGS. 5C, there are a variety of other methods of attaching the skin panel strips to the web of tape. One such additional/alternative method is shown in FIGS. 5E-5H to attach three panels around each outer polyhedron vertex. FIG. 5E depicts a partial view of a portion of the rectangular panels 86 attached to the web of tape and arranged in a left-handed (clockwise) manner around vertices. Further panels 88 are then attached in the opposite (counter-clockwise) direction around vertices as depicted in FIG. 5F. FIG. 5G depicts a partial view of the rectangular strips attached to the web of tape in a left-handed manner overlayed by the right-handed (counter-clockwise) panels around each vertex, thus forming a tri-axial kagome weave pattern in a piece-wise manner. The holes in the weave pattern are closed off by attaching further panels 90, See FIG. 5H.

Figure 6:
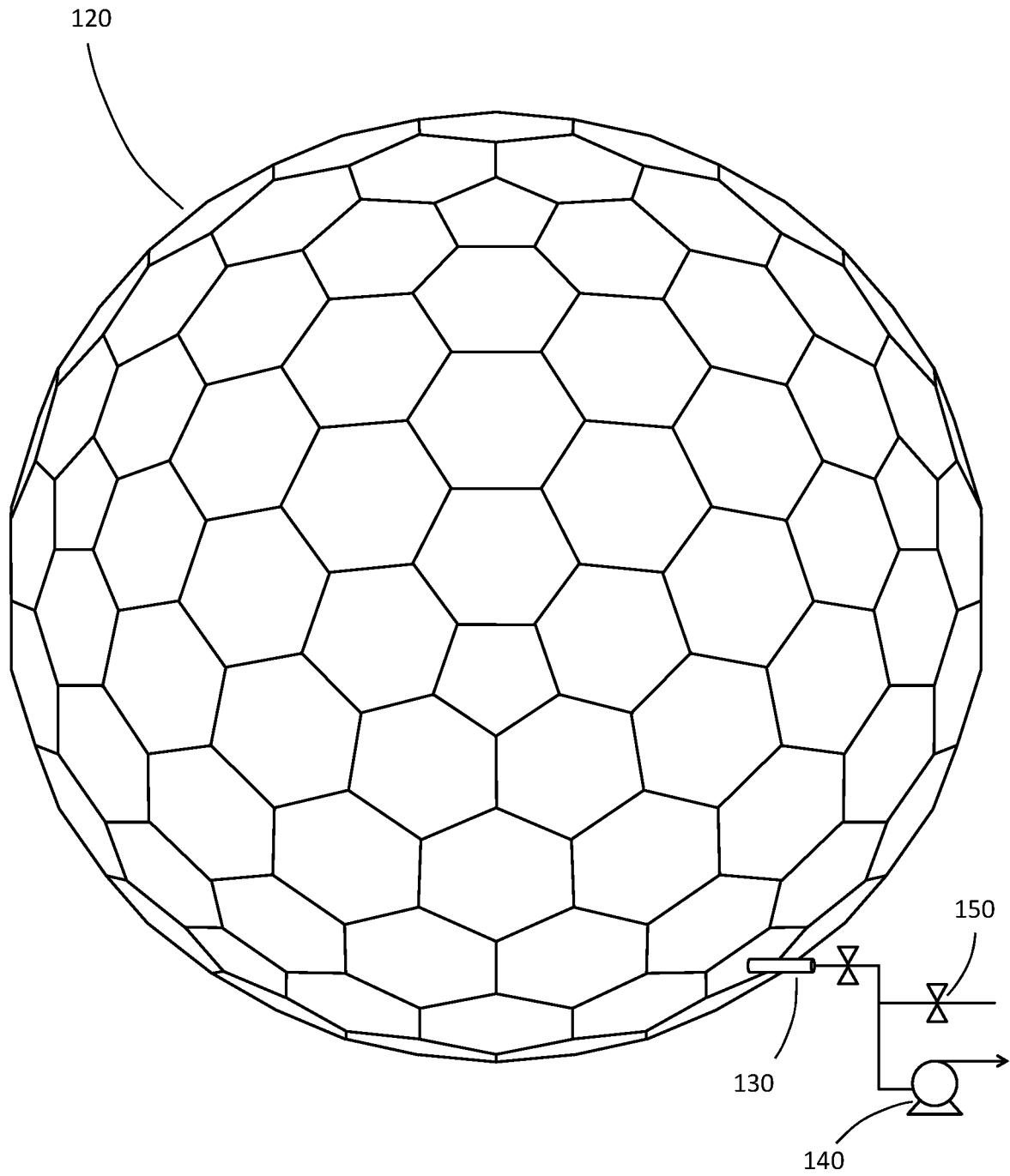
FIG. 6 depicts an embodiment of the vacuum balloon with the skin attached and the vacuum pump attached in accordance with an embodiment.

FIG. 6 shows an embodiment of the outer polyhedron 120 enveloped by skin material. The seams between sections of skin material are not shown for the sake of clarity. The skin can be heat annealed. In an embodiment, the outer polyhedron is covered in an additional layer of polymeric material to stop any small leaks at seams in the strips and panels.

The structure can be used as a vacuum balloon. Air can be removed from the enclosed structure by means of a vacuum pump 140 attached to an opening 130 in outer polyhedron 120. Lift is achieved when the buoyancy equal to the weight of air removed is greater than the total weight of the components of the structure plus the weight of cargo. The vacuum balloon can be partially or almost completely evacuated. Valve 150 can be opened to allow air back into the enveloped structure to reduce buoyancy. The altitude of the vacuum balloon can be adjusted by removing air by pump 140 or letting air in through valve 150. The vacuum balloon can be driven from location to location by propulsion means selected from a group including propellers, jets, or other suitable means. Alternatively, the vacuum balloon can be held in approximately the same place by means of an anchoring device. The location of the vacuum balloon can also be controlled remotely or autonomously by means of a GPS.

Figure 7:
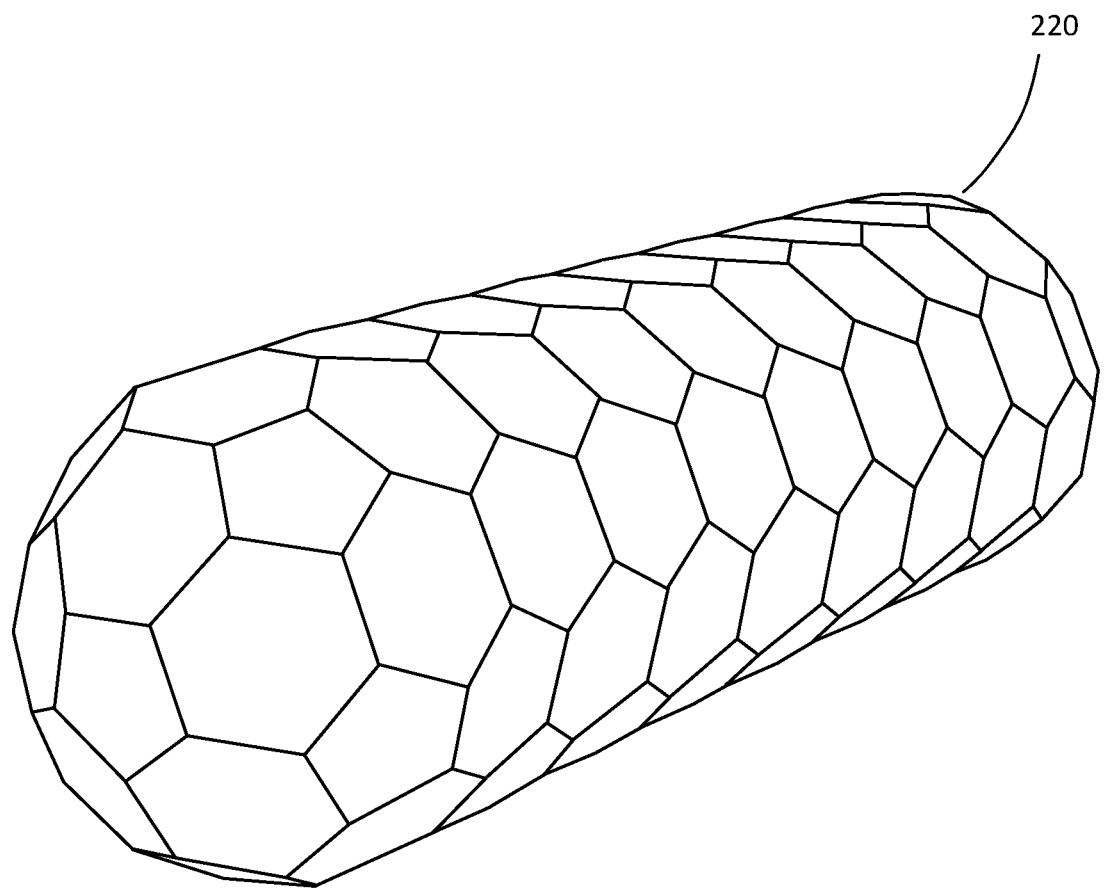
FIG. 7 depicts the outer polyhedron in the shape of a capped cylinder in accordance with an embodiment.
Figure 8A:
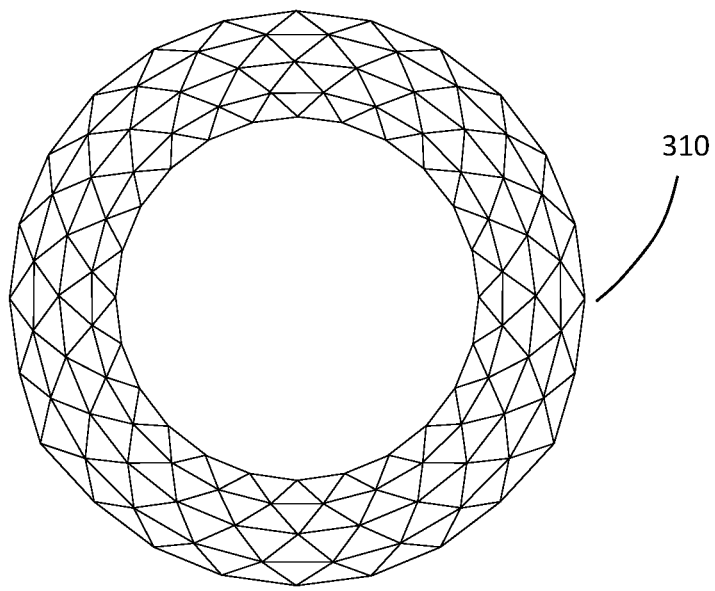
FIG. 8A depicts the inner polyhedron in the shape of a torus in accordance with an embodiment.
Figure 8B:
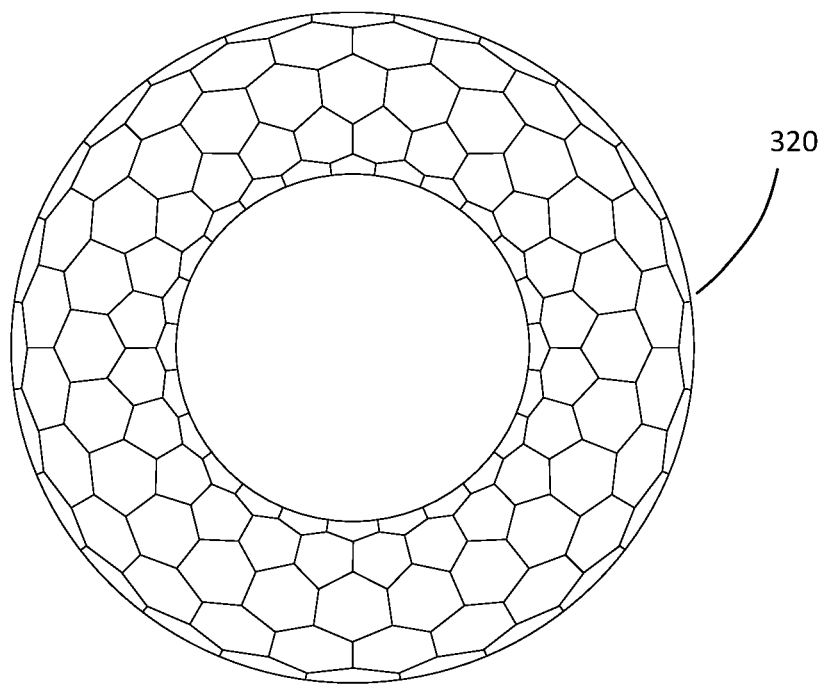
FIG. 8B depicts the outer polyhedron in the shape of a torus in accordance with the embodiment in FIG. 8A.

In an embodiment, the outer polyhedron approximates a sphere. In another embodiment the geometry can be non-spherical. An embodiment of the vacuum balloon with non-spherical geometry is the capped cylinder 220 shown in FIG. 7. In another embodiment the geometry is concave or has negative curvature. Another embodiment of the shape of the vacuum balloon is the toroid. In this embodiment, the outward pointing vertices are located on the surface of a toroid. An embodiment of the inner polyhedron 310 in the shape of a torus is shown in FIG. 8A, while the corresponding outer polyhedron 320 is shown in FIG. 8B. These are just a few examples out of the large number of geometries that can be used in embodiments of the structure.

In an embodiment the struts are tubes. The tubes can have different cross-sectional profiles such as square, rectangular, triangular, hexagonal, circular, oval, etc. In an embodiment the struts are rods or beams and can have different cross-sectional profiles, such as in an I-beam profile or a square. It is advantageous for the cross-sectional profile to have a high radius of gyration because this gives better resistance to buckling relative to strut weight.

In an embodiment, the struts are interconnected by being slotted into hubs. Alternatively, connectors are inserted into the ends of the strut tubes which are then attached to a hub. Many different types of hubs already in use for geodesic domes can be adapted to use in embodiments of the structure. In an embodiment, the struts are pin-jointed at the hubs or connectors so that the struts have degrees of freedom to rotate. In another embodiment, the struts are rigidly attached to the hubs so that they have no rotational freedom.

In an embodiment, the lengths of the inner struts have an average length, L. In an embodiment, the lengths of the inner struts are similar to L.

In an embodiment the lengths of the outer struts are approximately equal to each other, with their lengths chosen so that the vertex formed by the three outer struts of each tetrahedron is approximately above the center of the face of the inner polyhedron forming the base of the tetrahedron. In an embodiment, the outer strut lengths are similar to the average inner strut length, L.

In an embodiment the vertices of the inner polyhedron lie on the surface of a sphere. In an embodiment, the lengths of the outer struts are chosen so that the vertices of the outer polyhedron lie on a sphere concentric with the sphere of the inner polyhedron. In an embodiment, the faces of the outer polyhedron surface are approximately parallel to the faces of the inner polyhedron.

In an embodiment, the lengths of the outer struts are chosen so that the polygonal faces defined by the outer polyhedron vertices are approximately the same surface area. In an embodiment, the lengths of the outer struts are chosen so that the polygonal faces defined by the outer polyhedron vertices are flat or approximately flat.

In an embodiment, the lengths of the outer struts are similar to the average length of the inner struts and can be as much as five times the length of the inner struts.

In an embodiment the struts making up the structure have different diameters so as to reduce weight. In an embodiment the diameter of the outer struts is less than that of the inner struts.

An advantage of the geometry comprising an inner polyhedron whose faces are outward pointing tetrahedra is that the vertices of the tetrahedra serve as anchor points for the web of tape and skin panels. When the skin is under load from the outside pressure, the skin is under tension and so tends to increase the stability of the entire structure, much like the way pre-stressed stay cables stabilize a stayed column.

The caps are advantageous because they reinforce the vertices of the outer polyhedron where high concentrations of stress are likely to be when the vacuum balloon is evacuated.

An advantage of the skin anchored to the caps attached to tetrahedra is that the caps keep the skin from pushing laterally against the sides of the inner struts.

The three-way weave pattern is advantageous because it provides a flat area of overlapping strips 80 upon which the panels 90 are attached.

Polyhedra

In some embodiments the inner polyhedron is generated by distributing a set of vertices over a surface. These vertices serve as the locations for the hubs which are then interconnected with the inner struts to form the triangular faces of the inner polyhedron. As can be appreciated, there are many ways in which a set of vertices can be distributed over the surface of a volume or that the surface can be divided into triangular faces. Below is a description of how some embodiments of the inner polyhedron can be generated systematically.

Figure 9A:
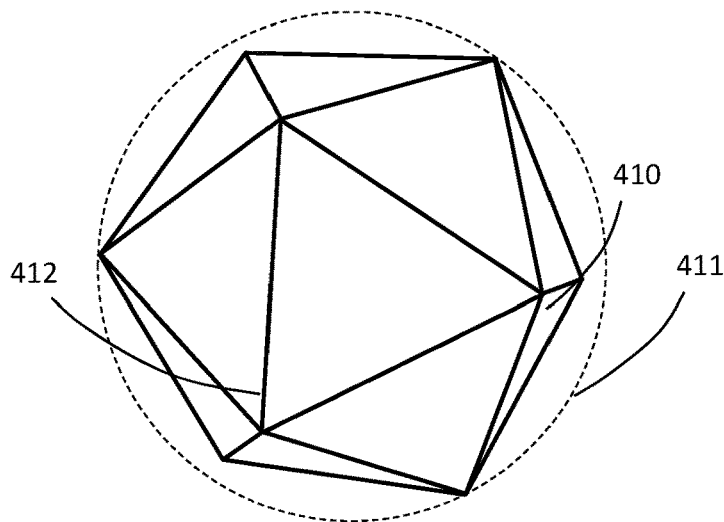
FIG. 9A depicts the regular icosahedron used as the base geometry to generate the inner polyhedra in accordance with an embodiment.

In an embodiment, the vertices of the inner polyhedron lie on the surface of a sphere so that the inner polyhedron approximates a sphere. In an embodiment, the inner polyhedron is the regular icosahedron, i.e., with 20 triangular faces and equal edge lengths. FIG. 9A shows the regular icosahedron 410 with triangular faces 412 with vertices lying on sphere 411. The triangular faces of this base icosahedron are subdivided into a grid of new, smaller triangles 414. The vertices of the new triangles are then projected onto the sphere 411 circumscribing the base icosahedron 410. In this way, the new polyhedron 418 is obtained which is itself an embodiment of the inner polyhedron. The new, projected triangles 416 may be equilateral triangles or may be approximately equilateral with one or more of the lengths of the edges unequal but similar to each other.

The new polyhedron obtained by the subdivision of a base icosahedron and projection onto the circumscribing sphere is given the symbol {3,5+}(b,c) where b and c represent how the original faces of the base icosahedron are subdivided. This type of subdivision is described in the Geodesic Polyhedron Wikipedia Page.

A triangulation number, T, is defined as the number of triangles of the new polyhedron divided by the number of faces of the base icosahedron. For the base icosahedron, T=1. The triangulation number, T, is given by the relation:

$$T=b^2+bc+c^2$$

The new inner polyhedron generated by subdividing the base icosahedron into T faces has 20T faces, 30T edges and 10T+2 vertices. A partial list of geodesic polyhedra derived from the icosahedron is given in the Geodesic Polyhedron Wikipedia Page. It can be appreciated that different embodiments of the inner polyhedron can be generated in different ways from that described above. For example, the triangles can be projected onto a sphere that touches the edges. This is the edge-scribed sphere. In an embodiment, the edge lengths of the outer polyhedra are adjusted to reduce variation in the edge lengths.

Figure 9B:
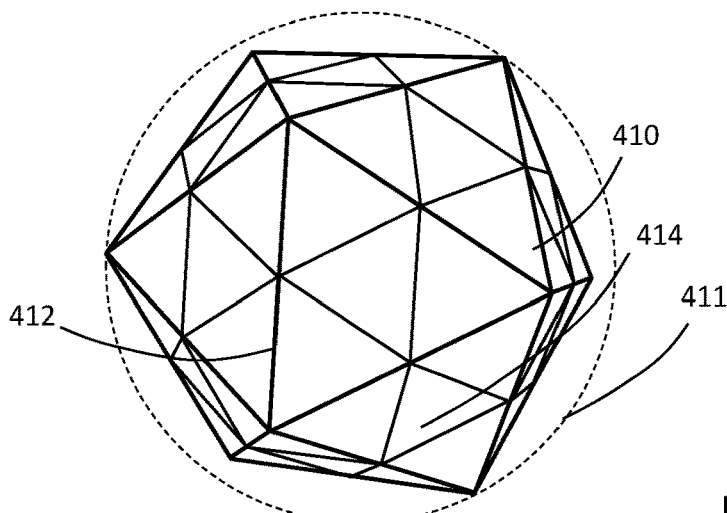
FIG. 9B depicts the subdivision of faces of the regular icosahedron into new triangles in accordance with an embodiment.
Figure 9C:
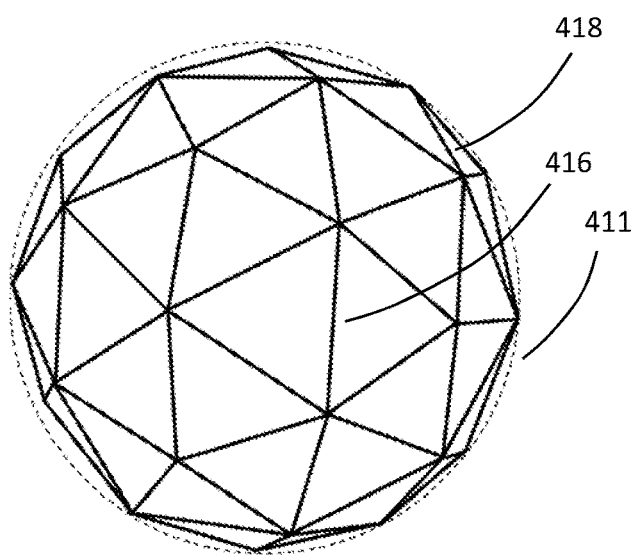
FIG. 9C depicts the projection of the new triangles in FIG. 9B onto the circumscribing sphere thus generating the new inner polyhedron in accordance with an embodiment.

Using the above notation, the subdivision depicted in FIG. 9B has b=2, c=0, and T=4. The vertices of the 4 new triangles 416 are projected onto the sphere 411, resulting in the spherical geodesic polyhedron 418 in FIG. 9C. This new polyhedron is given the symbol {3,5+}(2,0) and has 80 faces, 120 edges, and 42 vertices.

Since each strut of the inner polyhedron corresponds to an edge, there are 30T struts in the inner polyhedron when the base polyhedron is a regular icosahedron. In an embodiment, each face of the inner polyhedron has an outward pointing tetrahedron and therefore there are 20T such tetrahedra. Since each tetrahedron comprises three outer struts, there are 60T outer struts. The total number of struts in the structure is 90T.

In other embodiments, the inner polyhedron is based on a regular octahedron or a regular tetrahedron whose faces are subdivided into smaller triangles in the same way as described above for the icosahedron. Embodiments of the inner polyhedra derived from the base octahedron, are given the symbol {3,4+}(b,c) and have 8T faces, 12T edges and 4T+2 vertices. Polyhedra derived from the base tetrahedron, are given the symbol {3,3+}(b,c) and have 4T faces, 6T edges and 2T+2 vertices.

In an embodiment, the vertices of the tetrahedra define the vertices of the outer polyhedron. When the inner polyhedron is based on the regular icosahedron, the outer polyhedron has 20T vertices, the same as the number of triangular faces of the inner polyhedron. The outer polyhedron has 10T+2 faces, the same number of vertices as the inner polyhedron. Of these faces, there are 10(T−1) hexagons and 12 pentagons. For each inner polyhedron, {3,5+}(b,c), there is a corresponding outer polyhedron and is given the symbol {5+,3}(b,c). As a guide, a partial list of inner and outer polyhedra is given in FIG. 10, which is derived from the "List of geodesic polyhedra and Goldberg polyhedra" appearing in the List of Geodesic Polyhedra and Goldberg Polyhedra Wikipedia Page.

TABLE I summarizes the number of faces, edges and vertices of inner and outer polyhedra derived from the icosahedron, octahedron or tetrahedron. Except for the entries for outer struts, the table was derived from information within the Geodesic Polyhedron Wikipedia Page and the Goldberg Polyhedron Wikipedia Page.

TABLE I

| Base Inner Polyhedron | Icosahedron | Octahedron | Tetrahedron |
|---|---|---|---|
| Inner Polyhedron Geometry | {3, 5+}(b, c) | (3, 4+}(b, c) | (3, 3+}(b, c) |
| Inner Polyhedron Vertices | 10T + 2 | 4T + 2 | 2T + 2 |
| Inner Polyhedron Faces | 20T | 8T | 4T |
| Inner Polyhedron Edges = Inner Struts | 30T | 12T | 6T |
| Outer Struts | 60T | 24T | 12T |
| Outer Polyhedron Geometry | {5+, 3}(b, c) | {4+, 3}(b, c) | (3+, 3}(b, c) |
| Outer Polyhedron Vertices | 20T | 8T | 4T |
| Outer Polyhedron Faces | 10T + 2 | 4T + 2 | 2T + 2 |
| Outer Polyhedron Edges | 30T | 12T | 6T |

In an embodiment the lengths of the inner struts are different from each other and depend on the geometry of the base polyhedron and the manner of subdivision of the base triangle. Tables listing the number of edges and their lengths for spherical geodesic polyhedra are readily available or can be calculated. Based on the number of edges and their lengths, the average edge length, L, can be calculated. Although there is a distribution of edge-lengths, they are substantially similar to the average length, L. In an embodiment, the maximum strut length is within 10% of the average strut length.

In an embodiment, the inner strut lengths are adjusted to reduce the maximum strut length. In an embodiment, the radially projected vertex positions are angularly adjusted but kept on the circumscribing sphere in such a way so as to reduce the maximum inner strut length. This process is done numerically on a computer by iteratively adjusting vertex positions on the surface of the circumscribing sphere. For example, this may involve energy minimization methods. This numerical process can reduce the maximum strut length from approximately 10% to approximately 5% higher than L. In an embodiment, the maximum strut length is less than 10% higher than L.

Figure 11A:
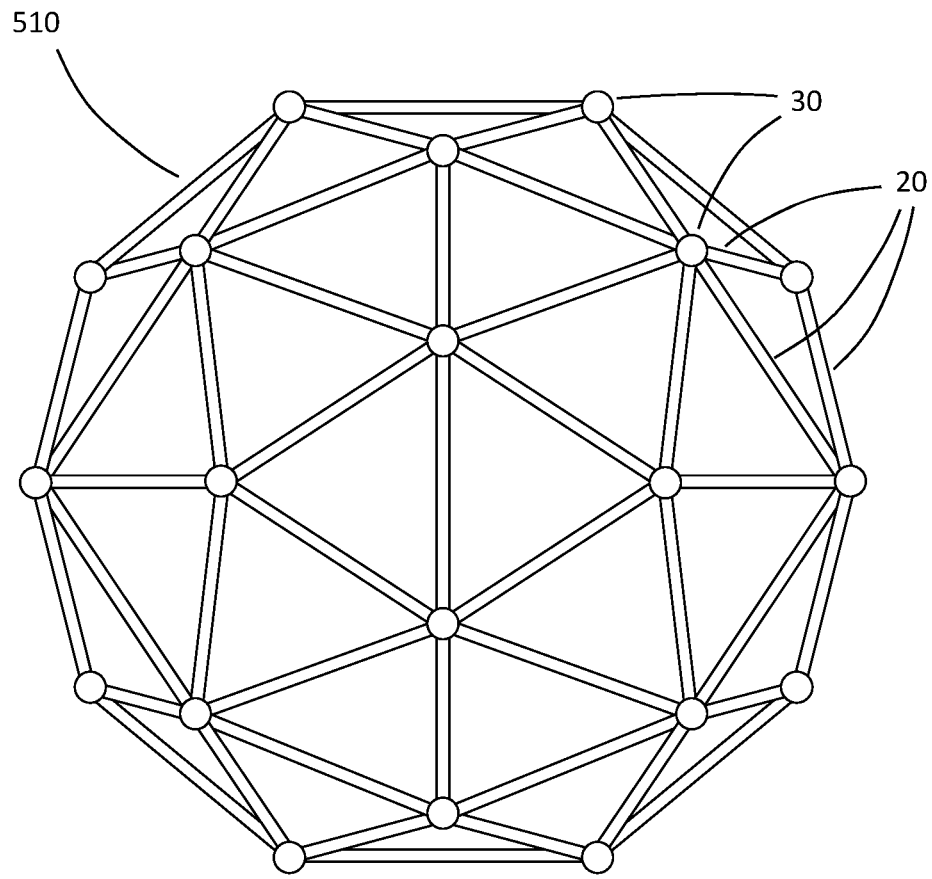
FIG. 11A depicts the {3,5+}(1,1) inner polyhedron constructed of the interconnected inner struts at the hubs in accordance with an embodiment.
Figure 11B:
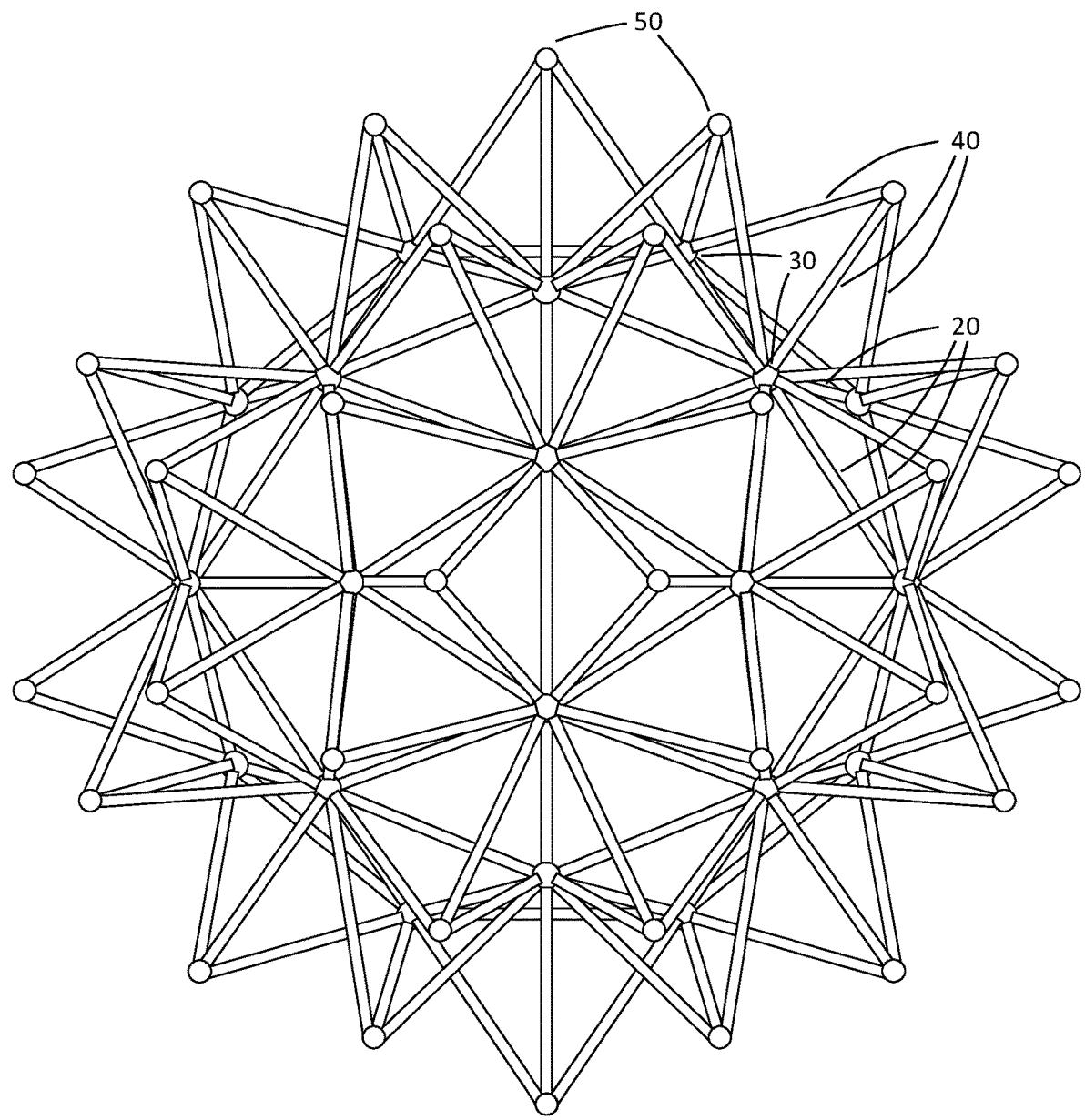
FIG. 11B depicts the inner polyhedron with outer struts attached in accordance with an embodiment.
Figure 11C:
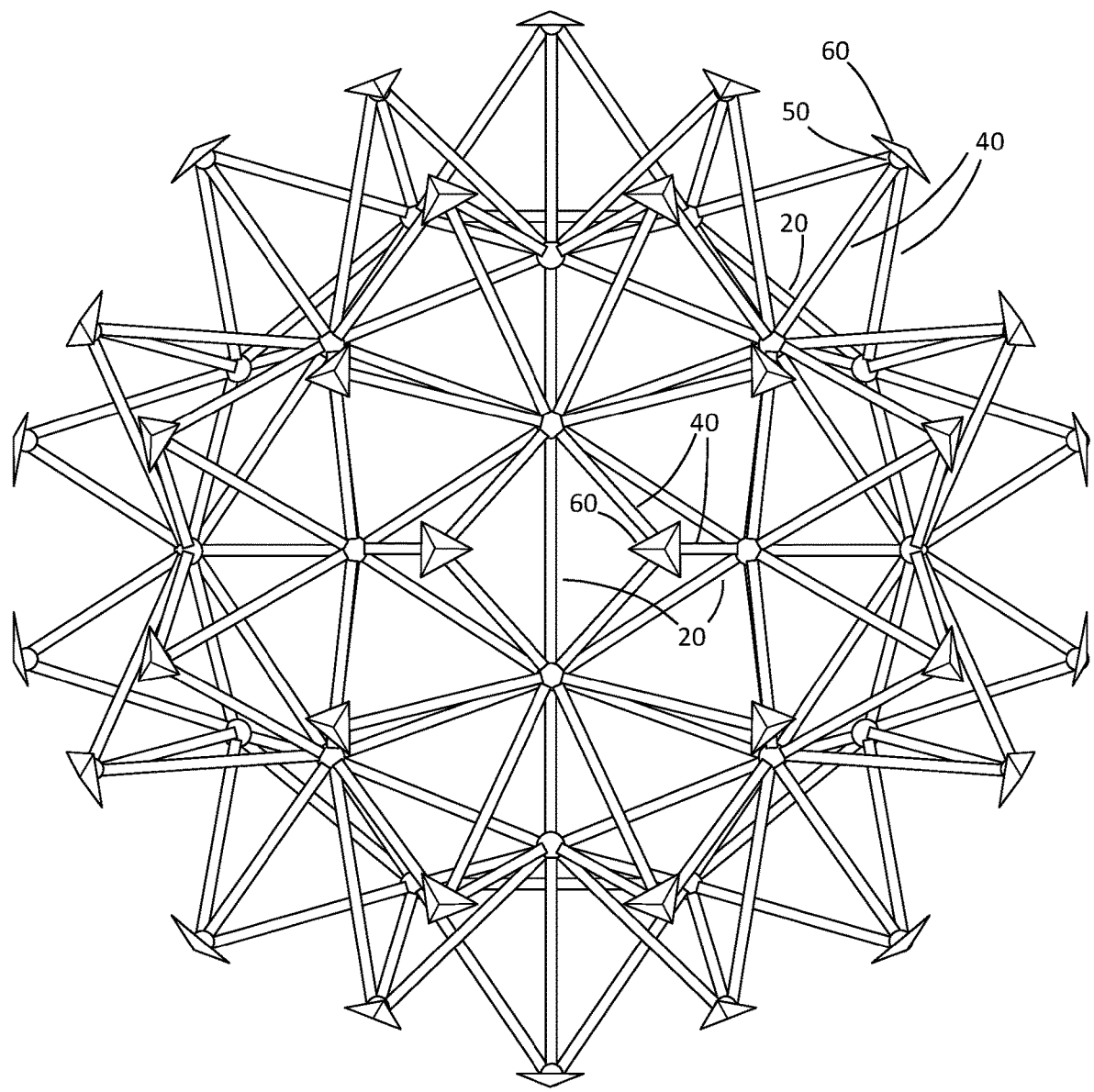
FIG. 11C depicts the inner polyhedron with the caps attached to the outer struts in accordance with an embodiment.

An illustrative embodiment of the structure has the {3,5+}(1,1) inner polyhedron 510 based on the regular icosahedron subdivided with b=c=1 and triangulation number T=3 shown in FIG. 11A. Inner polyhedron 510 has 60 triangular faces, 32 vertices and 90 edges. So as not to clutter the drawing, the view used in FIG. 11A is one in which the struts at the back line up with the struts in the front. Inner struts 20 are interconnected by means of hubs 30. In FIG. 11B, outer struts 40 form tetrahedra at each triangular face of the inner polyhedron. Outer struts 40 meet at the vertex pointing away from the inner polyhedron and are connected by hubs or connectors 50. Caps 60 are attached to each connector 50 as shown in FIG. 11C. The caps are oriented so that the upper edges point towards the three neighboring caps and are thus oriented along the edges of the outer polyhedron.

Figure 11D:
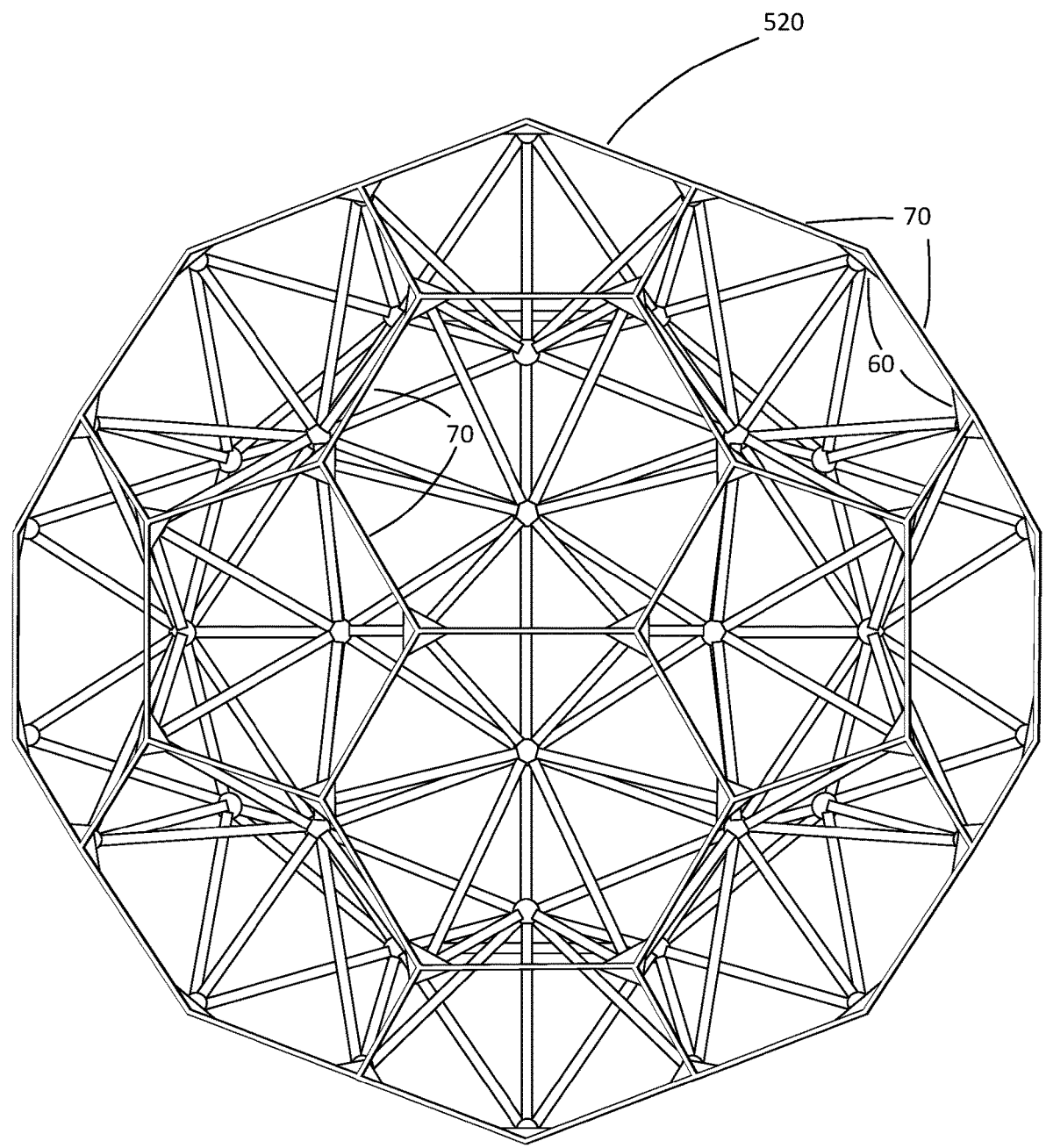
FIG. 11D depicts the web of tape attached to the caps to define the edges of the outer polyhedron in accordance with an embodiment.
Figure 11E:
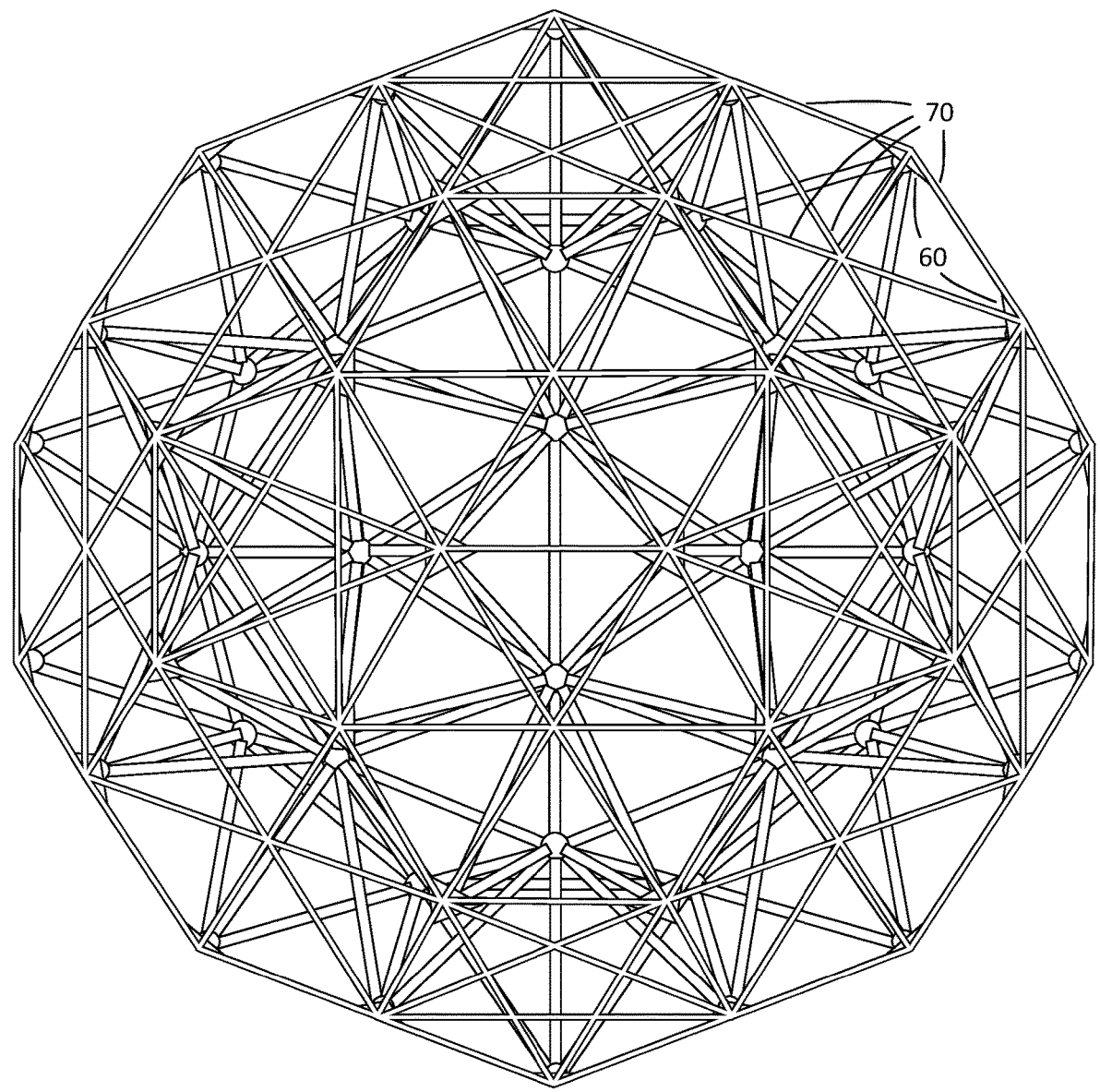
FIG. 11E depicts the web of tape attached to the caps to define the faces of the outer polyhedron in accordance with an embodiment.

In FIG. 11D each cap 60 is shown connected to its three nearest neighbors by means of tape 70. The web of tape thus formed outlines the edges of the outer polyhedron 520. FIG. 11E, shows lengths of tape 70 interconnecting other neighboring caps to define the planes of the faces of the outer polyhedron 520.

Figure 11F:
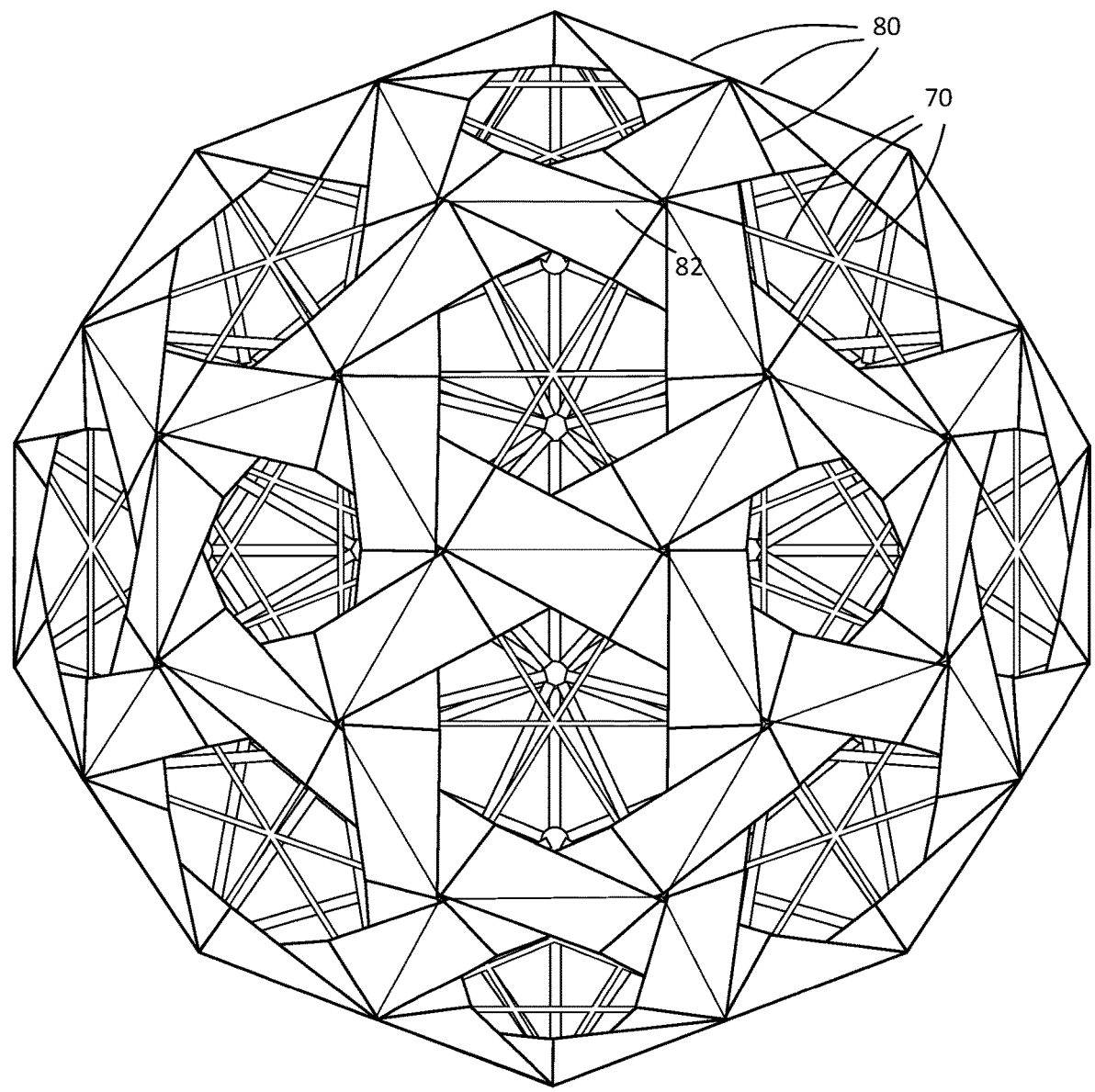
FIG. 11F depicts the strips of skin attached to the web of tape in the three-way pattern in accordance with an embodiment.

Strips of skin material 80 are attached to tape 70 as shown in FIG. 11F. In an embodiment, the strips of skin material are attached in a three-way weave pattern around each of the caps so as to avoid seams running along the edges 82 of the outer polyhedron.

Figure 11G:
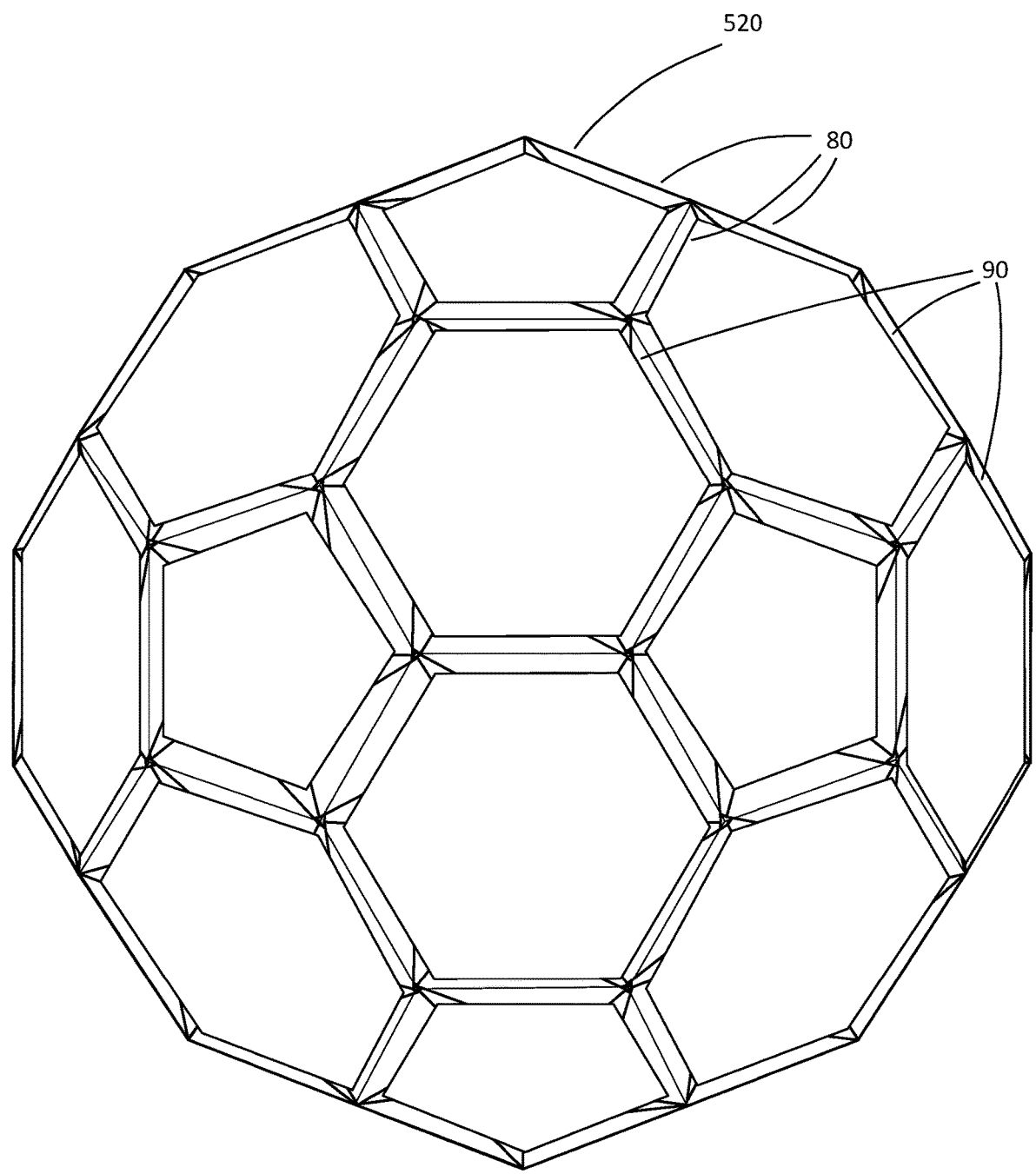
FIG. 11G depicts the skin panels attached over the openings in the three-way pattern of the strips of skin in accordance with an embodiment.

The three-way weave pattern leaves an opening at each face of the outer polyhedron. These openings are covered by skin panels 90 as shown in FIG. 11G. In this embodiment, the outer polyhedron 520 is a truncated icosahedron made of 20 hexagonal and 12 pentagonal faces.

In an embodiment, the skin is a means to interconnect neighbors in the set of outward pointing vertices that holds the caps together and the tape then may not be needed. Instead, the skin is attached directly to the caps.

Figure 18A:
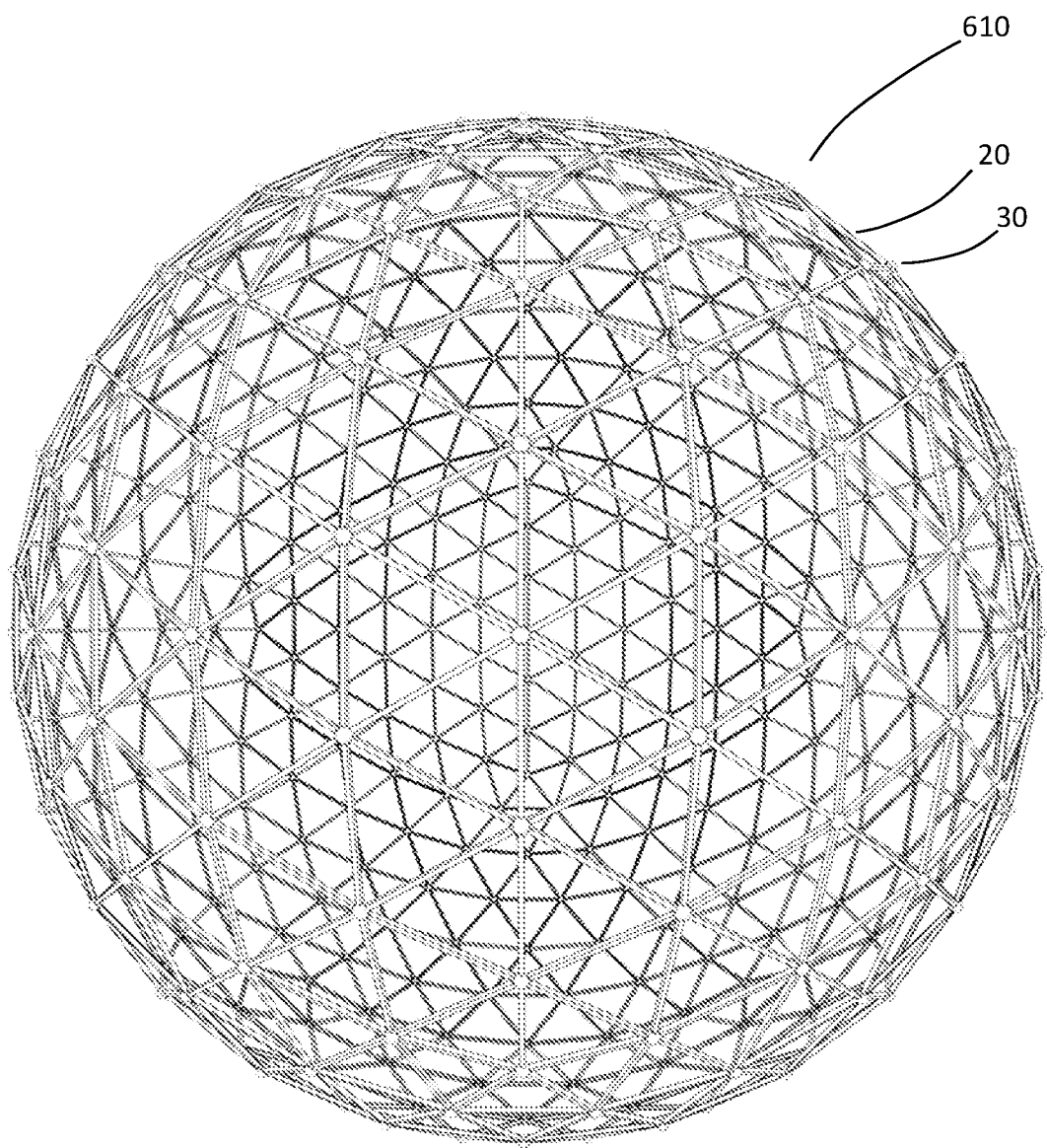
FIG. 18A depicts the {3,5+}(6,0) inner polyhedron constructed of the interconnected inner struts in accordance with an embodiment.
Figure 18B:
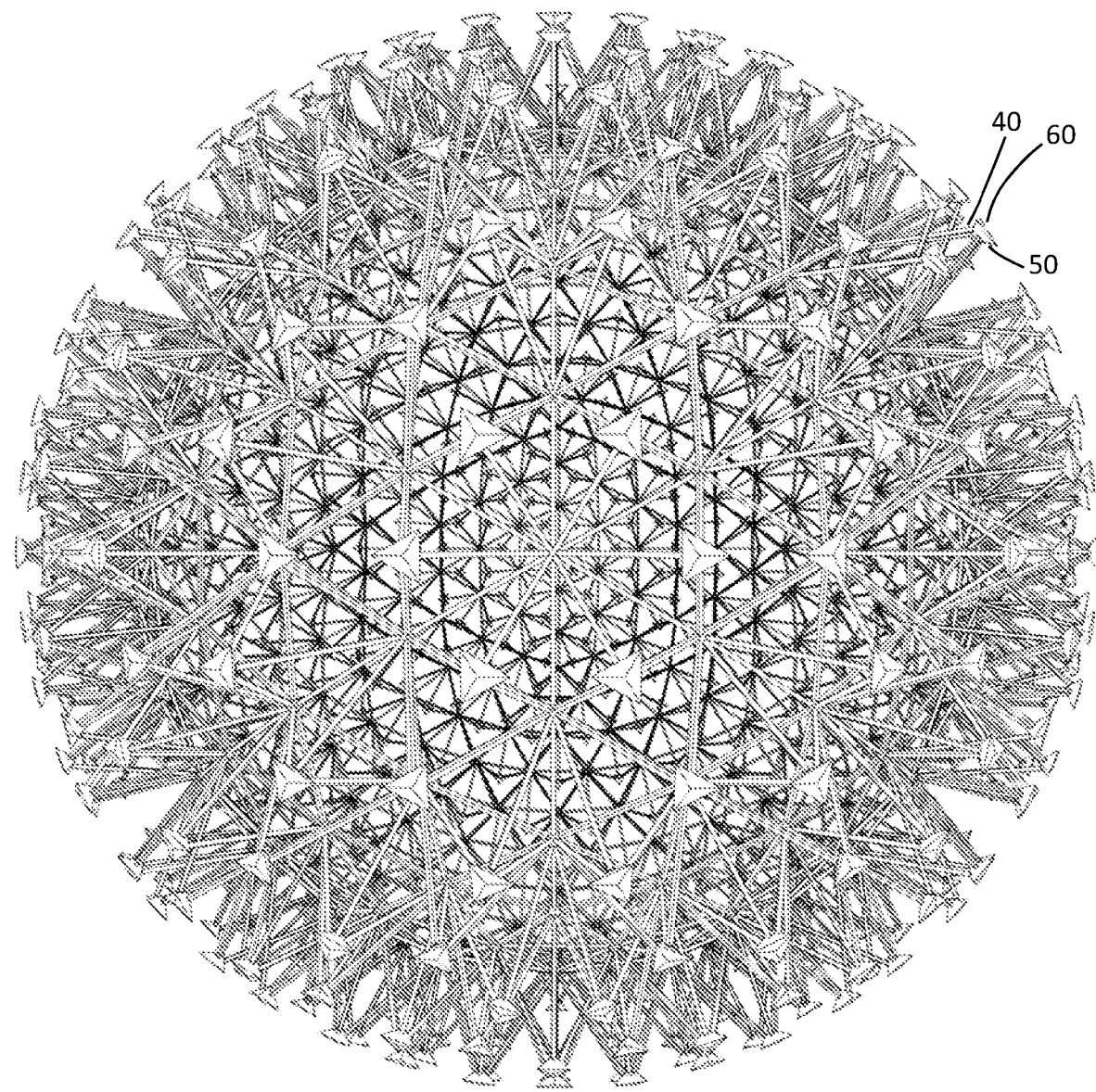
FIG. 18B depicts the inner polyhedron with outer struts and caps attached in accordance with an embodiment.
Figure 18C:
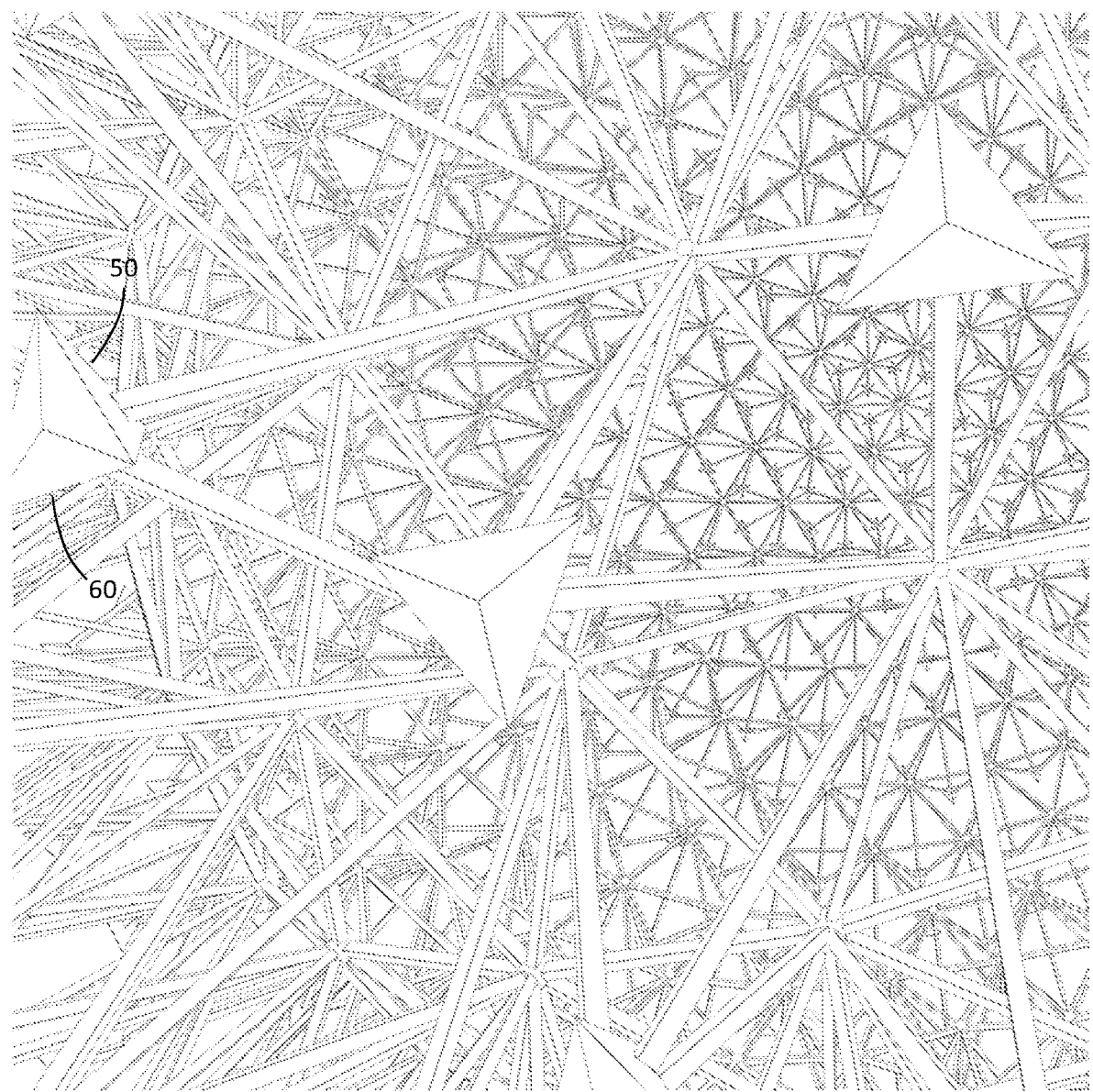
FIG. 18C depicts the inner polyhedron with outer struts, hubs and caps attached in accordance with an embodiment.

In an embodiment the inner polyhedron 610 is denoted by the symbol {3,5+}(6,0), based on the icosahedron and subdivided with b=6 and c=0 (triangulation number T=36) as shown in FIG. 18A. Inner struts 20 are interconnected by means of hubs 30. In FIG. 18B, outer struts 40 form tetrahedra at each triangular face of the inner polyhedron. Outer struts 40 meet at the vertex pointing away from the inner polyhedron and are connected by hubs 50. Caps 60 are attached to each hub 50. The caps are oriented so that the upper edges point towards the three neighboring caps and define the vertices of the outer polyhedron. FIG. 18C is a close-up perspective view of part of the structure in FIG. 18B.

Figure 18D:
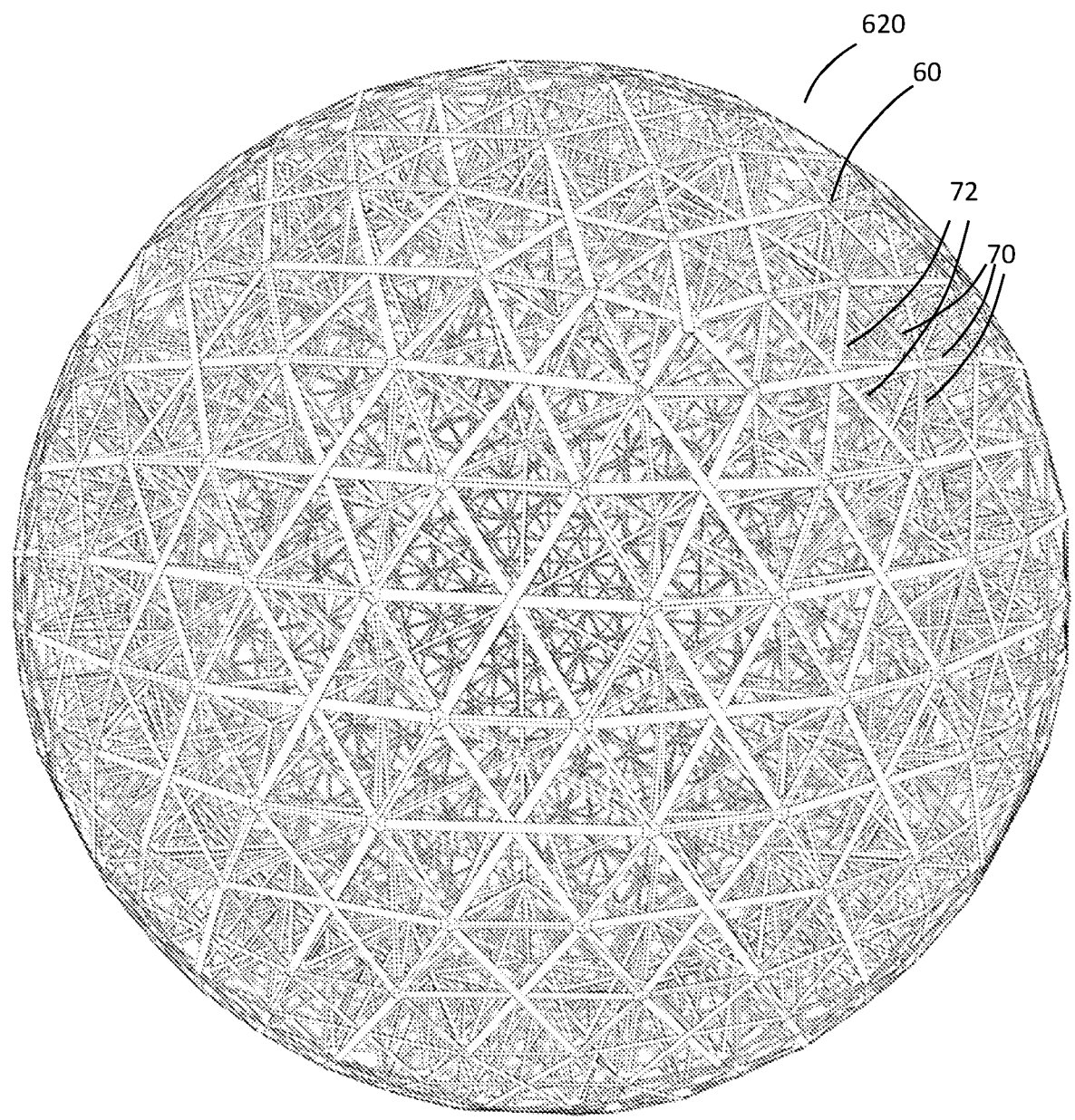
FIG. 18D depicts the web of tape attached to the caps to define the edges and faces of the {5+,3}(6,0) outer polyhedron in accordance with an embodiment.
Figure 18E:
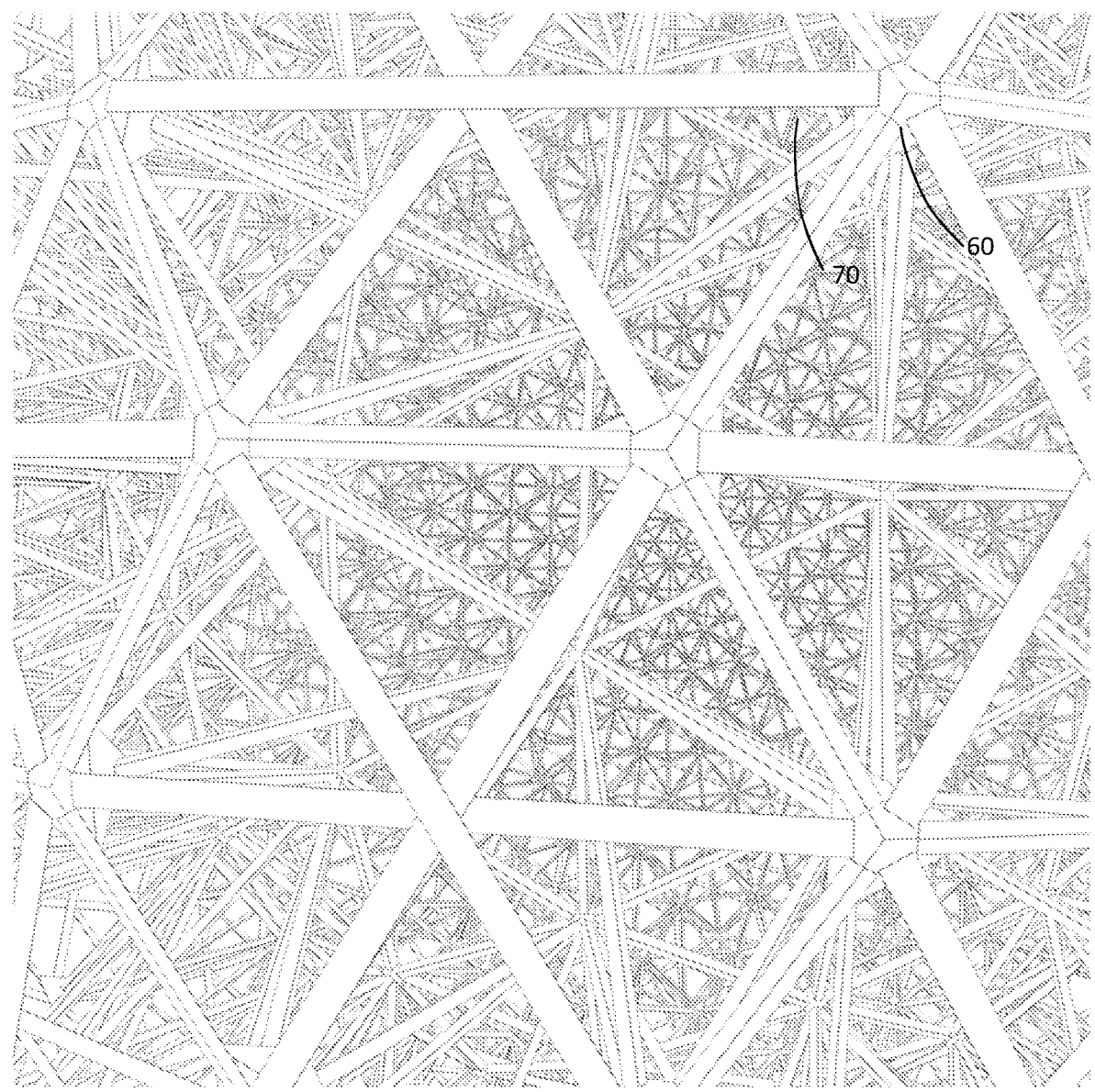
FIG. 18E depicts the web of tape attached to the caps to define the edges and faces of the outer polyhedron in accordance with an embodiment.

In FIG. 18D, caps 60 are connected to their nearest neighbors by means of tape 70. The web of tape thus formed outlines the edges of the outer polyhedron 620. Additional lengths of tape 70 interconnect further neighboring caps to define the planes of the faces of the outer polyhedron 620. FIG. 18E is a close-up perspective view of part of the structure in FIG. 18D.

Figure 18F:
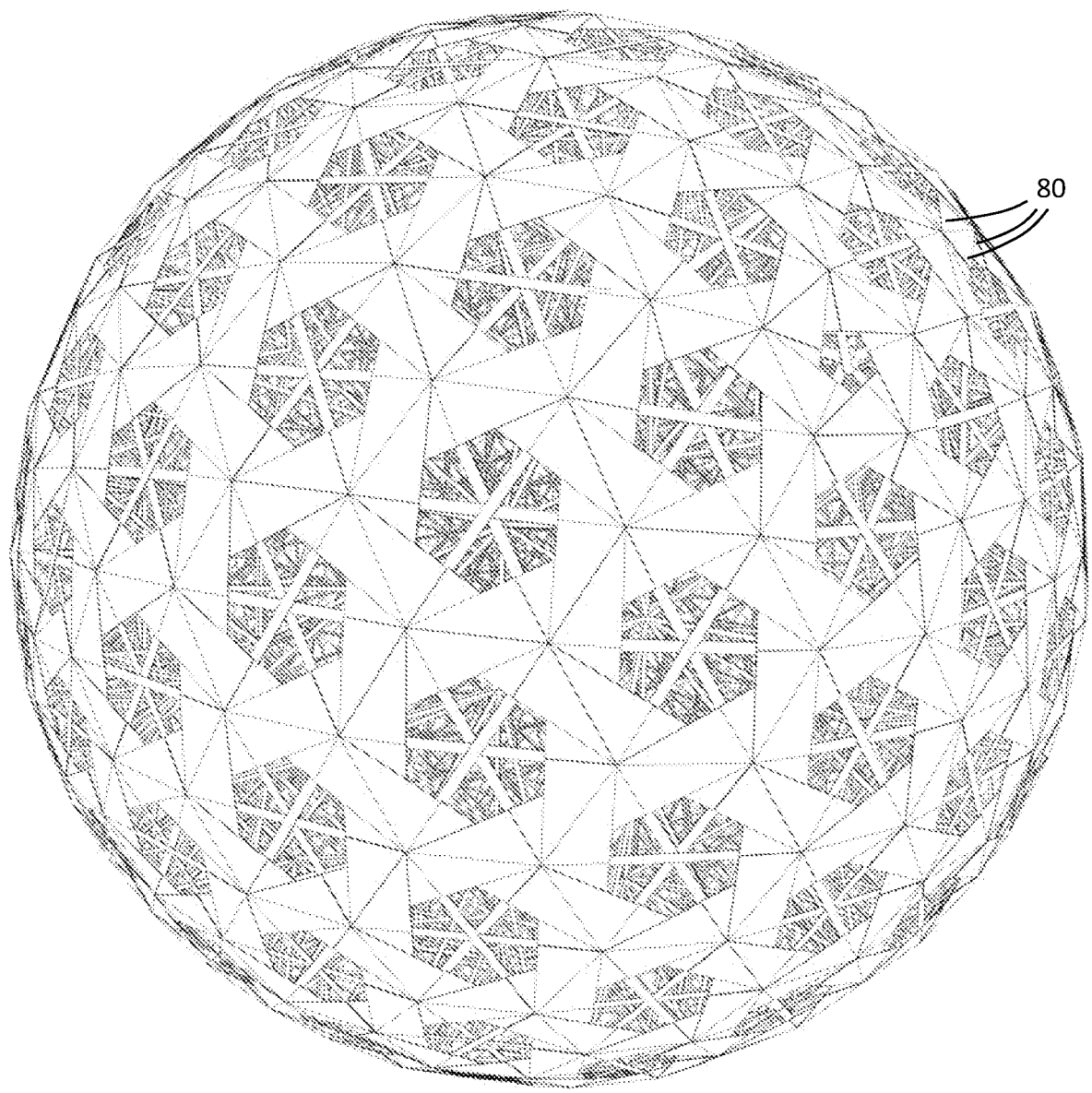
FIG. 18F depicts the strips of skin attached to the web of tape in the three-way pattern in accordance with an embodiment.
Figure 18G:
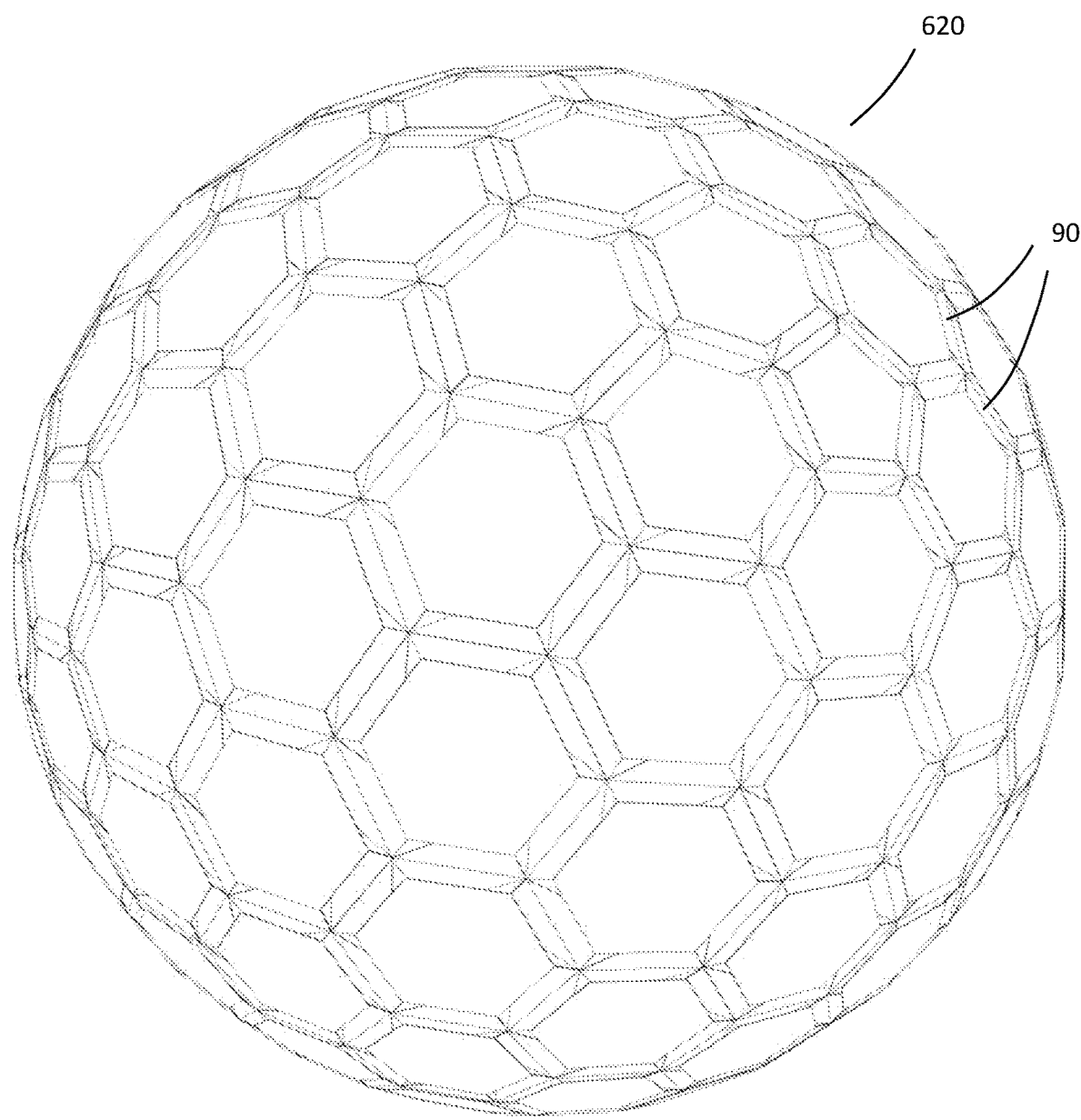
FIG. 18G depicts the skin panels attached over the openings in the three-way pattern of the strips of skin in accordance with an embodiment.

Strips of skin material 80 are attached to the web of tape as shown in FIG. 18F. The three-way weave pattern leaves an opening at each face of the outer polyhedron. These openings are covered by skin panels 90 as shown in FIG. 18G, enclosing the {5+,3}(6,0) outer polyhedron 620 whose vertices are defined by caps 60. The vertices of each polygonal face of the outer polyhedron that are not already interconnected by tape 70, are interconnected by additional lengths of tape 72 to define the polygonal faces of the outer polyhedron 620. In some embodiments the tape FIG. 18E is a close-up perspective view of part of the structure in FIG. 18D.

It can be appreciated that as T increases, the ratio of the radius of the outer polyhedron, R, to the thickness of the shell described by the layer of tetrahedra increases. For very large structures, this ratio could be above a critical number where the structure becomes unstable to shell buckling. In an embodiment, an additional "inside" polyhedron comprised of triangular faces that are defined by connected struts is connected on the inside of the inner polyhedron by means of a layer struts. In an embodiment, the number of faces of the inside polyhedron is 3 times the number of faces of the inner polyhedron. In an embodiment, the number of faces of the inside polyhedron is ⅓rd the number of faces of the inner polyhedron. In an embodiment the diameters of the struts comprising the inside polyhedron or the connecting struts between the inside and inner polyhedra have different diameters from that of the inner struts.

In some embodiments, the inner polyhedron geometry is as designated by the symbol {3,5+}(b,c), based on icosahedral symmetry and subdivided with steps b and c. Then in an embodiment, b=c+3p, with p zero or a positive integer. In some embodiments, the inside polyhedron is a {3,5+}(m,n)

polyhedron whose vertices lie on a sphere concentric to and inside the inner polyhedron. Outer struts with strut length similar to the average inner strut length L are connected to the inside vertices to form outward pointing tetrahedra at each triangular face of the inside polyhedron.

In an embodiment, the indices for the inside polyhedron, m and n, are given by m=c+p and n=p. Then the orientation of the inside polyhedron can be set such that radially outward from the approximate center of each triangular face of the inside polyhedron there is a vertex of the inner polyhedron. Additionally, radially outward from each vertex of the inside polyhedron, there is also a vertex of the inner polyhedron. Each vertex of the inner polyhedron is matched up with either a face or a vertex of the inside polyhedron. In an embodiment, the strut lengths of the inside polyhedron and strut lengths of the tetrahedra are such that the outward vertex of the tetrahedron on each triangular face of the inside polyhedron is also a vertex of the inner polyhedron. The vertices of the inside polyhedron are connected to the vertices of the inner polyhedron by radial struts so that the space between the inner polyhedron and inside polyhedron is divided into tetrahedra.

Figure 19A:
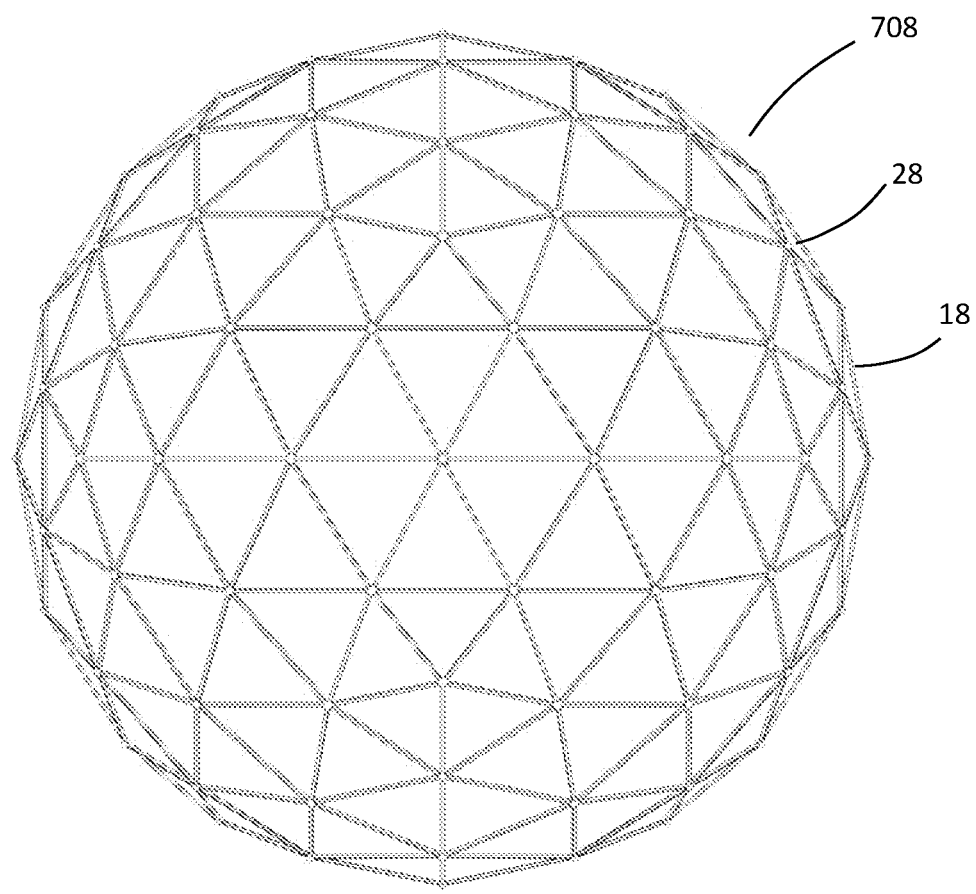
FIG. 19A depicts the {3,5+}(2,2) inside polyhedron constructed of the interconnected inside struts in accordance with an embodiment.
Figure 19B:
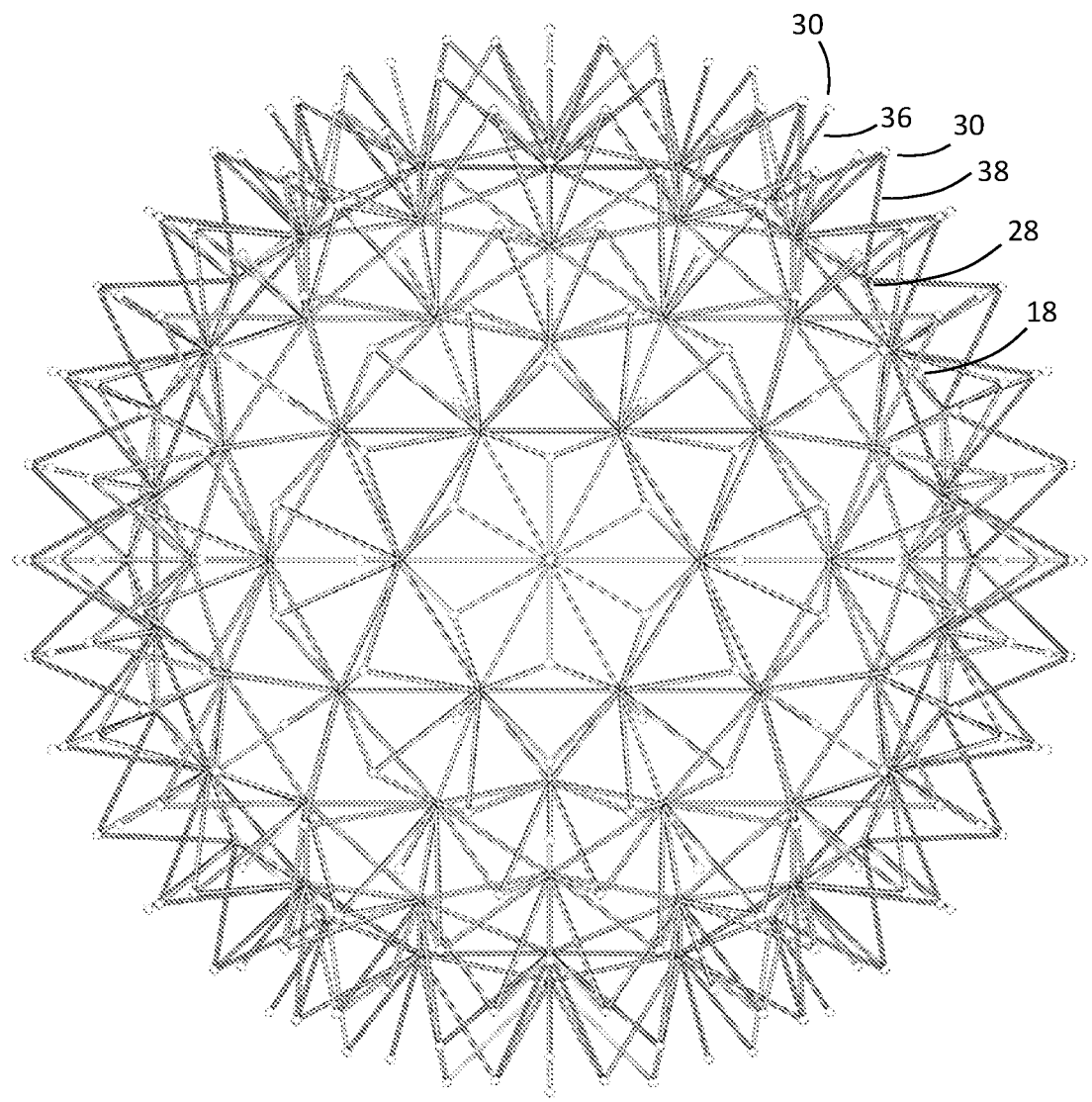
FIG. 19B depicts the inside polyhedron with struts attached to form outward pointing tetrahedra. Other struts point radially outwards from certain vertices in accordance with an embodiment.
Figure 19C:
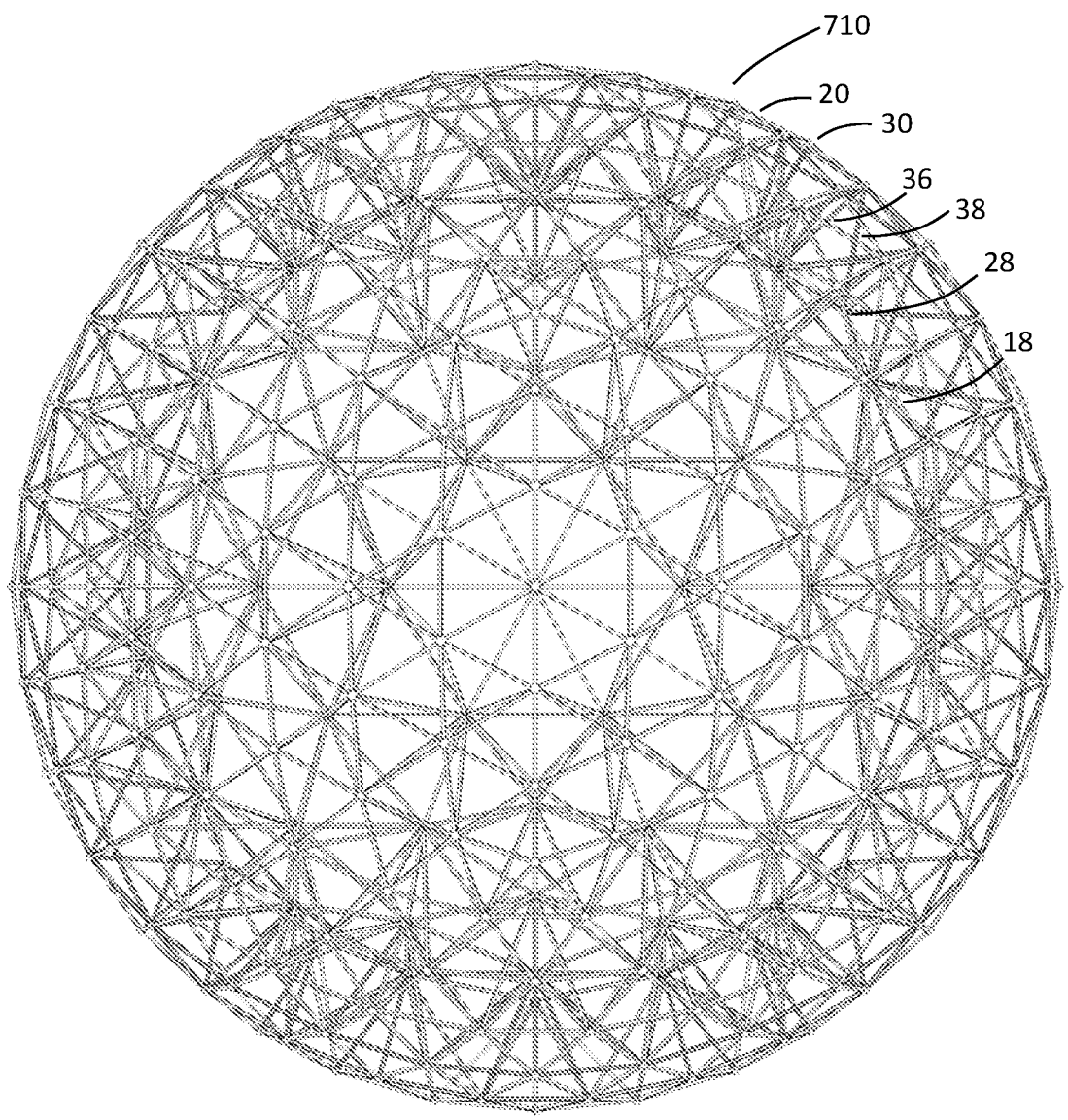
FIG. 19C depicts the {3,5+}(2,2) inside polyhedron connected to the {3,5+}(6,0) inner polyhedron by means of the layer of struts in accordance with an embodiment.
Figure 19D:
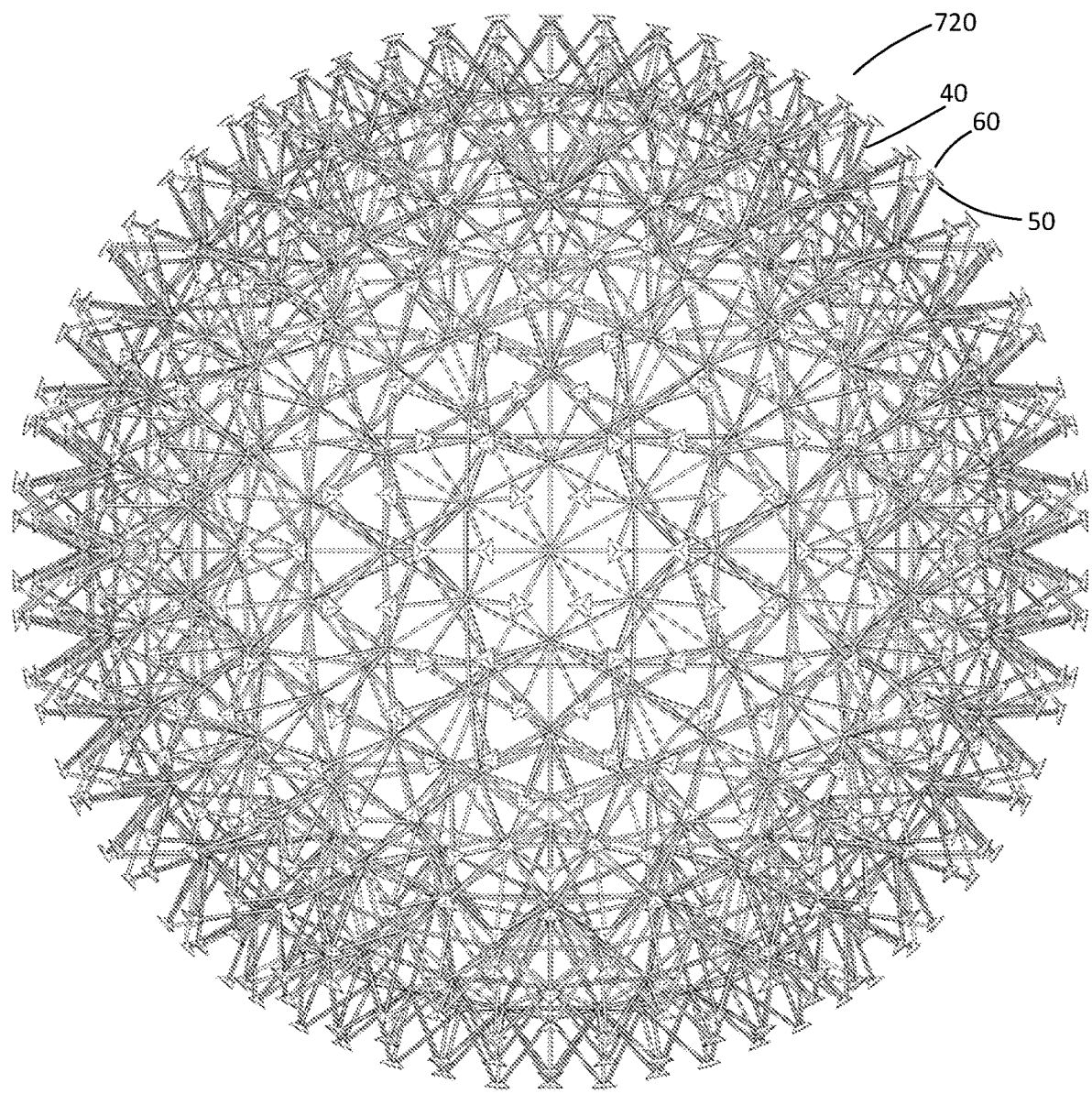
FIG. 19D depicts the {3,5+}(2,2) inside polyhedron connected to the {3,5+}(6,0) inner polyhedron by means of the layer of struts, and with outer struts, hubs and caps attached to the inner polyhedron in accordance with an embodiment.

FIG. 19A shows inside polyhedron 708 based on icosahedral symmetry with m=n=2, i.e. {3,5+}(2,2). Therefore, p=2, c=0 and b=6. So as not to clutter the drawing, the view used in FIGS. 19A-19D is one in which the struts and hubs at the back line up with the struts in the front. Inside struts 18 are connected by means of hubs 28 so as to define the edges of the triangular faces of 708. FIG. 19B shows tetrahedral struts 38 connected to hubs 28 of the inside polyhedron and hubs 30 of the inner polyhedron. FIG. 19B also shows the radial struts 36 that are oriented radially outward. FIG. 19C shows the inside polyhedron connected by the layer of radial and tetrahedral struts to the inner polyhedron 710, which is designated by the symbol {3,5+}(6,0) and is comprised of inner struts 20 interconnected by hubs 30. The space between the inner polyhedron and the inside polyhedron is comprised of tetrahedra whose edges are defined by struts. FIG. 19D shows the outer struts 40 connected to the inner polyhedron with hubs 50 and caps 60 which define the vertices of the outer polyhedron 720. The rest of the structure including outer struts, hubs caps, web of tape and strips and panels of skin for the outer polyhedron are attached as described above for other embodiments. In an embodiment, the structure includes an inside polyhedron connected to the inside of the inner polyhedron, wherein the structure is based on icosahedral, octahedral or tetrahedral symmetry.

Figure 20:
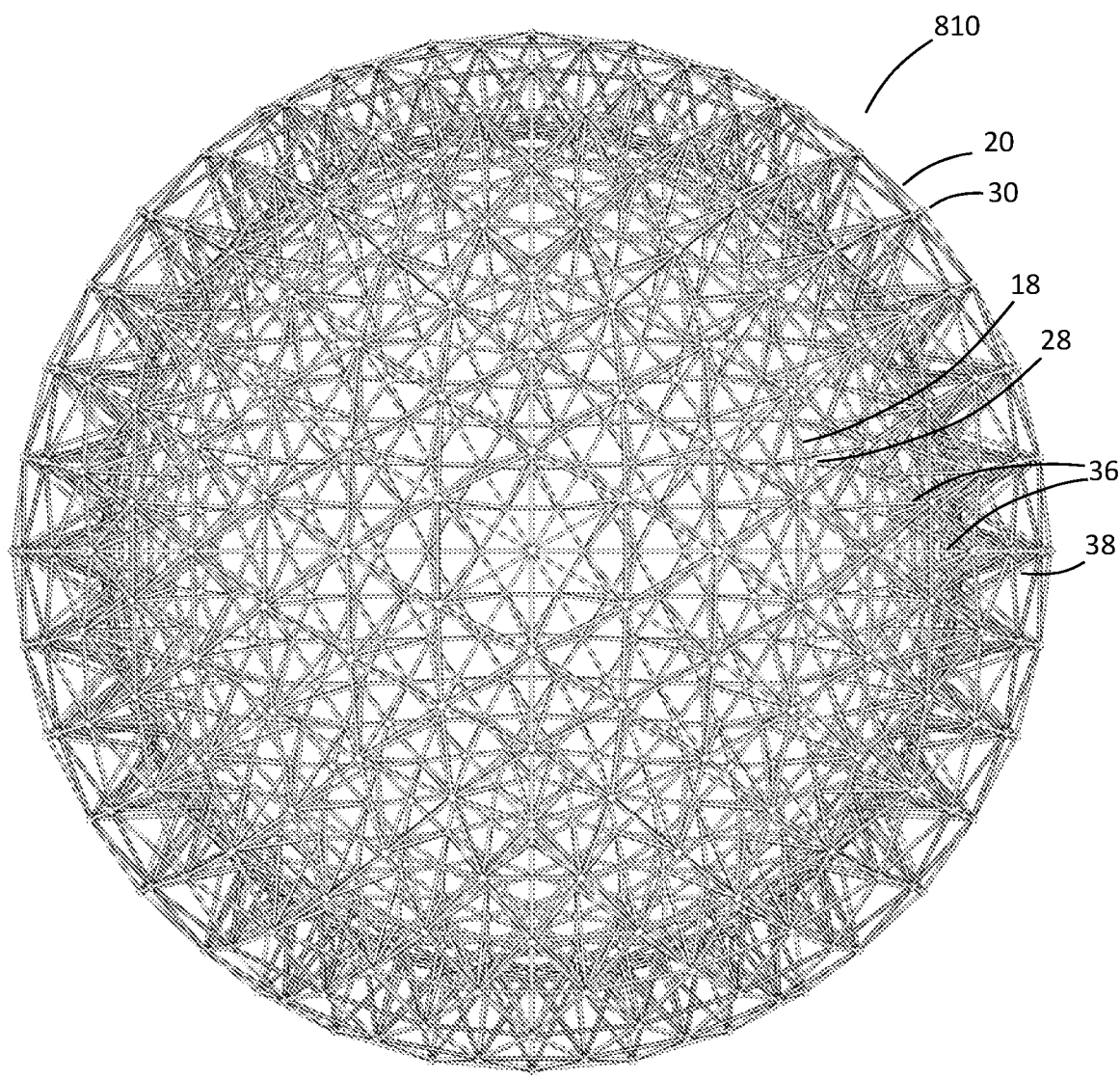
FIG. 20 depicts the {3,5+}(6,6) inside polyhedron connected to the {3,5+}(6,0) inner polyhedron by means of the layer of struts in accordance with an embodiment.

In an embodiment, the inner polyhedron is described by the symbol {3,5+}(b,c), the inside polyhedron is {3,5+}(m, n) and b=n+p, c=p, m=n+3p. FIG. 20 shows an embodiment, where the inside polyhedron is {3,5+}(6,6) and the inner polyhedron 810 is {3,5+},(6,0). The outer struts forming the vertices for the outer polyhedron are then constructed as for other embodiments described above.

Materials

As can be appreciated, the choice of material and design of the struts is important for the structure to be strong, stiff and light. In an embodiment, the struts are rods or tubes made of a material with a high ratio of stiffness to density. Such materials include fiber composites, metals, and ceramics, including carbon fiber composite and aluminum. For fiber composites, the stiffness depends on the orientation of fibers, how the composite is prepared and processed, and what ingredients are used. In an embodiment, the connectors or hubs are made of material with high compressive strength and high modulus. Suitable materials for use in struts and hubs include but are not limited to composite materials and metallic materials and the like and can include but are not limited to carbon fiber composite, carbon nanofiber composite, steel and aluminum.

Figure 16:
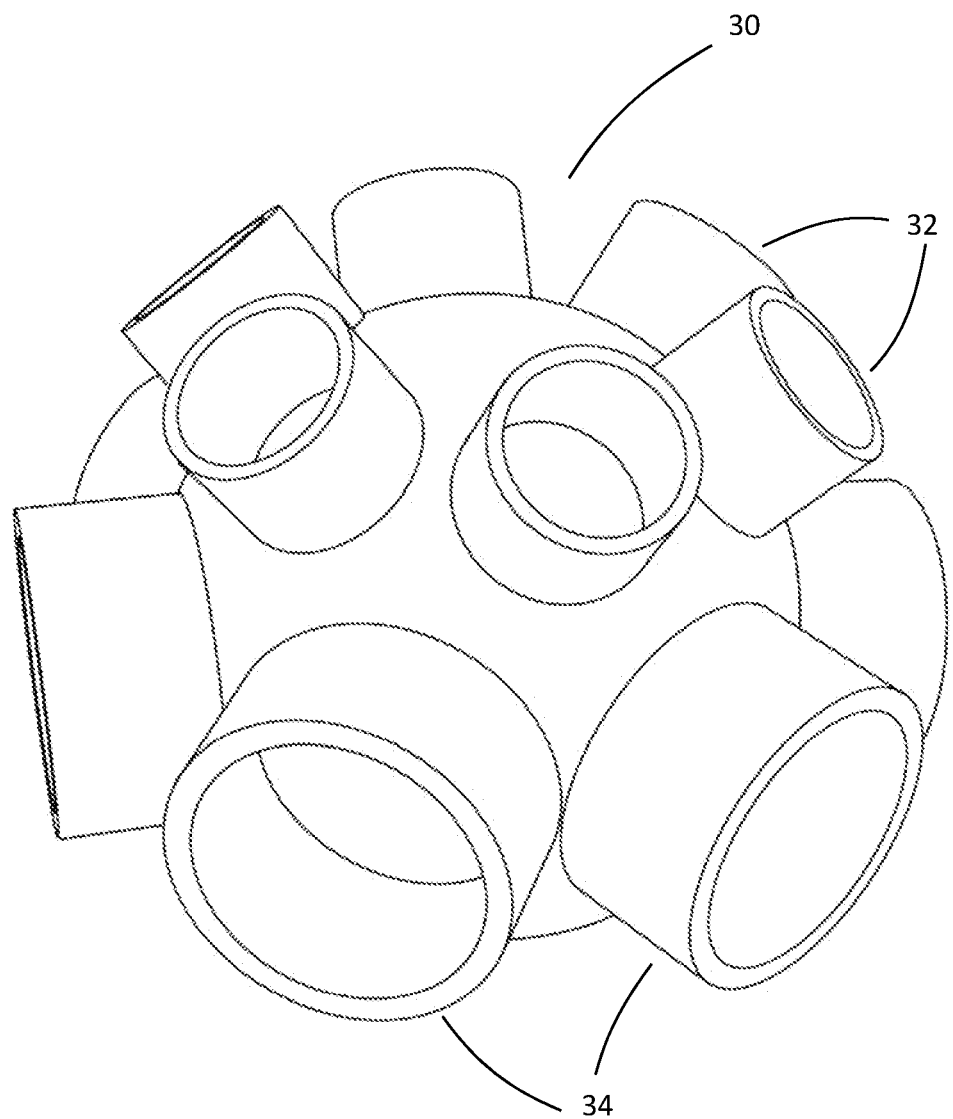
FIG. 16 depicts a hub with six slots for inner struts and six slots for outer struts in accordance with an embodiment.

In an embodiment, components of the structure such as the hubs, connectors, struts, and caps are made using an additive manufacturing method, such as selective laser sintering or 3D printing. FIG. 16 depicts an example of hub 30 at one of the vertices of the inner polyhedron according to an embodiment. The hub has six slots 32 to attach to the outer struts and six slots 34 to attach to wider inner struts. The strut tubes are slotted into the slots of the hub. The orientation of each slot for each vertex can be calculated from the positions of the neighboring vertices of the inner and outer polyhedra. In addition to 12-legged hub there are also twelve 10-legged hubs at each vertex of the base icosahedron and 3-legged hubs that connect the outer struts at the outward pointing vertex of each tetrahedron. In an embodiment, the struts are cemented to the slots by adhesive. For the embodiments with an inside polyhedron, the hubs have more slots. In some embodiments, there can be hubs with other number of legs equal to the number of struts connected to the hub.

In an embodiment the strut tube walls are selected to be relatively thin so that the struts are light but still relatively stiff. The ratio of the inner to outer diameter of the tube is defined by the variable y. Tubes of carbon fiber composite with y value in the range of as high as 0.97 are commercially available but it is also possible that tubes with higher values can be fabricated.

The material of the caps includes carbon fiber composite, aluminum but can also be made out of sheet materials such as polymer film, such as polyester film. The caps can be manufactured from a polymer or a fiber composite. In an embodiment, the material of the skin has high tensile strength such as including but not limited to polymeric materials, composite materials, ceramics, glasses and metallic materials and can include polyester film materials, biaxially-oriented polyethylene terephthalate and aromatic polyamides, such as poly-paraphenylene terephthalamide. In and embodiment, the outer polyhedron faces are covered with rigid plates. In an embodiment, the skin is made of an adhesive backed film. In an embodiment, the adhesive is heat activated.

The skin panels and strips are attached to each other and the tape by coupling methods. The coupling methods may be a variety of techniques such as but not limited to the following: adhesive coupling, including contact and heat-activated, mechanical fastening, welding, bonding, etc.

Design Formulas

In order to design embodiments of the vacuum balloon to lift a certain desired weight, several factors including the type of inner polyhedron, type of strut material, length and diameter of struts, ratio of inner to outer tube diameter, ratio of inner strut to outer strut diameter can be determined. One approach is to solve the forces in each strut for each embodiment and so select the embodiment for which the struts are not so long that they buckle and not so short that the structure is too heavy. Assumptions can be introduced that simplify the problem to the point where analytical solutions are possible. This is started by treating the triangulation T as a continuous variable. The triangular faces and tetrahedra are then assumed to have approximately the same edge length, L. Design formulas are then developed based on force balances at the vertices of the inner and outer polyhedra, and expressed them in terms of T. This is advantageous because when the formulas are solved, the output is the value of T needed for the vacuum balloon to lift a certain desired weight. This value of T is then used to select the type of inner and outer polyhedra of the vacuum balloon.

Starting with embodiments where the inner polyhedron is based on an icosahedron, the variable C is defined as the ratio of the radius of the sphere circumscribing the inner polyhedron, r, to the inner strut length L and express an approximate relation below for C in terms of triangulation, T, $$\frac{r}{L} = C \cong \sqrt{\frac{5\sqrt{3}}{4\pi}} \sqrt{T} \cong 0.83\sqrt{T} \tag{1}$$

In an embodiment, the average length of the outer struts is similar to the average length, L, of the inner struts. Then, each vertex of the outer polyhedron is positioned approximately a height $\sqrt{2/3}$ L above the corresponding triangular face of the inner polyhedron. The assumption can be made that the outer strut lengths are equal to L. A similar method can be used for cases where the outer polyhedron vertices are at a different height above the inner polyhedron faces when the outer struts lengths are different from L.

The radius of the outer polyhedron, R, is a function of the triangulation number, T, and given by the approximate relation:

$$\frac{R}{L} \cong f = \sqrt{\frac{5\sqrt{3}}{4\pi}T - \frac{1}{3}} + \sqrt{\frac{2}{3}} \tag{2}$$

To avoid strut buckling, the compressive force on each strut should be less than Euler's critical buckling force. This critical force decreases with increasing strut length and is used to determine strut length for a given load. Then it can be shown that the minimum length L at which buckling occurs is given by the approximate relation:

$$\left(\frac{L}{d}\right)^4 \cong \frac{5\pi^2\sqrt{3}}{32} Eeff \frac{H\sqrt{T}}{f^2} \tag{3}$$

where the effective modulus, $E_{eff}$, is defined by $$Eeff \equiv \frac{E(1-y^4)}{k^2} \tag{4}$$

d is the outer diameter of the inner struts and y is the ratio of the strut inner diameter to outer diameter. E is defined as the dimensionless ratio of the Young's Modulus, $E_s$, of the strut material to the atmospheric pressure, $P_{atm}$, i.e., $E=E_s/P_{atm}$. Here it is assumed that the outer polyhedron is perfectly evacuated so that the pressure differential is $P_{atm}$. In an embodiment the outer polyhedron is partially evacuated. The equations can include partial evacuation by substituting $P_{atm}$ with the pressure differential when the vacuum balloon is partially evacuated. In an embodiment, the struts are comprised of carbon fiber composite. For carbon fiber composite struts and atmospheric pressure at standard conditions, Es is approximately in the range 100 GPa to 1,000 GPa. k is the effective length factor, which is in the range 0.65 to 1.2 depending on how the struts are attached to the struts. A value of k in the range 0.6 to 1.2 can be used.

H is a dimensionless function of T that is related to the orientation of struts. H approaches 1 as T increases and is given by the approximate relation:

$$H \cong \sqrt{1 - \frac{1}{4C^2}} + \frac{1}{2C}\tan\left[2.186 - \cos^{-1}\left(\frac{1}{C\sqrt{3}}\right)\right] \tag{5}$$

Figure 12:
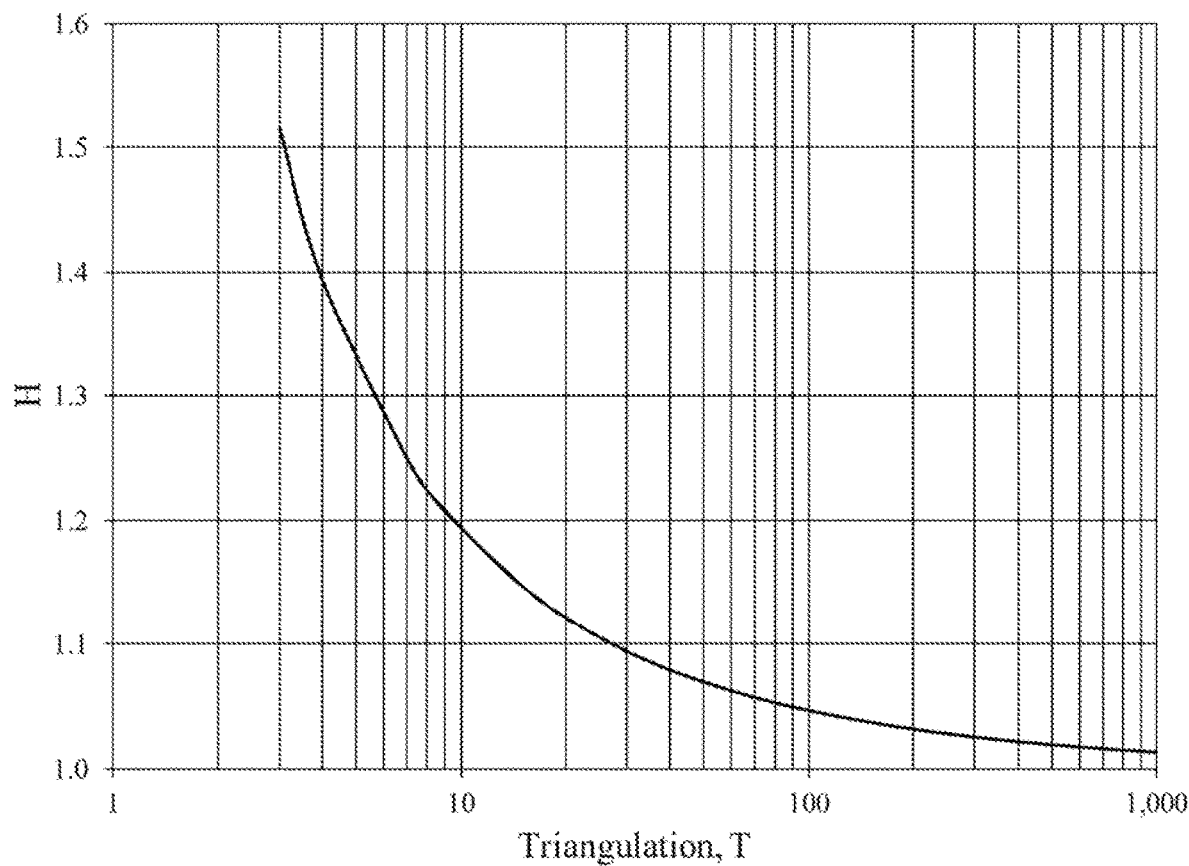
FIG. 12 depicts the formula for H as a function of triangulation number T in accordance with an embodiment.

FIG. 12 shows how H varies with T.

The total weight, W, of the struts is calculated from the number of struts, the strut lengths, the strut diameters, the strut cross-sectional profile, and the density, $\rho_s$, of the material of the struts. As an example, for struts made of carbon fiber composite, the density, $\rho_s$, is approximately 1,600 to 2,000 kg/m³. With gravitational acceleration given by g, W is given by the equation:

$$\frac{W}{d^3\rho_s g} = \frac{15\pi}{2}(1 + 2Z^2)\left(\frac{L}{d}\right)T(1-y^2) \tag{6}$$

Here Z is the ratio of the diameter of the outer struts to the diameter of the inner struts. This ratio Z can be set to 1 for the case of the same diameter for the inner and outer struts. The ratio Z can also be less than 1 and allowed to vary with T in order to improve the design by reducing the weight of the outer struts. This is possible because the forces on the outer struts become relatively less than the forces on the inner struts as T increases. Euler's critical strut buckling relation is applied to ensure that the diameter of the outer struts is sufficient to avoid strut buckling. Using this criterion, Z follows the approximate relation:

$$Z \cong \frac{H^{1/4}}{2^{1/8}} T^{-1/8} \tag{7}$$

Figure 13:
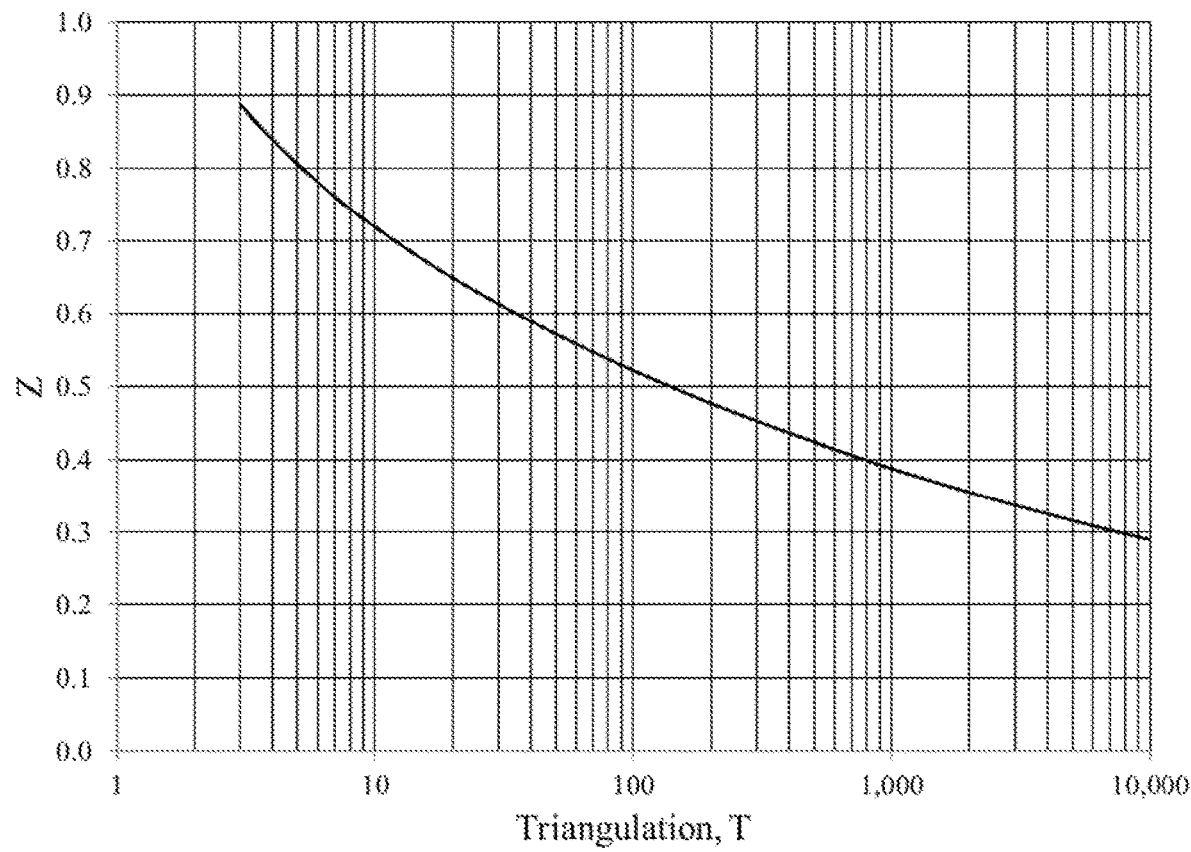
FIG. 13 depicts the formula for Z as a function of triangulation number T in accordance with an embodiment.

Equation (7) shows that the relative diameter of the outer struts can be decreased as T increases and is independent of atmospheric conditions, material properties, and y. FIG. 13 shows how Z varies with T according to the above formula. It is advantageous to use Equation (7) for the diameter of the outer struts according to an embodiment because then the total strut weight decreases. In an embodiment, the outer struts have a smaller diameter than the inner struts.

The buoyancy, B, achieved if the air is completely evacuated from the structure is equal to the weight of air in the volume of the outer polyhedron, multiplied by a discount factor to take into account that the volume of a circumscribed polyhedron is less than the volume of the circumscribing sphere. The discount factor also accounts for an approximation to the deformation of the skin at each face of the outer polyhedron when under load. The effect of the discount factor decreases as T increases. Then buoyancy B is given approximately by the relation:

$$\frac{B}{d^3\rho_s g} \cong (2e^{-0.427/T} - 1)\frac{4\pi}{3\rho}\left(\frac{L}{d}\right)^3 f^3 \tag{8}$$

where $\rho=\rho s/\rho atm$ is defined as the ratio of strut material density to the density of the atmosphere, $\rho atm$. Here, it is assumed that the volume is perfectly evacuated. The equations can include partial evacuation by substituting patm with the density difference between the inside and outside of the vacuum balloon.

Figure 17:
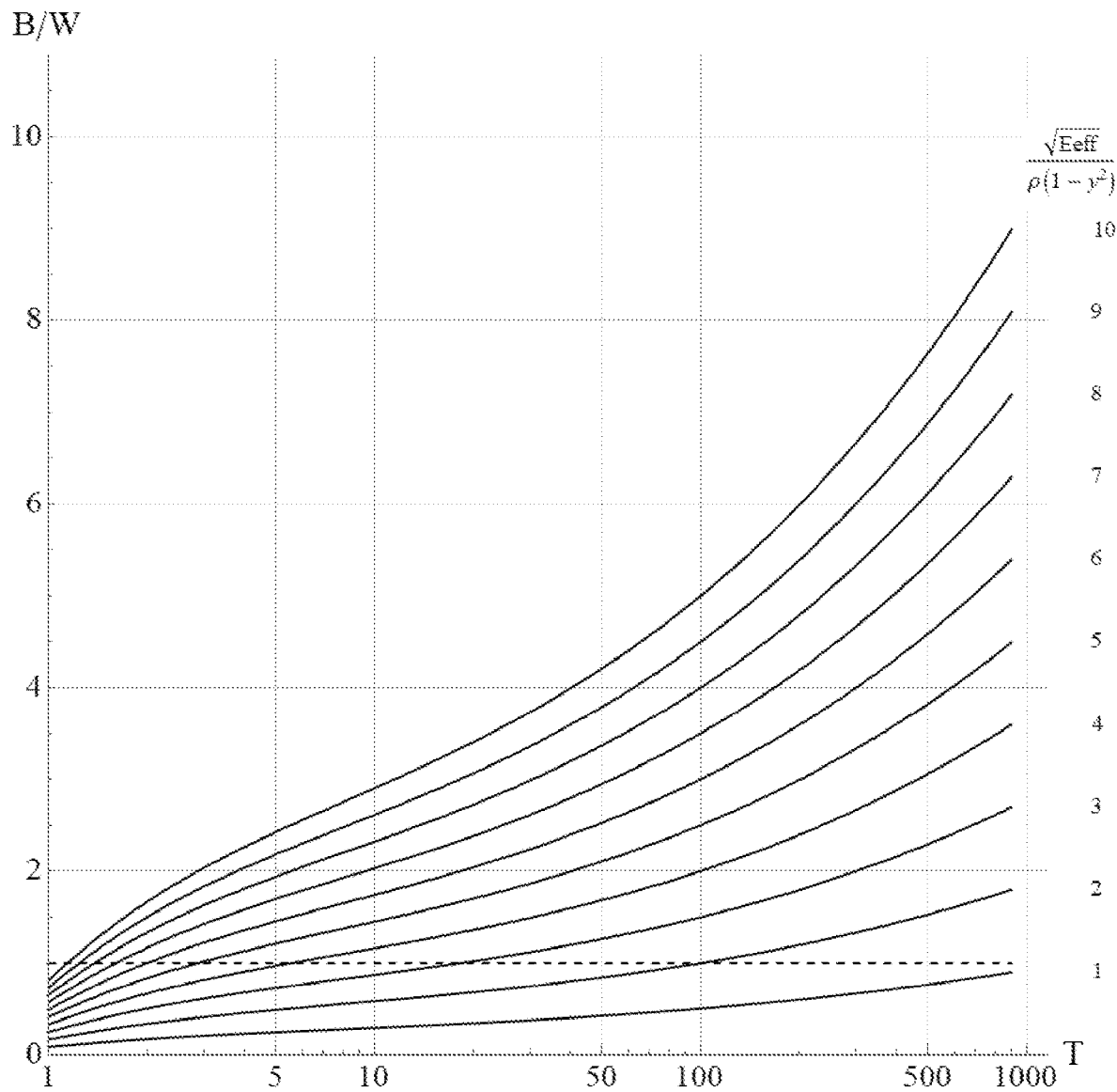
FIG. 17 depicts a series of curves describing how efficiency B/W varies with triangulation number T and strut properties.

Lift is achieved when B is greater than the total weight, W, of the structure including the weight of the struts and the weight of the hubs, caps, tape and skin plus $W_{cargo}$, the weight of cargo. A buoyancy efficiency is defined as the ratio of B to W, i.e., B/W. Note that the B/W is proportional to the factor $\sqrt{Eeff/(\rho/(1-y^2))}$. FIG. 17 depicts the buoyancy efficiency B/W as a function of T for a range of values for $\sqrt{Eeff/(\rho/(1-y^2))}$, as indicated by the number next to each curve. Positive buoyancy occurs when B/W>1.

From FIG. 12, for large T, H is approximately 1 and the average inner strut length L follows the approximate relation, $$L/d \cong \left(\frac{\pi}{2}\right)^{3/4} Eeff^{1/4} T^{-1/8} \tag{9}$$

The variable Z is described by the approximate relation:

$$Z = 2^{-1/8} T^{-1/8} \tag{10}$$

The radius of the outer polyhedron R follows the approximate relation, $$R/d \cong \frac{1}{2}\sqrt{\frac{5}{2}\sqrt{\frac{3\pi}{2}}} \, Eeff^{1/4} T^{3/8} \tag{11}$$

The weight of struts follows the approximate relation:

$$\frac{W}{d^3 \rho s g} \cong 15\left(\frac{\pi}{2}\right)^{7/4} (1-y^2) Eeff^{1/4} T^{7/8} \tag{12}$$

The buoyancy of the outer polyhedron follows the approximate relation, $$\frac{B}{d^3 \rho s g} \cong \frac{5\pi^{7/4}}{8} \sqrt{\frac{5}{\sqrt{6}}} \frac{Eeff^{3/4}}{\rho} T^{9/8} \tag{13}$$

The buoyancy efficiency follows the relation, $$\frac{B}{W} \cong \frac{1}{6}\sqrt{\frac{5}{2\sqrt{3}}} V_1 T^{1/4} \cong \frac{V_1}{5} T^{1/4} \tag{14}$$

where the dimensionless number $V_1$ is defined by:

$$V_1 \equiv \frac{\sqrt{Eeff}}{\rho(1-y^2)} \tag{15}$$

Then the efficiency is given in terms of the dimensionless radius of the outer polyhedron, R/d, $$B/W \cong \frac{1}{3 \cdot 2^{1/3} \cdot 3^{5/12}} \left(\frac{5}{\pi}\right)^{1/6} \frac{Eeff^{1/3}}{\rho(1-y^2)} \left(\frac{R}{d}\right)^{2/3} \cong \left(\frac{V_2}{13}\frac{R}{d}\right)^{2/3} \tag{16}$$

where $V_2$ is defined by:

$$V_2 \equiv \sqrt{\frac{Eeff}{\rho^3 (1-y^2)^3}} \tag{17}$$

The buoyancy efficiency increases to the ⅔rd power of the radius of the outer polyhedron in accordance with an embodiment.

It is interesting that during the above derivation a very close approximation for π was found:
to within 0.0007%.

$$\pi \cong \left(\frac{13}{9}\right)^4 \frac{5}{4\sqrt{3}} \tag{18}$$

For positive buoyancy to occur, B>W. In an embodiment, the diameter d of the inner struts is bounded by the relation, $$d < (V_2/13)R \tag{19}$$

In an embodiment, the struts have a cross-sectional dimension d which is less than (V2/13) R where R is half the maximum dimension of the outer polyhedron.

The above design equations are also applicable to embodiments with spherical inner polyhedra with tetrahedral or octahedral symmetry by replacing T with $T_{tot}/20$, where $T_{tot}$ is the total number of triangular faces. Then for example, Equation (10) becomes:

$$Z \cong 10^{1/8} T_{tot}^{-1/8} \tag{20}$$

and Equation (14) becomes:

$$B/W \cong 0.1 \, V_1 T_{tot}^{1/4} \tag{21}$$

For embodiments where the inner polyhedron is approximately spherical but the vertices (hubs) are not symmetrically distributed, the design equations are also applicable by replacing T with $T_{tot}/20$ in the above equations.

For approximately spherical inner polyhedral, the inner struts can be made to have lengths approximately the same as the average strut length L. It is advantageous to have the maximum strut length $L_{max}$ to be approximately the same as the average length L, that is, within 10% or 6% or 5% or 4% or 3% or 2% of the average length L. A safety factor can be included in the design equation to take into account the lower critical buckling force for longer struts. For example, $E_{eff}$ can be used to take this effect into account. Because L/D is proportional to $Es^{1/4}$, Equation (4) is then replaced by:

$$Eeff = \frac{E(1-y^4)}{(Lmax/L)^4 k^2} \tag{22}$$

In another embodiment, the struts that are of length greater than L have slightly higher diameter or y value than struts with length L.

In an embodiment the vertices of the inner polyhedron are repositioned so as to reduce the maximum strut length. In this repositioning process, the locations of the vertices are kept on the circumscribing sphere of the inner polyhedron. In an embodiment the maximum inner strut length is within 5% of L.

In an embodiment, the strut material is orthotropic and has a lower Young's modulus perpendicular to the long strut axis than the Young's modulus along the long axis. In an embodiment, B/W is less than that predicted by the Equations (14), (16), and (21) above due to the effect of shearing forces on the critical buckling load of the struts.

Method for Selecting Geometry

Figure 14:
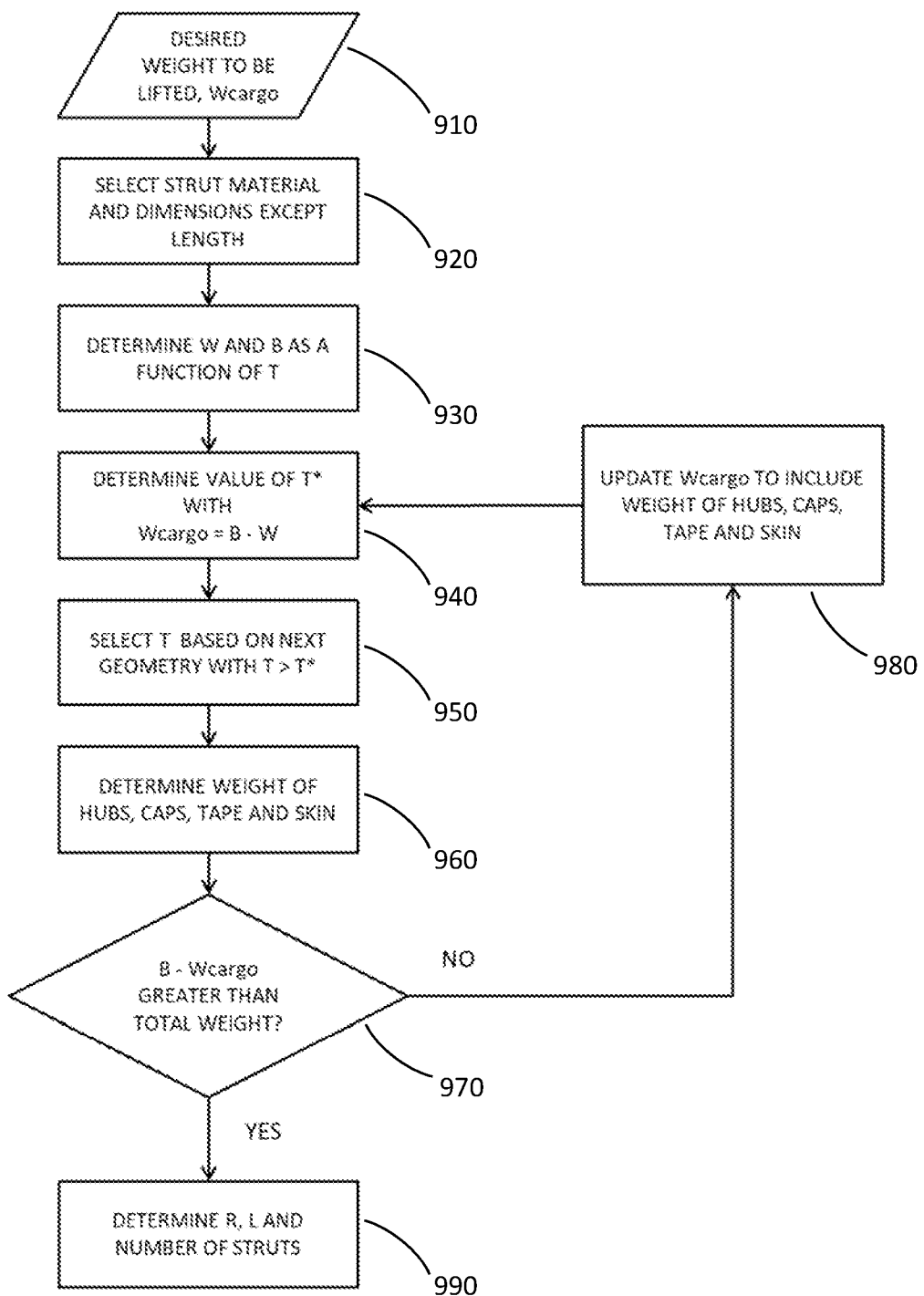
FIG. 14 depicts a method for applying the design formulas in accordance with an embodiment.

In some embodiments, a method shown in FIG. 14 is used to select the geometry of the vacuum balloon to lift a certain desired cargo weight, $W_{cargo}$. This desired weight can also include the weight of anything other than the structure of the vacuum balloon and can include but is not limited to the vacuum pump and attached lines and valves, cargo, propulsion system, people, superstructure, etc. After receiving input $W_{cargo}$ in step 910, the strut material is chosen in step 920 with high Young's modulus, $E_s$, high compressive strength, and low density, $\rho s$. In order to introduce a safety factor into the strut buckling calculation, the value for Es used in the design formulas is set to be less than the actual Es of the material. A tube cross-section is chosen with a large diameter, d, and a tube wall is chosen giving a value for y.

In Step 930, the weight of struts W and the buoyancy B are calculated as a function of T by using the relations worked out above. In Step 940, the value of T for which $W_{cargo}$=B−W is determined and is designated T*. In Step 950, the inner polyhedron is selected with a T value that is greater than or equal to the T* obtained in Step 940.

In Step 960, the total weight from the hubs, caps, tape, and skin, is determined from the geometry selected in Step 950. By step 970, if B−$W_{cargo}$ is greater than the total weight, then the desired lift is achieved. If B−$W_{cargo}$ is less than the total weight then greater buoyancy is needed. In Step 980, the desired $W_{cargo}$ value is updated to include the weight of the hubs, caps, tape and skin and Steps 940, 950, 960 and 970 are repeated. Once B−$W_{cargo}$ is greater than the total weight, design parameters such as the radius, R, of the outer polyhedron, strut lengths and number of struts are calculated from the above relations and using TABLE I.

EXAMPLE 1

Figure 15:
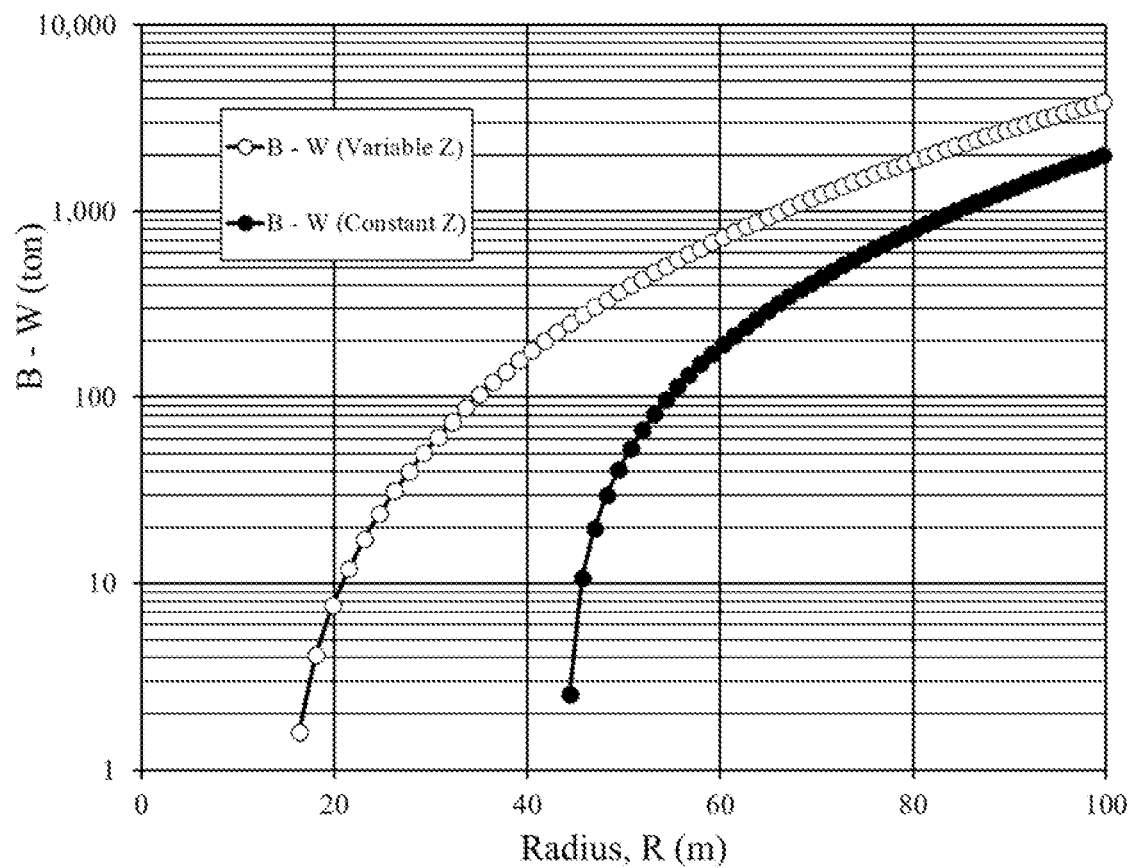
FIG. 15 depicts the curves for the functions for buoyancy minus strut weight (B-W) for the Constant Z and Variable Z cases in accordance with an embodiment.

The desired weight $W_{cargo}$ to be lifted is 5 tons times gravitational acceleration, g. For brevity, g is implied but left out in what follows. Carbon fiber composite tubes with outer diameter 0.127 m (5 inch) are selected for the inner struts. Es is 200 GPa (including a safety factor) and $\rho_s$ is 1,600 kg/m$^3$. k is 1.2. The ratio y of the inner to outer tube diameter is 0.90. With these strut properties, FIG. 15 shows the calculated lift (i.e., B−W) in tons as a function of outer polyhedron radius, R. Two curves are shown, one with Z=1 (Constant Z), and one curve (Variable Z) where the value of Z was allowed to vary according to Equation (7) so as to reduce outer strut diameter relative to inner strut diameter. It can be seen that the Variable Z case has higher values of B/W. After solving the design formulas, the value T* was found, and a triangulation number T=64, and the inner polyhedron given by the symbol {3,5+}(8,0) were selected. This results in B−W=7.6 ton which is sufficient to provide the desired lift and include margin for the hubs, caps, tape and skin. The average strut length, L, is 2.7 m resulting in a radius of 20 m for the outer polyhedron. The ratio of outer strut diameter to inner strut diameter, Z, is 0.55, and H is 1.06. The total number of struts is 5,760. The efficiency, B/W=1.24.

If Z was set to 1 then B−W<0, resulting in no lift.

EXAMPLE 2

The desired weight to be lifted is 80 ton. The same carbon fiber composite material, tube diameter and ratio y of inner to outer tube diameter as in Example 1 is selected. A triangulation number of T=400 and the inner polyhedron given by the symbol {3,5+}(20,0) were selected. This choice results in B−W=138 ton, sufficient to provide the desired lift and include margin for the desired lift plus the hubs, caps, tape, and skin. The average strut length L is 2.2 m resulting in a radius of 38 m for the outer polyhedron. The ratio of outer strut diameter to inner strut diameter, Z, is 0.44, and H is 1.02. The total number of struts is 36,000. The buoyancy efficiency, B/W=1.99.

If Z was set to 1 then B−W<0, resulting in no lift.

EXAMPLE 3

The desired weight to be lifted is 20 ton. High modulus carbon fiber composite tubes with outer diameter 0.127 m (5 inch) are selected for the inner struts. $E_s$ is 405 GPa and $\rho_s$ is 1,600 kg/m$^3$. k is 1.2. The ratio y of the inner to outer tube diameter is 0.95. A triangulation number of T=100 and the inner polyhedron given by the symbol {3,5+}(10,0) were selected. This choice results in B−W=43 ton, sufficient to provide the desired lift and include margin for the desired lift plus the hubs, caps, tape, and skin. The average strut length L is 2.6 m resulting in a radius of 24 m for the outer polyhedron. The ratio of outer strut diameter to inner strut diameter, Z, is 0.52, and H is 1.05. The total number of struts is 9,000. The buoyancy efficiency, B/W=2.82.

The results from the examples are summarized in TABLE II.

TABLE II

| | Summary of Examples | | |
|---|---|---|---|
| | Example 1 | Example 2 | Example 3 |
| $E_s$ (GPa) | 200 | 200 | 405 |
| $E_{eff}$ (×10$^6$) | 0.47 | 0.47 | 0.52 |
| $V_1$ | 2.77 | 2.77 | 5.64 |
| $V_2$ | 0.18 | 0.18 | 0.50 |
| Inner Polyhedron | (3, 5+}(8, 0) | (3, 5+}(20, 0) | (3, 5+}(10, 0) |
| T | 64 | 400 | 100 |
| Z | 0.55 | 0.44 | 0.52 |
| H | 1.06 | 1.02 | 1.05 |
| L (m) | 2.7 | 2.2 | 2.60 |
| Total Number of Struts | 5760 | 36000 | 9000 |
| R (m) | 20 | 38 | 24 |
| W/g (ton) | 31.8 | 138.4 | 23.8 |
| B/g (ton) | 39.4 | 276.1 | 67.0 |
| (B − W)/g (ton) | 7.6 | 137.6 | 43.4 |
| B/W | 1.24 | 1.99 | 2.82 |

Further Structures Having the Low-Density Structured Materials

As noted above, the use of the low-density structured materials in vacuum balloons is representative of other applications of the low-density structured materials of the present invention.

This is because the low-density structured materials can encompass one or more of the following variations.

Figure 21A:
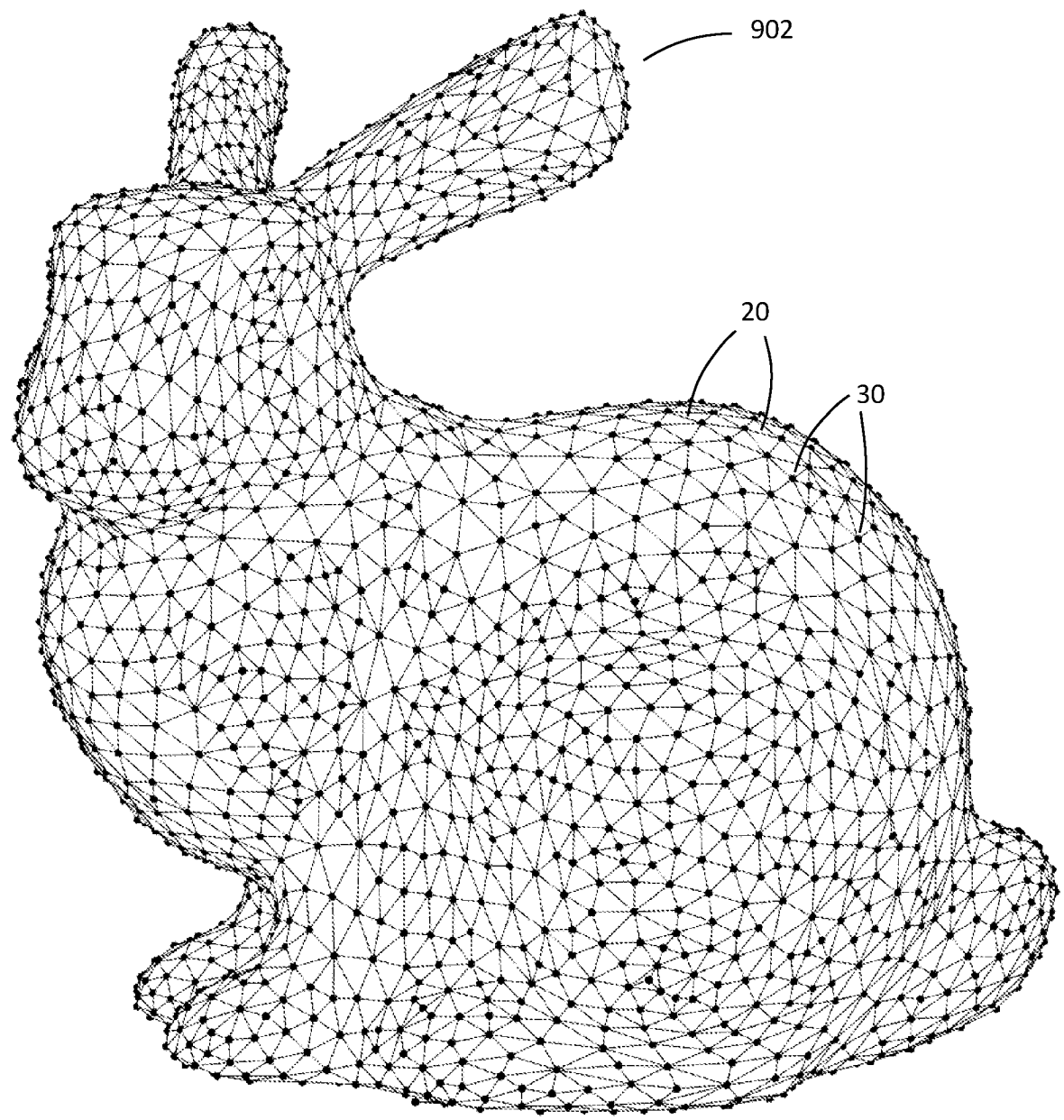
FIG. 21A depicts the inner polyhedron of an embodiment of a structure having the low-density structured material, which structure is a free form shape.
Figure 21B:
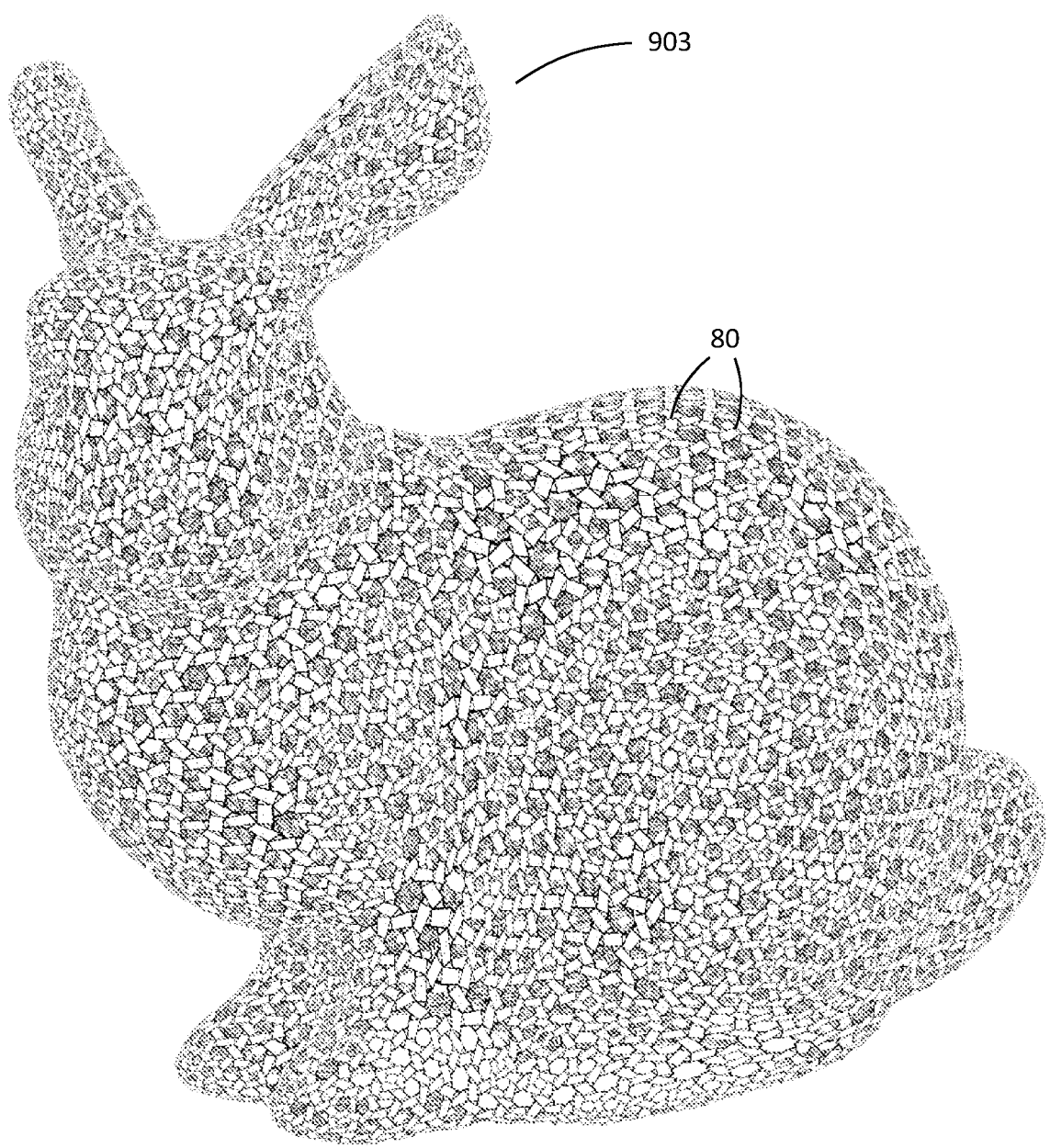
FIG. 21B depicts the outer polyhedron defined by a piece-wise kagome pattern of overlapping panels of an embodiment of a structure having the low-density structured material, which structure is a free form shape.

(a) The structure can have any shape. It can have a regular or freeform shape. The inner polyhedron can be a surface of any shape that can be triangulated with vertices distributed on the surface and with vertices that are interconnected by struts See FIG. 21A (showing struts 20 and vertices 30 of inner polyhedron 902 in the shape of a rabbit). FIG. 21B depicts outer polyhedron 903 generated from the inner polyhedron in the shape of a rabbit. (The shape of the rabbit shown in FIGS.

21A-21B was a modified shape of the "Stanford Bunny," produced by the Stanford Computer Graphics Laboratory). The outer polyhedron is made up of panels 80 attached to each other in a piece-wise kagome pattern. In FIG. 21B, parts of the back of the panels on the rear side are visible through the openings in the kagome pattern. The rear sides of panels are indicated by shading. This shows that the low-density structure can be formed into any shape and that any such shape can be made using a kagome weave. Normally it would be painstaking or virtually impossible to make a woven article such as shown in FIG. 21B, but with the piece-wise attachment of panels around each vertex this becomes possible, In some embodiments, the supporting structure of inner and outer struts and parts of the web of tape are removed after the panels are attached in a piece-wise kagome pattern. This then leaves only the panels in the piece-wise kagome pattern. Such embodiments can for example be used in free-form architecture or to produce art, sculptures or intricate shapes for prosthetic implants.

(b) The low-density structured material can be formed into freeform shapes in a variety of ways. One method uses the following steps:
  (1) Define the surface of a freeform shape.
  (2) Distribute vertices over the surface such that the set of vertices approximates the shape to a desired degree.
  (3) Interconnect the vertices with struts so that all or most of the faces are triangles. This then forms the inner polyhedron.
  (4) Attach outer struts to form tetrahedra at triangular faces. These can point inward, outward or there can be on both sides of the triangular faces so that there are tetrahedra pointing inward and outward from the inner polyhedron surface.
  (5) Interconnect the vertices of the tetrahedra with tape or long strips or panels of skin material to form a web that defines the outer polyhedron. If there are tetrahedra pointing both inward and outward then there can be separate webs and outer polyhedra.
  (6) Attach panels of skin material to the web. In some embodiments the skin panels are arranged piece-wise in a kagome pattern. In some embodiments, panels are attached to close off the holes in the three-way pattern. In some embodiments, sections of tape or strips of skin material forming the web are not covered by skin panels. In some embodiments, these sections of taper are removed. The means of attachment can include adhesives, mechanical fasteners, etc.

(c) For some embodiments such as the vacuum balloon, it is preferred that the struts of the inner polyhedron are approximately the same length, L. For some embodiments, there may be a variety of inner strut lengths which vary greatly from one another.

(d) For some embodiments, it is preferred to have approximately the same strut length for the outer struts. For some embodiments, there are a variety of outer strut lengths which vary greatly from one another. The positions of the vertices of the outer polyhedron can be dictated by factors such as minimizing variability of the faces of the outer polyhedron or to make the faces approximately flat.

Figure 22A:
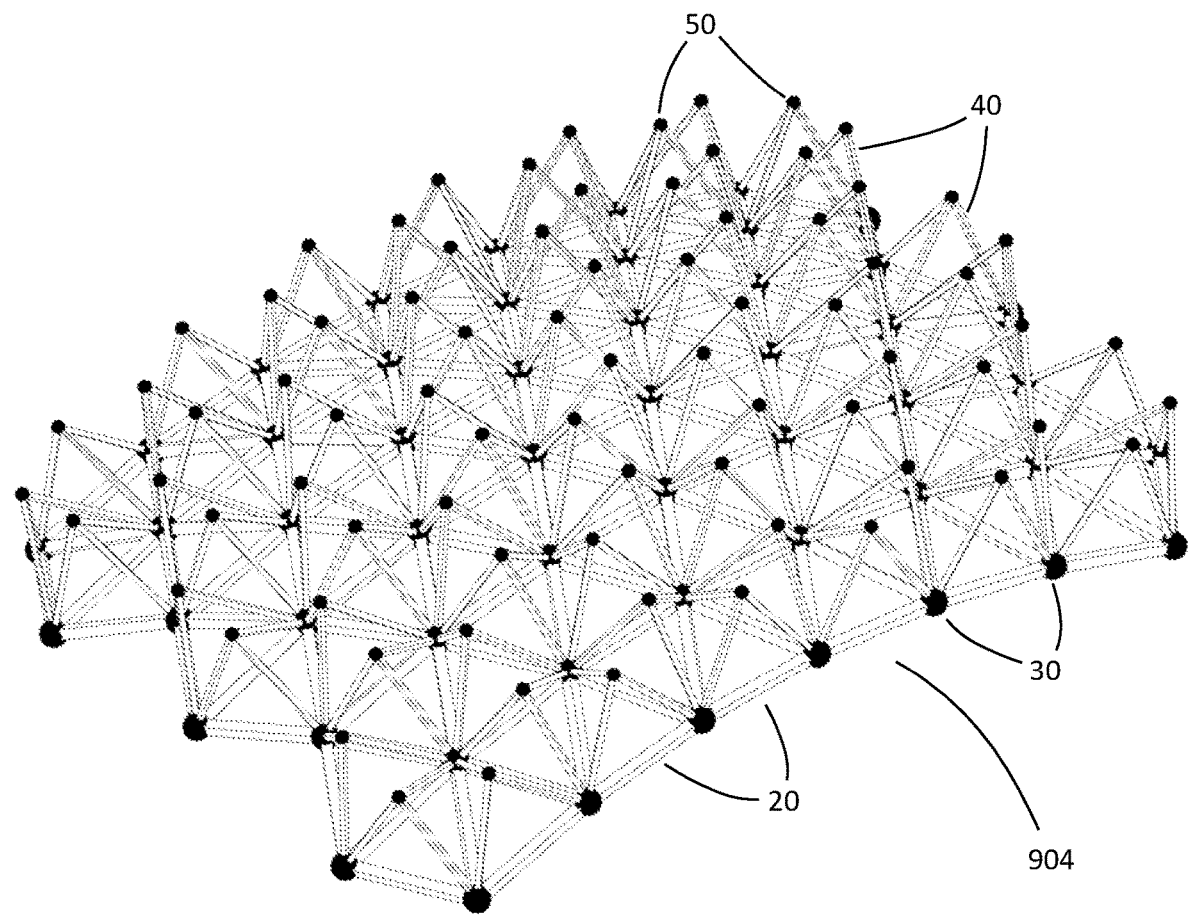
FIG. 22A depicts the inner and outer struts of an embodiment of a structure having the low-density structured material, which structure is a sheet.
Figure 22B:
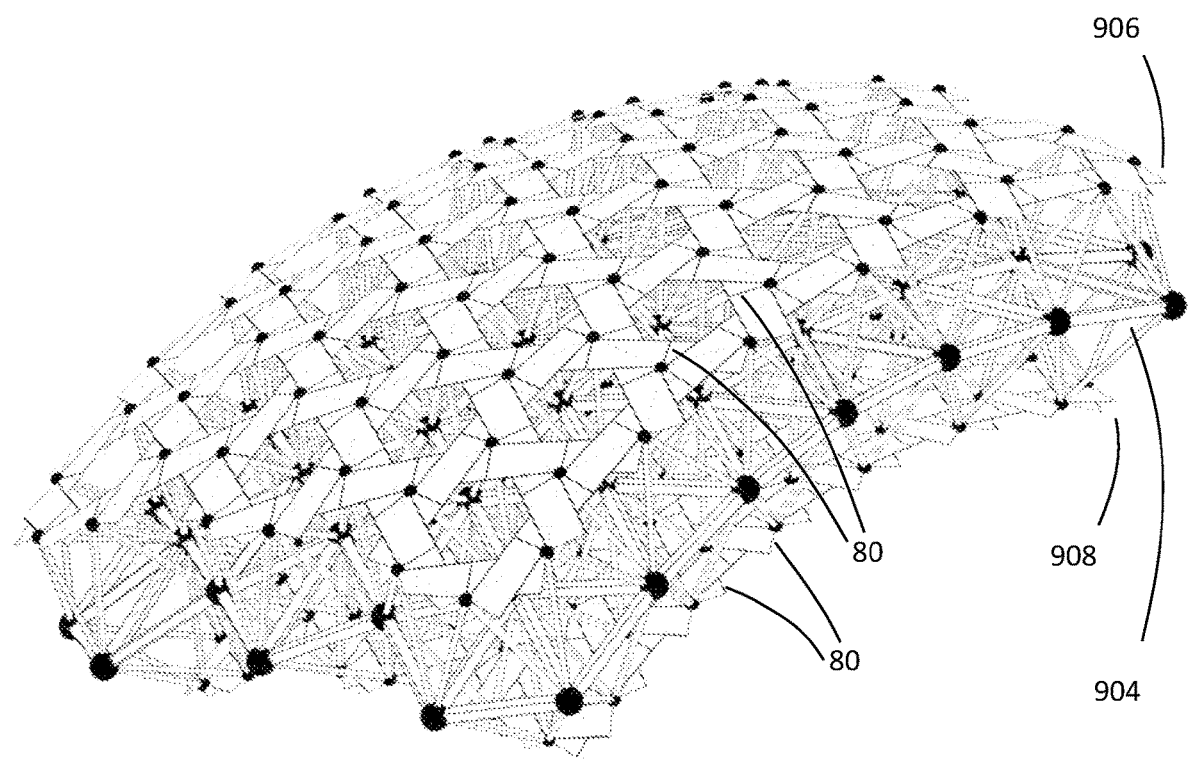
FIG. 22B depicts the surface of inner struts and layers of outer struts on both sides of the surface of inner struts with panels attached in a piece-wise kagome pattern.
Figure 22C:
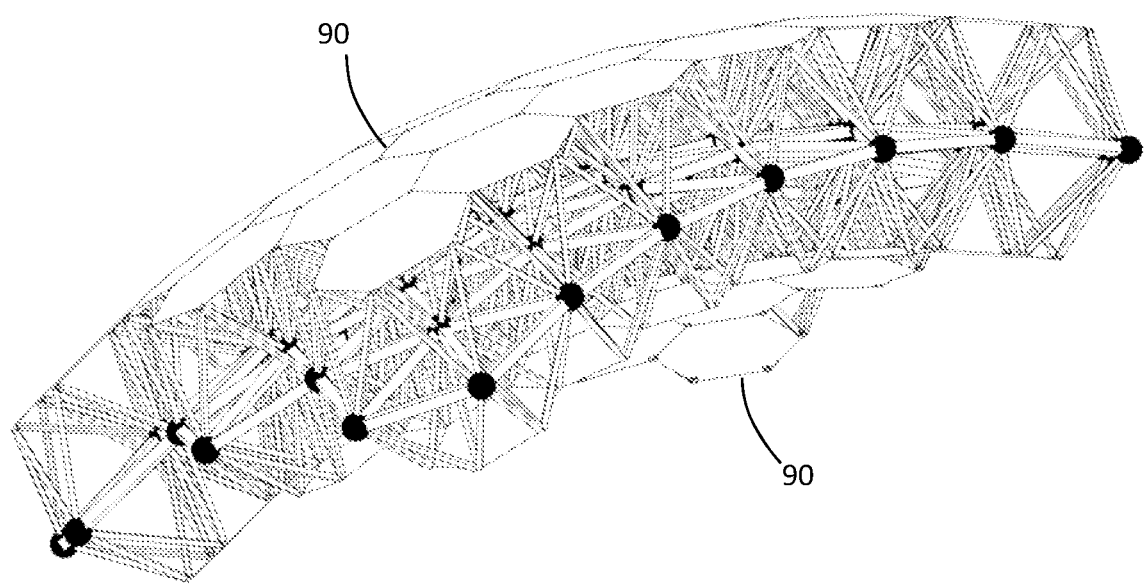
FIG. 22C depicts additional panels covering the openings of the kagome pattern.

(e) The low-density structured materials do not have to enclose a volume and/or do not need air to be removed. For instance, the low-density structured material can be a sheet. See FIG. 22A (showing the inner struts 20 and outer struts 40 on one side to define sheet of structured material). The inner struts 20 define edges of the inner polyhedron 904 of the sheet. Outer struts 40 are connected by hubs 50 that define the vertices of the outer polyhedron. For this figure the caps and hubs are indicated by the small spheres. FIG. 22B shows the surface of inner struts forming inner polyhedron 904 and layers of outer struts on both sides of the surface of inner struts with panels 80 attached and overlapping in a piece-wise kagome pattern. Panels 80 define the polygonal faces of the outer polyhedrons 906 and 908 on either side of the inner polyhedron surface. FIG. 22C shows additional panels 90 overlapping panels 80 and covering the openings in the kagome pattern. Low-density structured materials in the form of a sheet can for example be used for light-weight decking for roofs and floors in buildings, spans/decking of bridges, wings of an airplane, blast protection, light-weight panels for automobiles, trains, buses, etc.

Figure 22D:
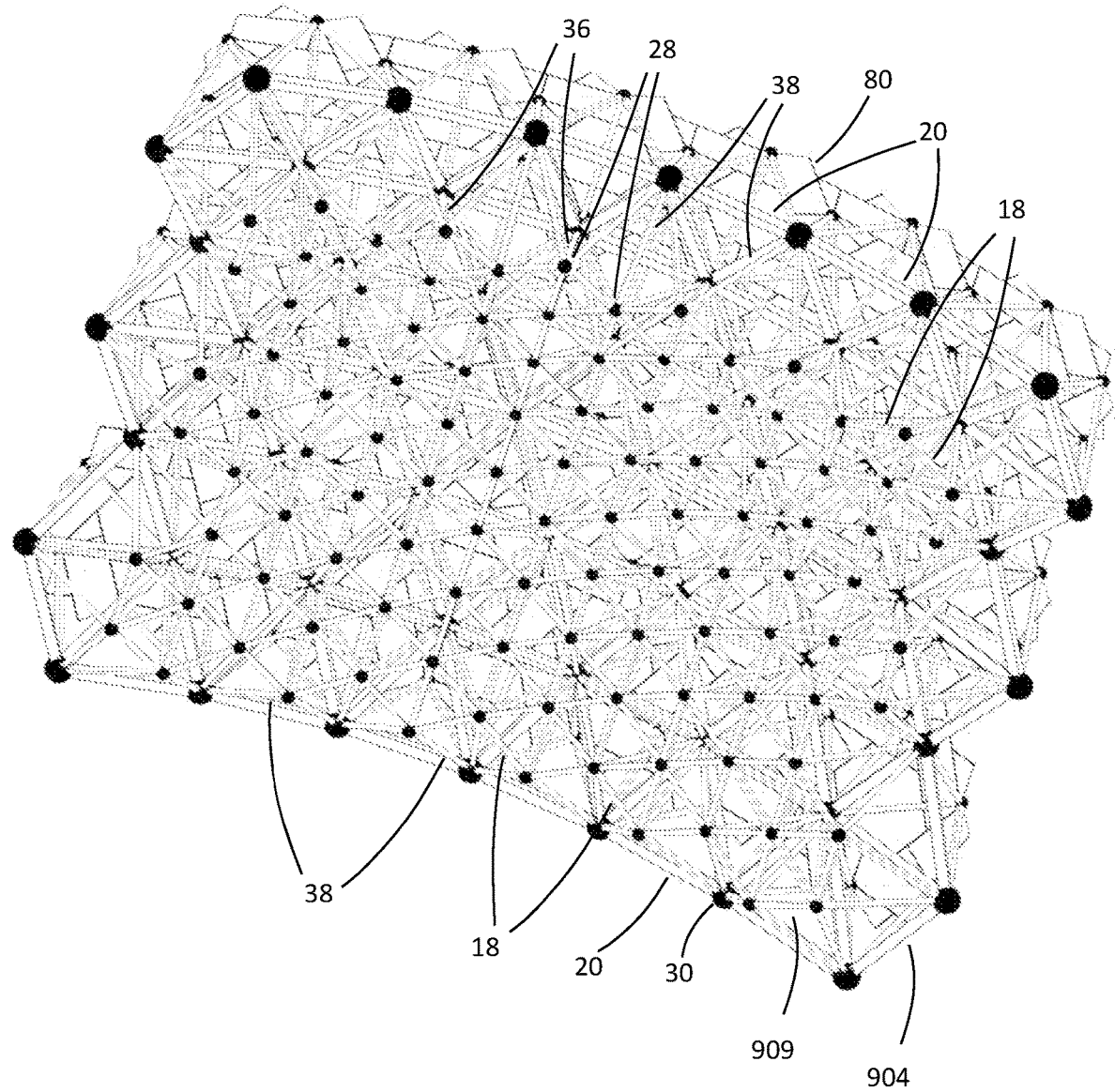
FIG. 22D depicts the sheet with an additional "inside polyhedron" surface of struts.

(f) The low-density structured materials can have an additional "inside" polyhedron surface of inside struts 18, This surface of inside struts is attached to the inner struts 20 by additional struts 36 and 38 that form a layer of tetrahedral arrangements between the inside and inner polyhedrons. FIG. 22D depicts the inside struts 18 and inside vertices 28 defining inside polyhedron 909. Locally, but not at sides of the entire structure, the inside polyhedron can have 3 times the number of faces as the inner polyhedron 904.

Figure 22E:
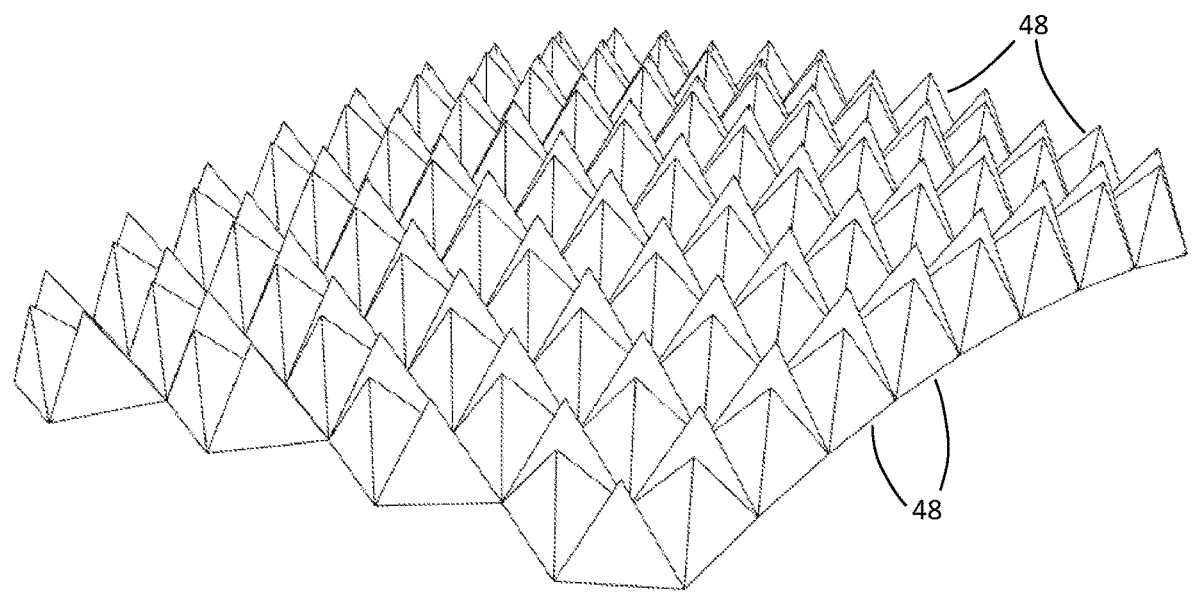
FIG. 22E depicts a structured material in which polygon plates are utilized in lieu of struts (for the surface and for the tetrahedral structures).

(g) The low-density structured materials can be comprised of plates. FIG. 22E depicts a structured material in which polygon plates 48 are utilized in lieu of struts (for the surface and for the tetrahedral structures). Such polygon plates can be triangular. Such polygon plates can be made of a flexible material that can be curved. Such polygon plates can alternatively be a rigid material that is planar or curved depending upon the shape final shape of the structure material.

Figure 23:
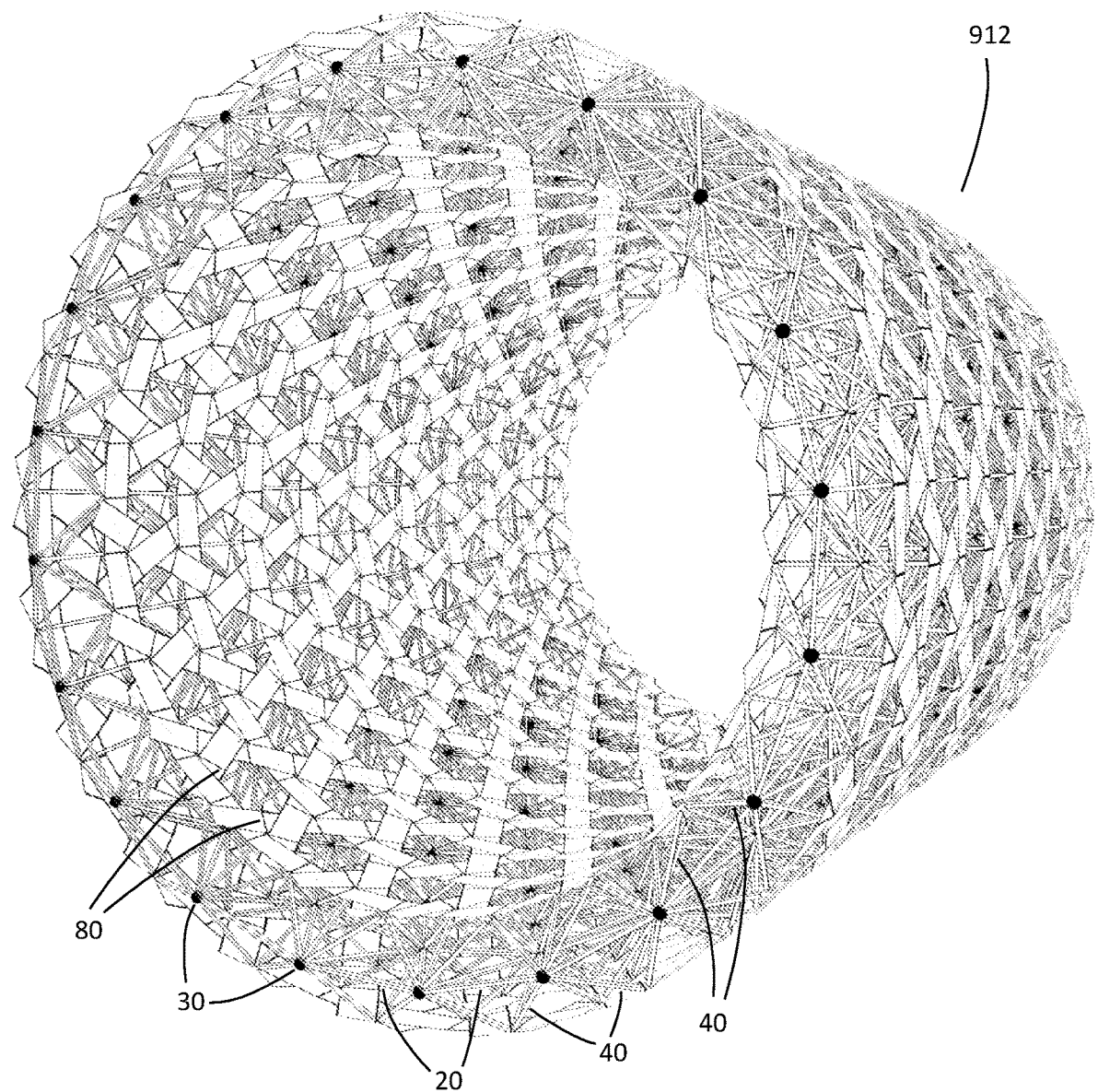
FIG. 23 depicts an embodiment of a structure having the low-density structured material, which structure is part of an airplane fuselage or a section of a tunnel, a tube, or a part of a building.

(h) The structured material can take on many shapes. FIG. 23 depicts the inner polyhedron in the shape of cylinder 912 showing the cylindrical inner polyhedron surface of inner struts 20 connected by hubs 30. The cylinder is constructed of rings of 20 hubs and 20 inner struts connected to form a cylinder. Layers of outer struts 40 on both sides of the surface of inner struts have panels 80 attached in a piece-wise kagome pattern. The panels define the polygonal faces of the cylindrical outer polyhedrons. As can be appreciated the rings in the cylindrical structure can have any number of inner struts. The cylindrical structure can have any number of rings and so can be constructed to any desired length. Low-density structured materials in the form of a cylinder or a tube can for example be used for, airplane fuselages, rocket parts, hulls for a ship, yacht, submarine, towers, building parts, tunnel cladding, low-pressure tubes for a hyperloop, etc.

Figure 24A:
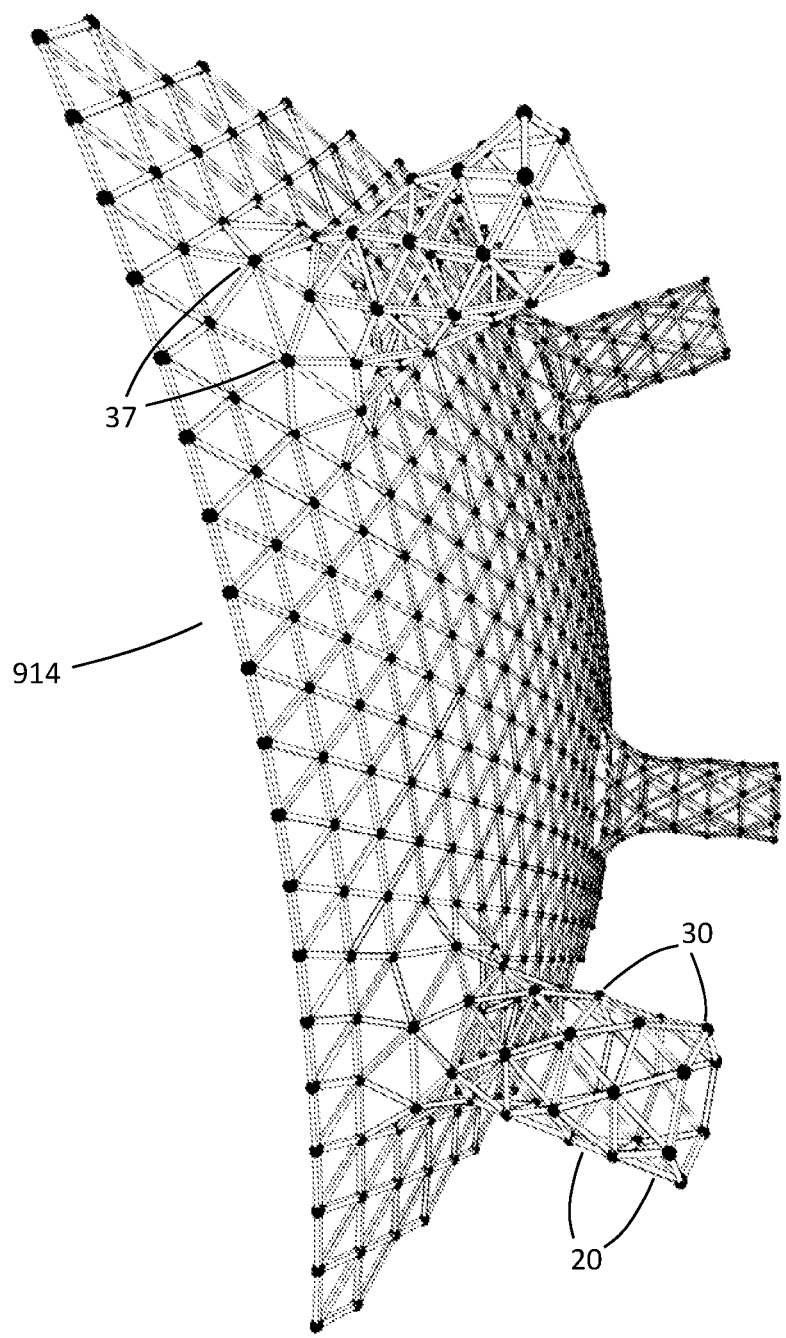
FIGS. 24A-24C depict embodiments of structures having the low-density structured material, which structures each include a plurality of branched volumes.
Figure 24B:
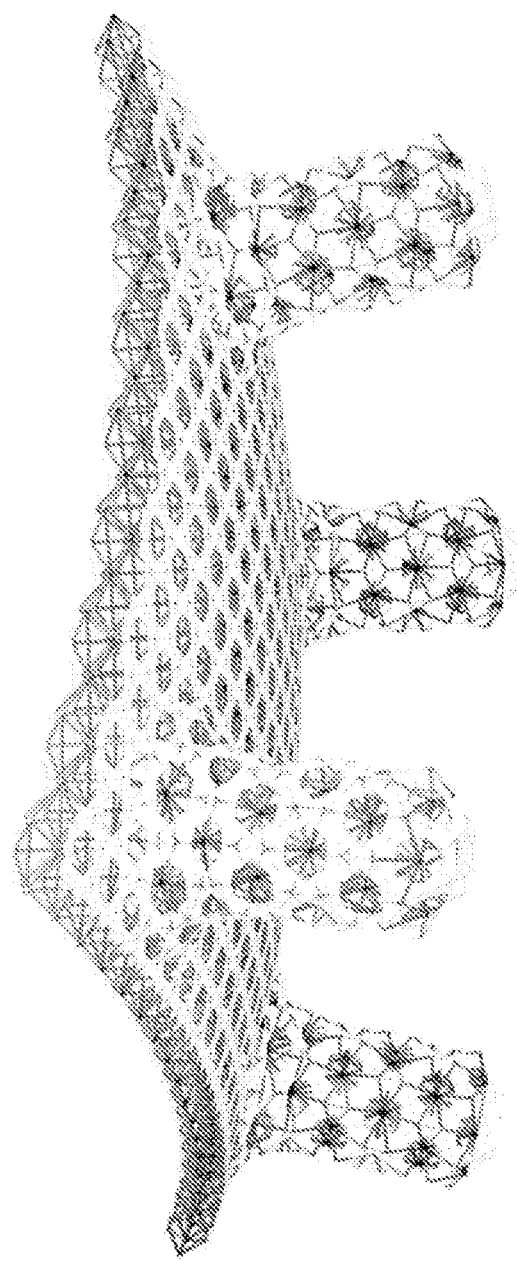
Figure 24C:
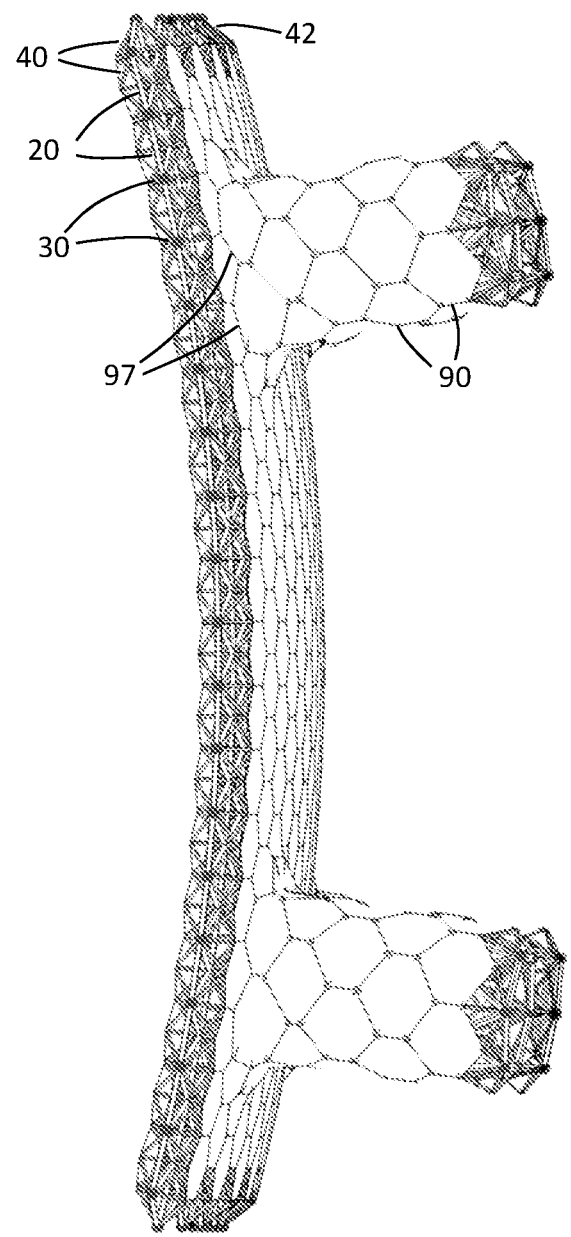

(i) The structure can include a plurality of branches. See FIGS. 24A-24C. FIG. 24A is the inner polyhedron 914 composed of the inner struts 20 interconnected at vertices 30 in the form of a stadium roof with four supports. FIG. 24B is the stadium roof with the outer struts and skin panels attached piece-wise in a kagome weave pattern. Where parts of the inner polyhedron protrude, the vertices of the inner polyhedron can have more than six struts connected and the polygons of the outer polyhedron can have more than six sides. Vertices 37 with seven connected struts (valency 7) are where the supports connect to the roof. These valency 7 vertices occur where protrusions from the roof surface form the connection to the cylindrical branches that form the supports. FIG. 24C shows skin panels 90 covering the outer polyhedron of the stadium structure. Panels 97, which are constructed over the seven-valency 7 vertices, have seven sides.

(j) The structure may have rigid or flexible skin panels.

(k) The three-way skin pattern that can be applied piece-wise to achieve a kagome weave pattern (or without a kagome weave pattern). A kagome weave pattern can be applied to form the outer polyhedron surface of any shape. This is achieved as described above for the vacuum balloon by attaching panels in a piece wise manner with one chirality around each vertex and then with the opposite chirality around the same vertex. This works for regular and freeform shapes, including freeform shapes with branches.

(l) The low-density structured materials may alternatively have inward pointing tetrahedrons with the inner polyhedron on the outside and the outer polyhedron on the inside. The low-density structured materials may have both outward and inward pointing tetrahedrons to form the outer polyhedron on both sides of the inner polyhedron. See FIG. 22B.

(m) The low-density structured materials can have several layers of polyhedrons. For instance, the "inner" polyhedron and "outer" polyhedron as described above can be one in which the "inner" polyhedron is sandwiched between the "outer polyhedron" and a further "inside" polyhedron. See FIG. 19D and FIG. 22D (showing an "inside" polyhedron inside the "inner" polyhedron).

(n) The low-density structured materials can have rigid struts or wire on the inside of the inner polyhedron for increased stability/size. For example, a layer of tetrahedrons pointing inward can be attached to the inner polyhedron. The vertices of these inward pointing tetrahedrons can be attached to each other by means of further struts, tape, or wire.

(o) The low-density structured materials can be 3D printed combined strut and hub structure. The hubs can be 3D printed.

(p) The strut material for the low-density structured materials can include one or more of carbon fiber composite, a polymer fiber composite (such as a poly-paraphenylene terephthalamide fiber composite), aluminum, steel, and combinations thereof.

(q) Different struts can have different material properties (such as, for example a resilient structure having rigid inner struts and flexible outer struts).

(r) The low-density structured materials can have inner polyhedron faces that are mostly triangles.

(s) The low-density structured materials can have can have outer polyhedron faces that are mostly hexagons but can also be triangles, rectangles, pentagons, heptagons, octagons, nonagons, etc.

(t) The method of making the low-density structured materials can include adjusting the positions of the inner polyhedron vertices (hubs) in order to reduce the maximum inner strut length.

(u) The method of making the low-density structured materials can include adjusting the positions of the outer polyhedron vertices in order to smooth out the outer surface in the complicated convex shapes. This can improve strength and aesthetics.

Figure 25:
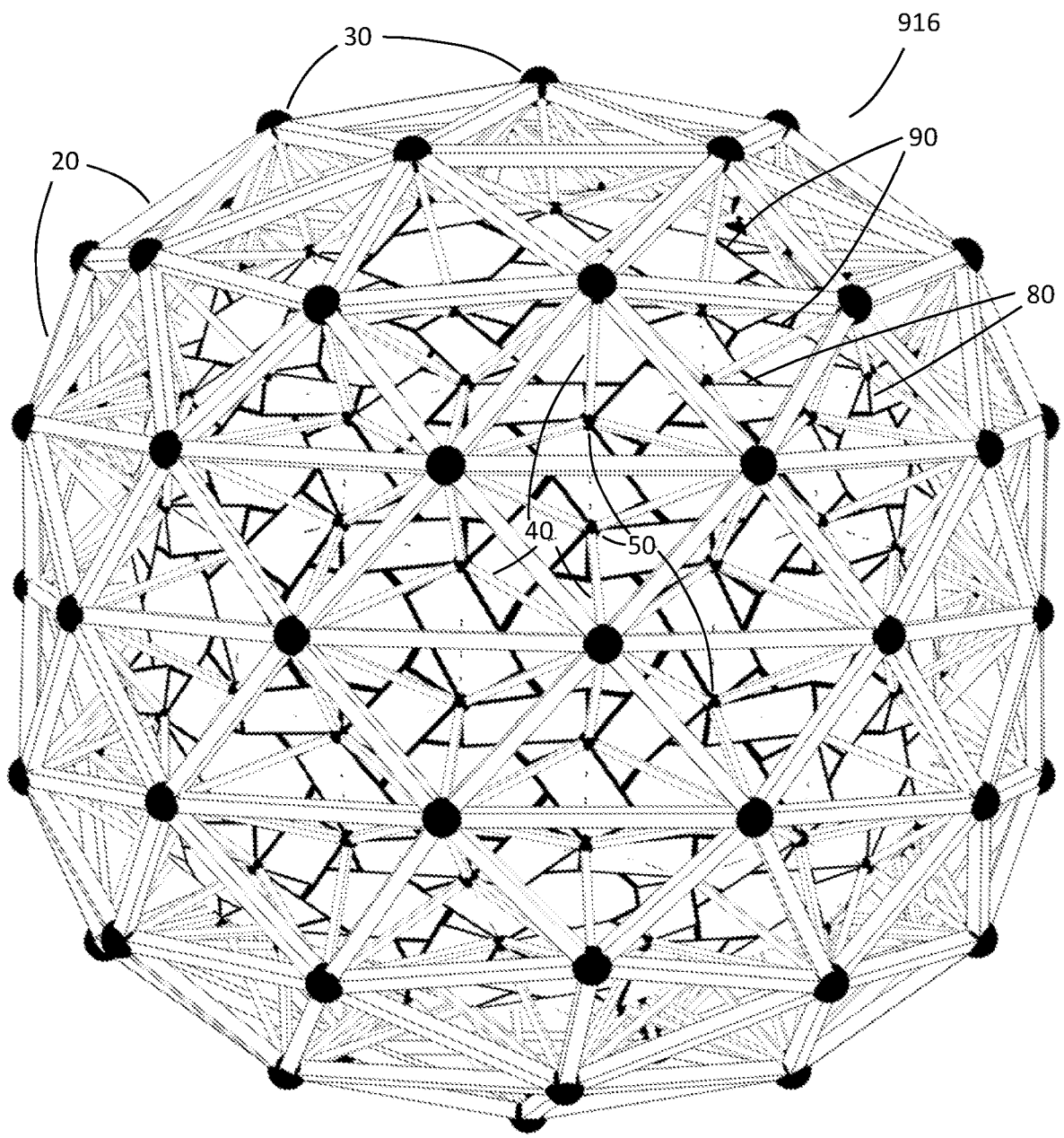
FIG. 25 depicts an embodiment of a structure having the low-density structured material, which structure is a light pressure tank.

(v) The orientation of the low-density structured materials can be arranged such that the structure can be a large light, pressure tank (i.e., the tank can be capable of holding a fluid, such as gas or liquid, at greater than atmospheric pressure). For example, the tetrahedrons can be arranged to point inwards such that the "outer" polyhedron is on the inside See FIG. 25 (showing a light pressure tank). Inner struts 20 and hubs 30 form the inner polyhedron 916. Outer struts 40 are connected at inner vertices 30 and meet at tetrahedral vertices 50. In this representation, hubs and caps are represented by spheres. Panel sections 80 are arranged in a triaxial weave around each vertex 50 and the holes are closed off by panels 90 overlapping panel sections 80 from the inside. Such "inside-out" embodiments can be used for example for construction of light weight pressurized storage tanks such as used for fuel in a rocket. Embodiments can be used for craft and habitats in low pressure environments such as outer space. A whole environment of chambers interconnected by passage-ways can be built with embodiments of the low-density structured materials.

Figure 26A:
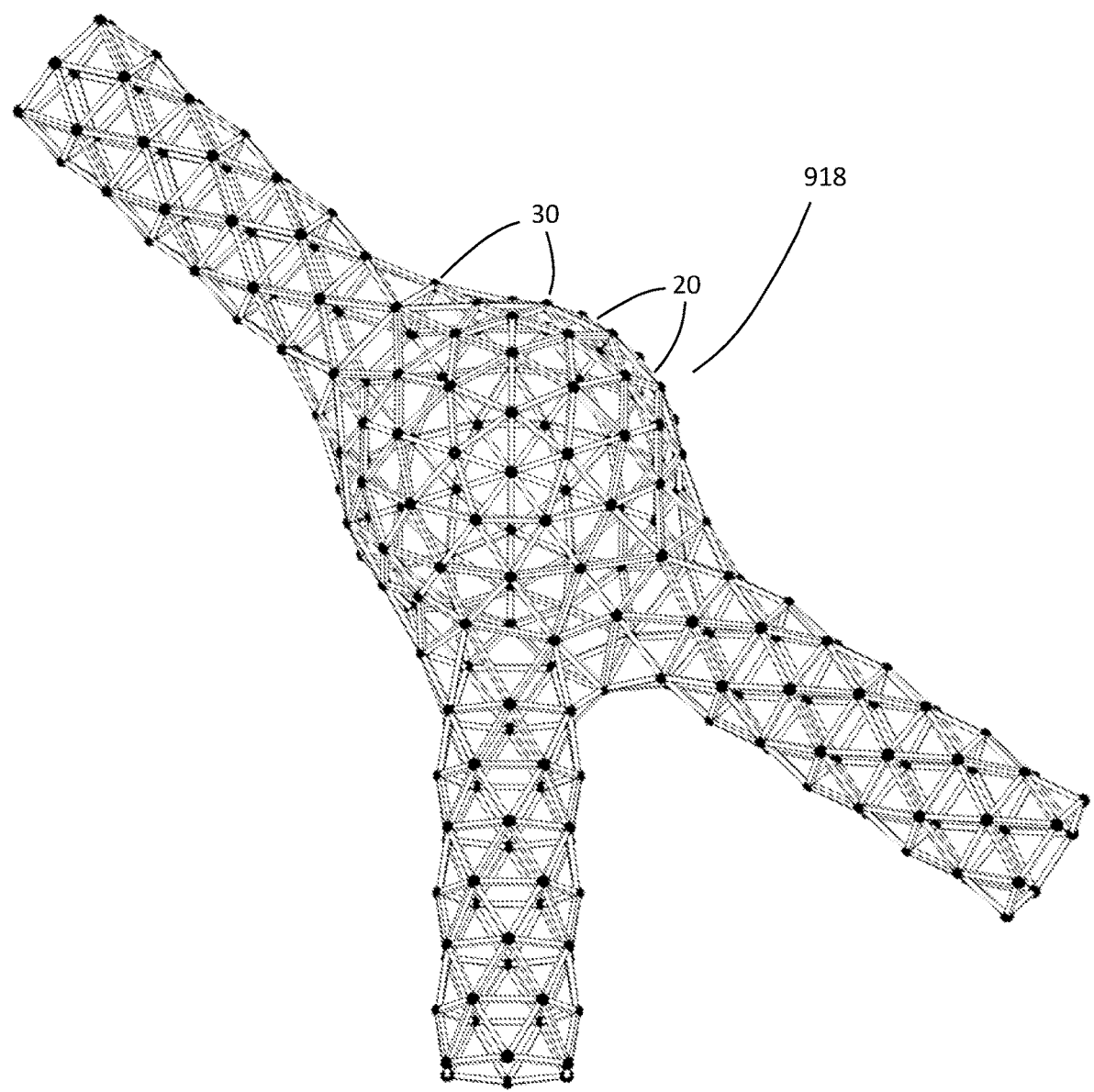
FIGS. 26A-26E depict embodiments of structures having the low-density structured material, which structures each include a plurality of branched volumes.
Figure 26B:
Figure 26C:
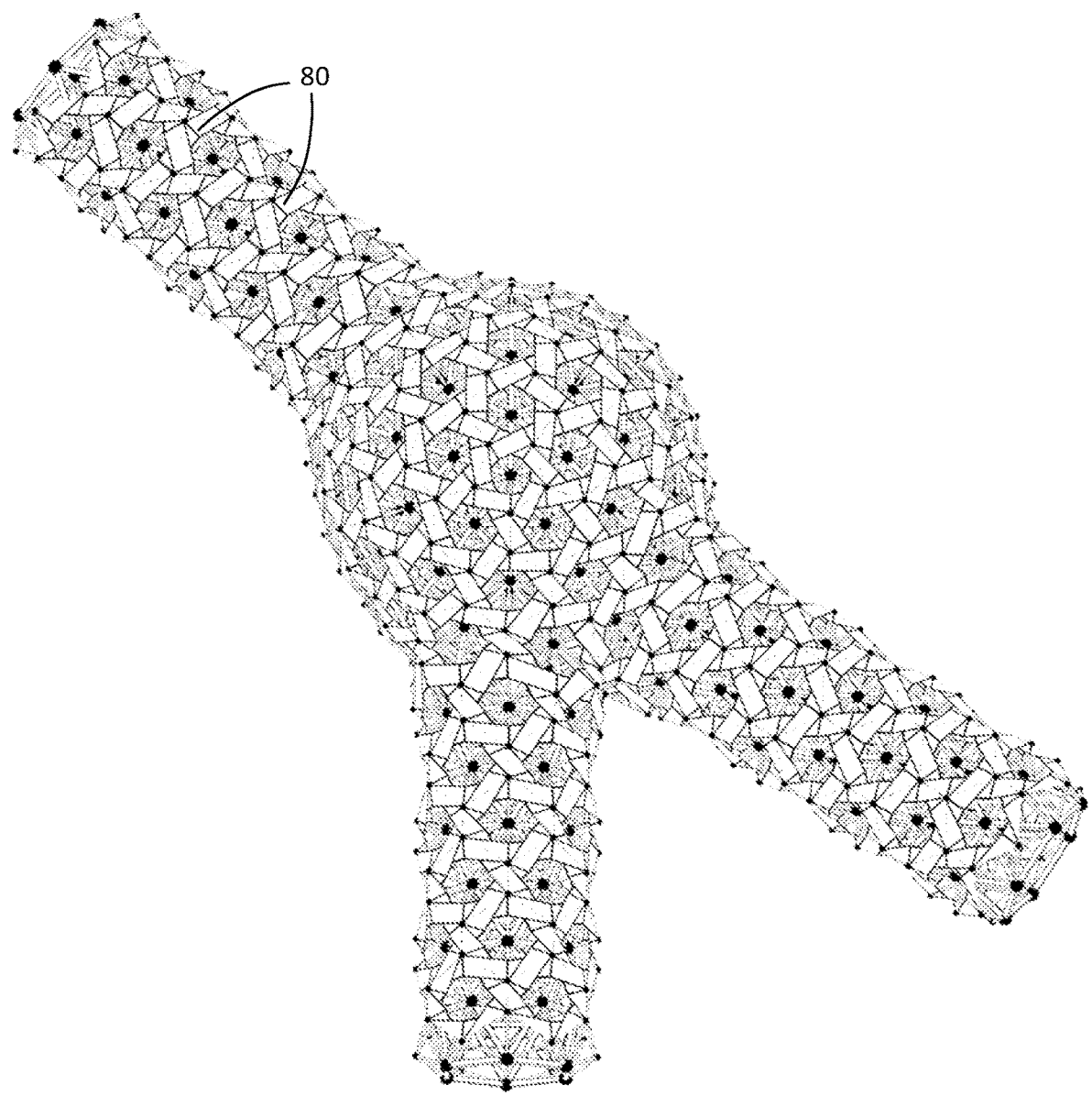
Figure 26D:
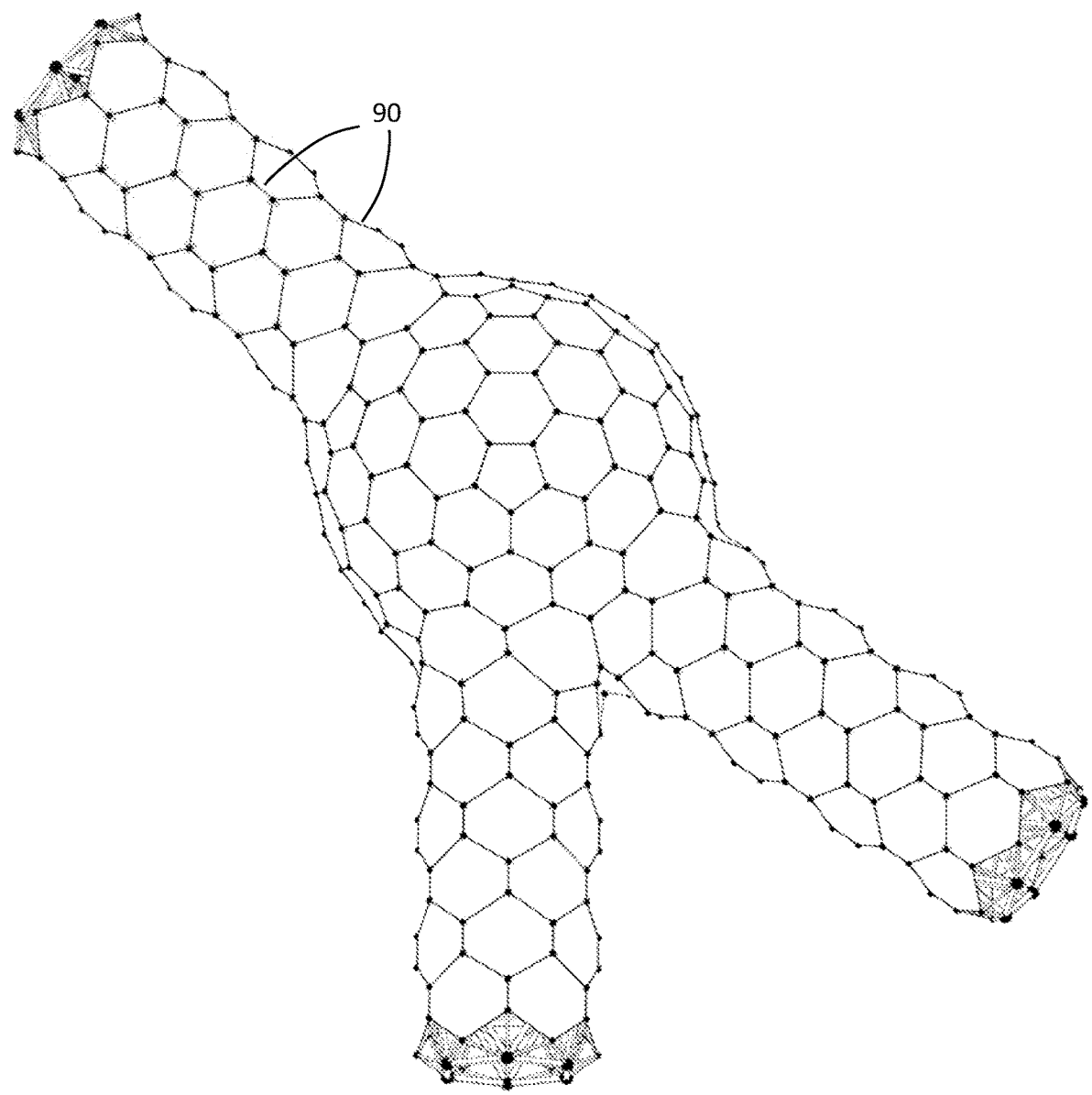
Figure 26E:
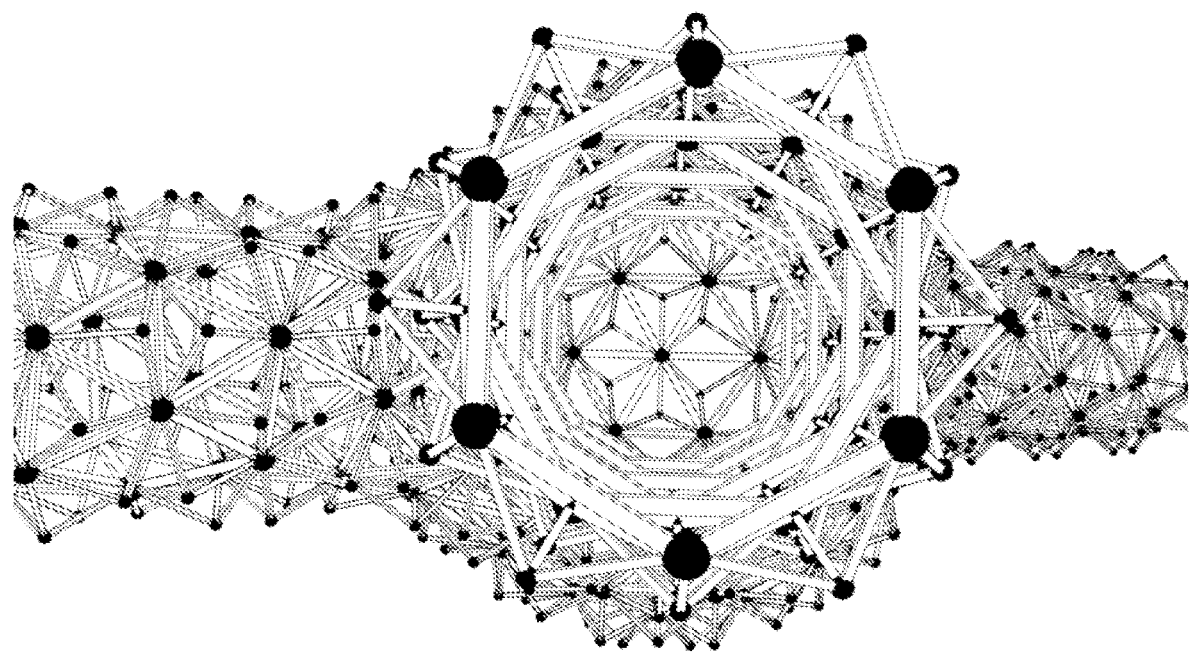

(w) FIG. 26A-26E depicts the structured material in the form of three cylinders meeting at a junction. FIG. 26A shows the inner struts 20 connected at hubs 30. The inner polyhedron 918 of the junction is formed from a spherical polyhedron and three cylindrical branches protruding from the sphere. FIG. 26B shows outer struts 40 connected to the inner struts and connected at hubs 50. FIG. 26C shows panels 80 attached in a piece-wise triaxial kagome pattern. FIG. 26D shows additional panels 90 covering the openings in the kagome pattern. FIG. 26E shows part of the inside of the junction with a view looking down one of the cylindrical branches. The cylinders can be made up of sequences of connected rings of inner struts. As can be appreciated the cylindrical shape can be modified in many ways. It can be made any length by adding further inner struts or rings of inner struts to repeat the structure. The cylinder can be widened by adding rings with more inner struts or narrowed by adding rings with less struts. The cylinder can be curved by gradually changing the orientation of added rings. The cylinder can open up into chambers that are attached to further cylinders. The cylinder can have side branches. A system of connected cylinders and chambers can be constructed by combining the methods of modifying the cylindrical shape described above. The system of connected cylinders and chambers can be sealed and have some or all of the air removed by one or more vacuum pumps so that the inside of the tubes are at low pressure.

Figure 27A:
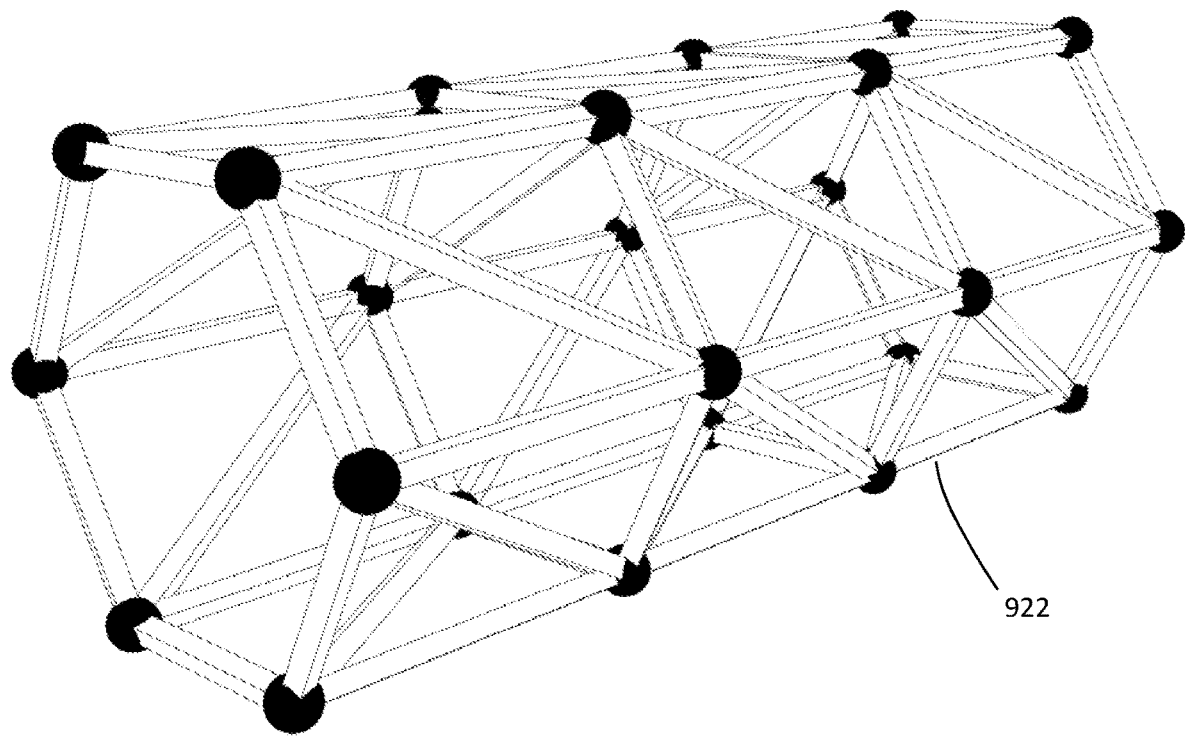
FIGS. 27A-27E depict embodiments of structures having the low-density structured material, which structures each include a hyperloop tube.
Figure 27B:
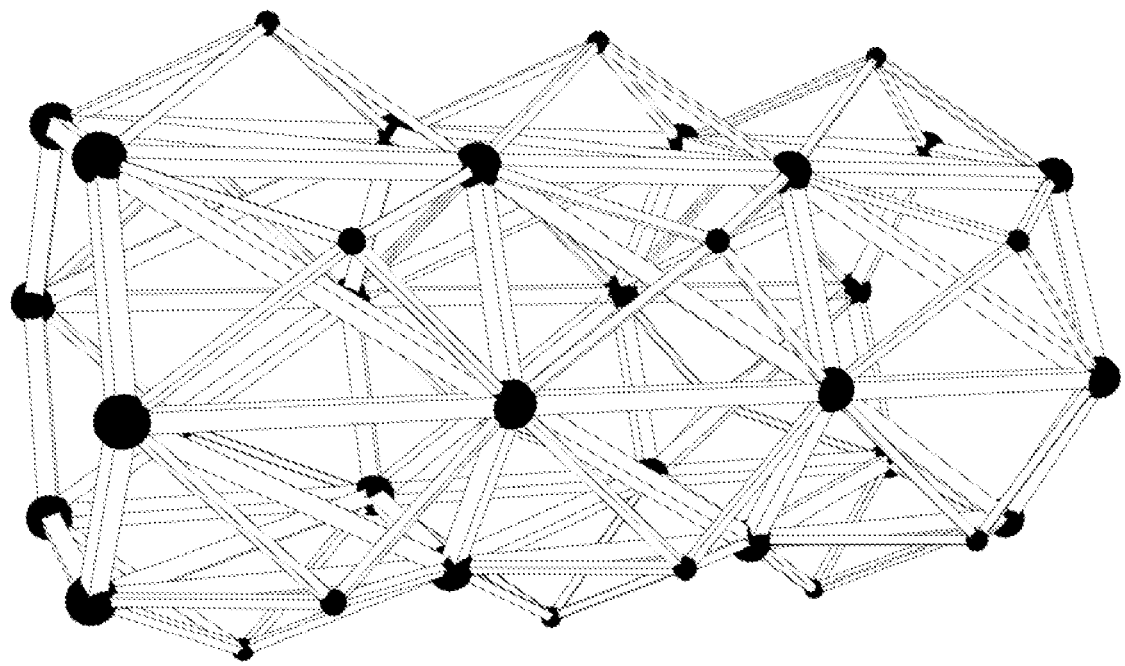
Figure 27C:
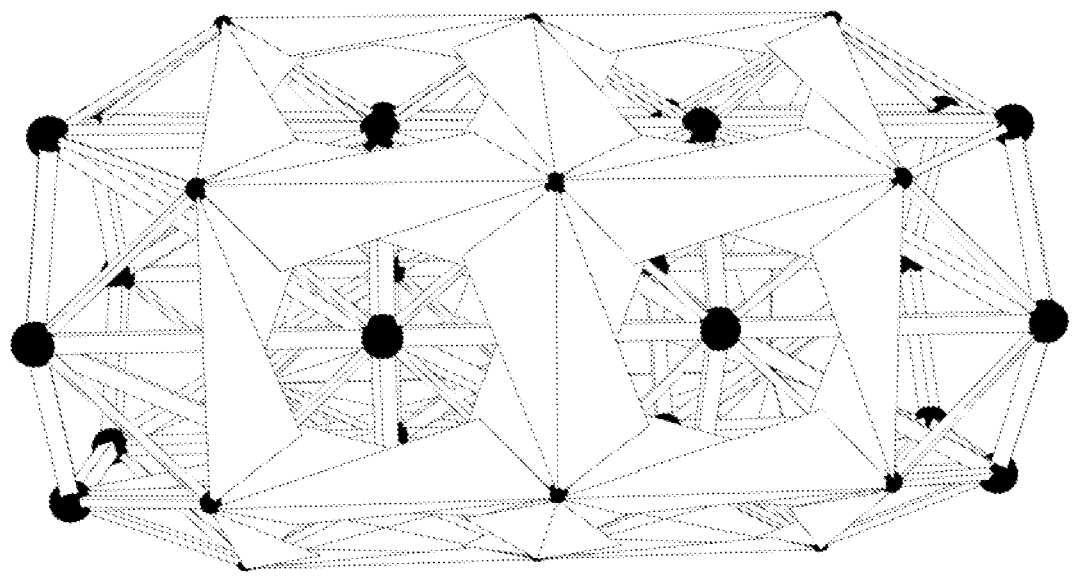
Figure 27D:
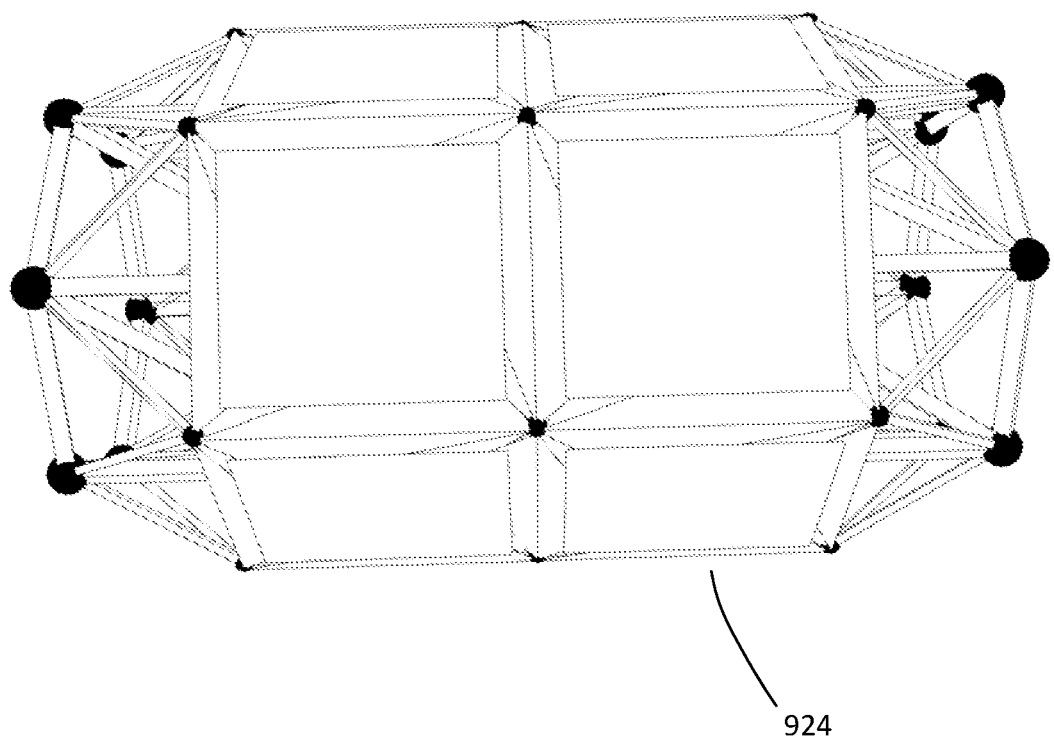

(x) The method of making the low-density structured materials can include combining outer struts of adjacent inner polyhedron faces. Adjacent inner polyhedron faces can share outer struts connected to each end of their shared inner struts and have the same tetrahedral vertex. Adjacent inner polyhedron faces can share outer struts and can share the hub at which the outer struts meet. FIG. 27A-27E show embodiments of the low-density structured materials forming part of a hyper-loop tube. FIG. 27A depicts an embodiment with the inner polyhedron of a section of tube. FIG. 27B depicts outer struts and hubs attached to the inner polyhedron. In this embodiment, adjacent inner polyhedron triangular faces share two of their outer struts and have the same tetrahedral vertex. The tetrahedrons of each pair of adjacent triangular faces are combined to form a pyramid. FIG. 27C depicts panels attached to the tetrahedral vertices in an overlapping pattern defining the outer polyhedron. FIG. 27D depicts additional panels attached to the overlapping pattern to seal the openings in the overlapping pattern. The structures in FIG. 27A-27D can be made any length desired by repeating the structure. The ends can be closed off, and air can be removed through openings by one or more vacuum pumps. Embodiments of low-density structures that are cylindrical can be used for ultra lightweight, stiff beams, ultra-high towers, hyperloop tunnels, etc.

Figure 28:
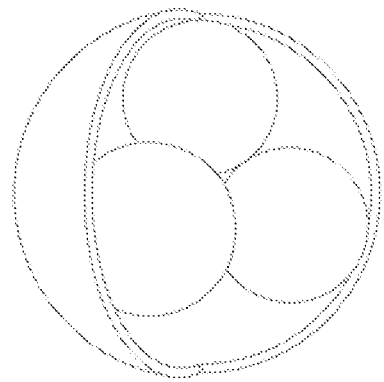
FIG. 28 depicts an embodiment of a structure having the low-density structured material, which structure is spheres packed within a sphere.
Figure 28:
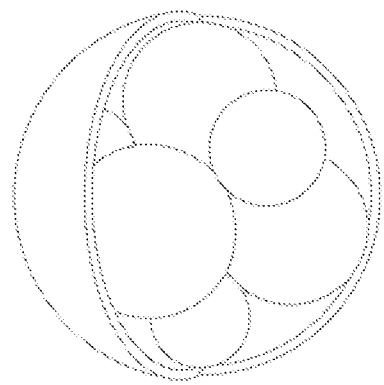
Figure 28:
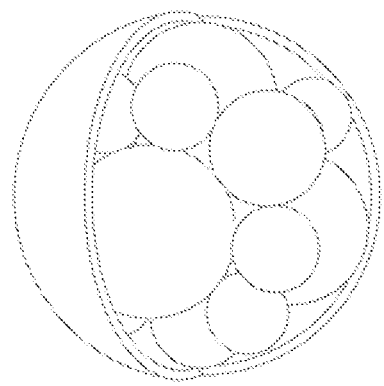

(y) The low-density structured materials can form spheres within spheres, for example, to give increased stability/size for a vacuum balloon. See FIG. 28 (showing spheres packed within spheres). Low-density structured materials can form cylinders within cylinders for increased stability/size, for example, for buildings or tower construction. In some of the embodiments, each of the spheres or cylinders has some or all of the air removed.

Advantages of utilizing the low-density structured materials include the following:

(a) The light-weight and stiff structure can take on different shapes including freeform shapes.
(b) The low-density structured materials integrate structural load carrying and cladding properties. The low-density structured materials provide cladding layers that can have barrier and structural capabilities.
(c) The cladding of overlapping skin sections can be very tough, and without seams at the edges of faces.
(d) The low-density structured materials provide for simplified construction due to very few types of components (struts, hubs, caps and skin sections).
(e) The design of the low-density structured materials is flexible, and can be modified/added on to after initial construction is completed.
(f) The low-density structured materials can have overlapping panels, which provide wide tolerances and room for error. The low-density structured materials can provide simpler installation (such as for overlapping sections than sections that fit end to end).
(g) The low-density structured materials render free-form, organic, and branched shapes seamlessly possible.
(h) The low-density structured material provides a space between inner and outer polyhedron that can be filled with insulation, used to run cables, plumbing, etc. in buildings. The voids in the structure can be filled with material, for example for protection from blast, ballistic, projectile, etc.
(i) In an embodiment, a fluid can be flowed through the voids within the structure between the inner and outer polyhedral so that the structure can be used as a heat exchanger or a heating/cooling jacket. The structure can be filled with thermal insulation.

The low-density structured materials can be used for vacuum lift aircraft, geodesic domes, light-weight flat decking for roofs and floors in buildings, spans/decking of bridges, free form architecture construction systems (such as towers, airports, stadiums, roofs, etc.), earthquake-resistant constructions (with no shearing layers), claddings for blast/explosion protection, light-weight panels for cars, trucks, buses, trains, etc., airplane fuselages and wings, rocket bodies (and other rocket parts), hulls for a ship, yacht, submarine, etc., hyperloop tube systems, space telescope parabolic mirror support, lightweight pressure vessels/tanks, spaceship construction system, solar sails, tunnel cladding, low-pressure tubes for a hyperloop, helmets/personal protective gear, sports equipment, heat exchangers, prosthetic implants, three-dimensional artwork, sculpture, etc.

For instance, FIG. 23 shows an illustration of the low-density structured material having a cylindrical shape that can be used for part of an airplane fuselage, a train body, for architectural applications, part of a tower, for tunnel cladding, for tubes in a hyperloop, etc.

Hyperloop Tube

In an embodiment, the low-density structured materials form part of a hyperloop tube system. A hyperloop is a proposed mode of passenger and freight transportation, and is a sealed tube or system of tubes with low air pressure through which a pod may travel substantially free of air resistance and friction. In some embodiments, the low-density structured materials form parts of the tube wall in a hyperloop system. The structures in FIG. 23 and FIG. 27A-27E are embodiments of such tube sections. As can be appreciated, the cylinder can be made as long as desired by adding struts in the same or similar manner. The tube system constructed of the low-density structured materials can be made wider or narrower or can have forks, junctions, crossings and stations and can join to chambers. Tubes formed from low-density structured materials can include one or more rails for hyperloop pods. Panels forming the outer polyhedron.

Figure 27E:
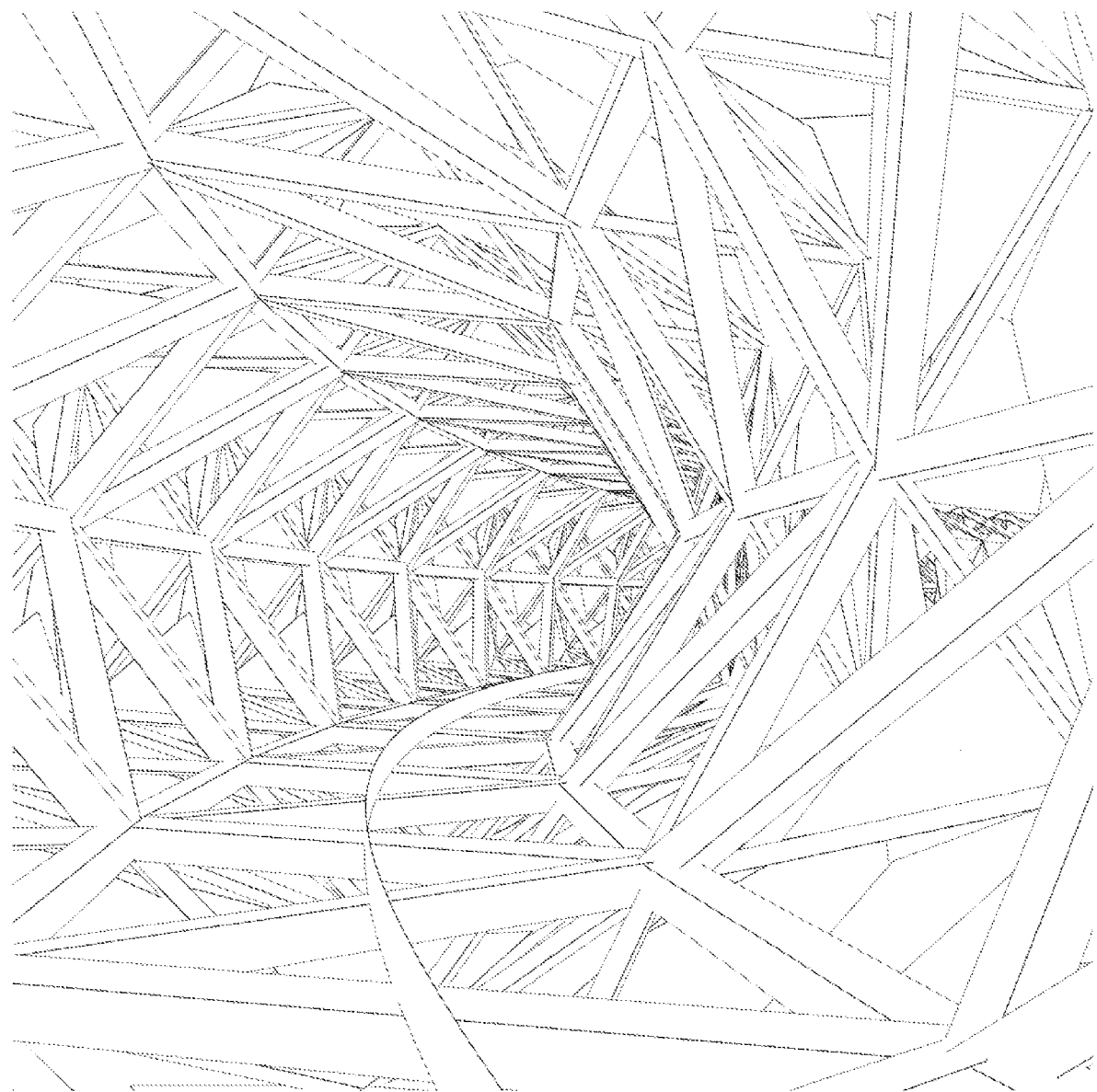

FIG. 27E is a view of the inside of a hyperloop tube that has a curve. A single rail for hyperloop pods is shown. Openings in the overlapping panel are sealed with transparent panels. Part of the curving structure is visible through transparent panels to the right of the rail. Air can be removed from the tube by one or more vacuum pumps along the length of the tube structure.

Low-density structured materials are well suited for such a low pressure tube system. The benefits of using low-density structured materials include:

(a) There are no flanges in the tube system where leaks could occur, instead, the skin panels overlap to produce continuous air-tight tubes and chambers.
(b) Curves in the tube can be generated by making the lengths of the inner struts shorter on one side than the other. Then the tube curves towards the side with the shorter struts. An example of the curved tube is the toroid in FIG. 8A and FIG. 8B and the hyperloop tube in FIG. 27E.
(c) Junctions and stations can be constructed with the low-density structured materials. See FIG. 26A-26E.
(d) Parts such as struts, hubs and panels can be transported to the site, whether above ground or underground, and then assembled on-site. This is beneficial where construction is in remote areas and access is difficult.
(e) The tube system can be built underground in tunnels. First, parts of the tunnel system can be bored and then parts of the tube can be constructed within the tunnels. Struts and other parts for further construction of the tube system can be transported through the tunnels or the tubes constructed within the tunnels.
(f) A multitude of panels can be made of transparent material so that the outside is visible to passengers in the tube.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub combinations of A, B, C, and D.

REFERENCES

U.S. Pat. No. 9,828,081, "Negative Pressure Vessel," issued Nov. 28, 2017 to DeVaul et al. ("DeVaul '081 Patent").

U.S. Patent Appl. Publ. No. 2007/0001053, "Layered Shell Vacuum Balloons," published Jan. 4, 2007 to Akhmeteli et al. ("Akhmeteli '053 Application").

"Desert Domes—Dome Formulas" (available on the Desert Dome website domain at "desertdomes.com/formula.html" circa Jul. 4, 2019) ("Dome Formulas").

Wikipedia webpage for "Geodesic Polyhedron" (available on the Wikipedia website domain at "en.wikipedia.org/wiki/Geodesic_polyhedron" circa Mar. 22, 2020) ("Geodesic Polyhedron Wikipedia Page").

Wikipedia webpage for "Goldberg Polyhedron" (available on the Wikipedia website domain at "en.wikipedia.org/wiki/Goldberg_polyhedron" circa Mar. 22, 2020) ("Goldberg Polyhedron Wikipedia Page").

Wikipedia webpage for "List of geodesic polyhedra and Goldberg polyhedra—Wikipedia" (available on the Wikipedia website domain at "en.wikipedia.org/wiki/List_of_geodesic_polyhedra_and_Goldberg_polyhedra #Icosahedral" circa Oct. 6, 2019) ("List of Geodesic Polyhedra and Goldberg Polyhedra Wikipedia Page").

Wikipedia webpage for "Vacuum Airship" (available on the Wikipedia website domain at "en.wikipedia.org/wiki/Vacuum_airsship" (circa Mar. 19, 2019 ("Vacuum Airship Wikipedia Page").

Hardin, D. P., et al., "A Comparison of Popular Point Configurations on $S^2$," *Solomites Research Notes on Approximation*, 2016, Vol. 9, 16-49 ("Hardin 2016").

What is claimed is:

1. A structured material comprising:
   (a) a first surface comprising a plurality of first surface struts that are interconnected in a first polyhedron form comprising a plurality of first surface polygon faces;
   (b) a plurality of tetrahedral struts that are interconnected to the first surface to form a plurality of tetrahedral arrangements each having a base and a tetrahedral vertex, wherein for each tetrahedral arrangement in the plurality of tetrahedral arrangements,
      (i) the base of the tetrahedral arrangement comprises a first surface polygon face in the plurality of first surface polygon faces, and
      (ii) the tetrahedral vertex is positioned apart from the first surface polygon face of the tetrahedral arrangement, and
   (c) a second surface comprising
      (i) a web having a plurality of second surface materials, wherein
         (A) each second surface material in the plurality of second surface materials is attached to at least two tetrahedral vertices in the plurality of tetrahedral vertices, (B) the web is in a form of a second polyhedron comprising a plurality of second surface polygon faces, (C) each second surface polygon face in the plurality of second surface polygon faces comprises a plurality of second surface polygon vertices, and (D) the first surface and the second surface are interconnected and separated by the plurality of tetrahedral arrangements; and (ii) a plurality of panel materials, wherein each panel material in the plurality of panel materials is attached to the web of the second surface.

2. The structured material of claim 1, wherein
(a) the tetrahedral struts of the tetrahedral arrangement each have a first end and a second end;
(b) the first surface vertices of the polygon face are interconnected to one of the tetrahedral struts of the tetrahedral arrangement at the first end of the tetrahedral strut; and
(c) the second ends of the tetrahedral struts are interconnected at the tetrahedral vertex of the tetrahedral arrangement.

3. The structured material of claim 1, wherein the plurality of panel materials is attached to the second surface polyhedron in a piece-wise kagome weave pattern.

4. The structure materials of claim 1, wherein the structured material is in a substantially cylindrical shape.

5. The structured material of claim 1, wherein the structured material is in a free-form shape.

6. The structured material of claim 1, wherein the structured material is in a shape having a plurality of branched volumes.

7. The structured material of claim 1, wherein the first surface struts have a diameter greater than the diameter of the tetrahedral struts.

8. The structured material of claim 1, wherein the plurality of first surface struts and the plurality of tetrahedral struts comprise a strut material selected from a group consisting of composite materials, metallic materials, polymeric materials, and combinations thereof.

9. The structured material of claim 1, wherein
(a) for a majority of tetrahedral arrangements in the plurality of tetrahedral arrangements, the tetrahedral arrangements are paired in tetrahedral arrangement pairs having a first tetrahedral arrangement and a second tetrahedral arrangement, wherein in each tetrahedral arrangement pair
(i) the first tetrahedral arrangement and the second tetrahedral arrangement are adjacent,
(ii) the base of the first tetrahedral arrangement and the base of the second tetrahedral arrangement share at least one edge, and
(iii) the tetrahedral vertex of the first tetrahedral arrangement and the tetrahedral vertex of the second tetrahedral arrangement are at the same position.

10. The structured material of claim 9, wherein each tetrahedral arrangement pair has a tetrahedral vertex hub in which the tetrahedral vertex hub is a tetrahedral vertex hub for both the first tetrahedral arrangement and the second tetrahedral arrangement of the tetrahedral arrangement pair.

11. The structured material of claim 1 further comprising a third surface, wherein
(a) the first surface is between the second surface and the third surface;
(b) the first surface and the third surface are interconnected and separated by a plurality of additional tetrahedral arrangements;

(c) the plurality of additional tetrahedral arrangements comprises a plurality of additional tetrahedral struts that are interconnected to the first surface to form the plurality of additional tetrahedral arrangements, wherein for each additional tetrahedral arrangement in the plurality of additional tetrahedral arrangements,
(i) the base of the additional tetrahedral arrangement comprises one of the first surface polygon faces in the plurality of the first surface polygon faces, and
(ii) the additional tetrahedral arrangement has an additional tetrahedral vertex that is positioned apart from the first surface polygon face of the additional tetrahedral arrangement.

12. The structured material of claim 11, wherein the third surface comprises an additional web having a plurality of third surface materials, wherein
(a) each third surface material in the plurality of third surface materials is attached to at least two additional tetrahedral vertices in the plurality of additional tetrahedral vertices;
(b) the additional web is in a form of a third polyhedron comprising a plurality of third surface polygon faces, and
(c) each third surface polygon face in the plurality of third surface polygon faces comprises a plurality of third surface polygon vertices.

13. The structured material of claim 12, wherein the third surface further comprises a plurality of additional panel materials, wherein
(a) each additional panel material in the plurality of additional panel materials is attached to two adjacent third surface polygon vertices of the third surface polygon vertices, and
(b) each third surface polygon vertex of the third surface polygons are connected to at least one adjacent third surface polygon vertex by the additional panel material in the plurality of additional panel materials.

14. The structured material of claim 1, wherein
(a) the first surface struts each have a first end and a second end;
(b) the first surface polygon faces in the plurality of first surface polygon faces have edges that are the first surface struts interconnected at the first ends and the second ends; and
(c) the first surface polygons faces have at least three first surface vertices, wherein the first surface vertices are interconnected by at least two of the first surface struts at one of the first end or second end of each of the at least two first surface struts.

15. The structured material of claim 14 further comprising a plurality of connectors for interconnecting the struts.

16. The structured material of claim 14, wherein the shape of the first surface is a spherical polyhedron.

17. The structured material of claim 1 further comprising a skin that surrounds the structured material, wherein the skin seals the structured material.

18. The structured material of claim 17 further comprising one or more openings in the skin to permit a gas to be introduced or removed from the structured material.

19. The structured material of claim 17, wherein the skin is a plurality of skin panel materials attached to seal the structured material.

20. The structured material of claim 19, wherein the plurality of skin materials is in a three-way weave pattern.

21. The structured material of claim 17, wherein the pressure inside the structured material is less than atmospheric pressure.

22. The method of claim 21, wherein the structured material is buoyant.

23. A structure comprising the structured material of claim 1, wherein the structure is selected from a group consisting vacuum lift aircraft, geodesic domes, light-weight flat decking for roofs and floors in buildings, spans/decking of bridges, free form architecture construction systems, earthquake-resistant constructions, claddings for blast/explosion protection, light-weight panels for cars, trucks, buses, and trains, airplane fuselages and wings, rocket bodies, rocket parts, hulls for a ship, yacht, and submarine, hyperloop tube systems, space telescope parabolic mirror support, lightweight pressure vessels/tanks, spaceship construction system, solar sails, tunnel cladding, helmets/personal protective gear, sports equipment, heat exchangers, prosthetic implants, three-dimensional art, and sculpture.

24. A method of forming a structured material comprising:
(a) forming a first surface by interconnecting a plurality of first surface struts to form a plurality of first surface polygon faces;
(b) interconnecting a plurality of tetrahedral struts to the first surface to form a plurality of tetrahedral arrangements having a base and a tetrahedral vertex, wherein for each tetrahedral arrangement in the plurality of tetrahedral arrangements,
  (i) the base of the tetrahedral arrangement comprises a first surface polygon face in the plurality first surface polygon faces, and
  (ii) the tetrahedral vertex is positioned apart from the first surface polygon face of the tetrahedral arrangement; and
(c) forming a second surface comprising a web having a plurality of second surface materials and further comprising a plurality of panel materials, wherein
  (i) the forming of the second surface comprises attaching second surface material in the plurality of second surface materials to at least two tetrahedral vertices in the plurality of tetrahedral vertices,
  (ii) the web is in the shape of a plurality of second surface polygon faces,
  (iii) each second surface polygon face in the plurality of second surface polygon faces comprises a plurality of second surface polygon vertices,
  (iv) the first surface and the second surface are interconnected and separated by the plurality of tetrahedral arrangements; and
  (v) attaching a plurality of panel materials to the second surface polygon vertices, wherein the attaching the plurality of panel materials comprises attaching each panel material in the plurality of panel materials to the web of the second surface.

25. The method of claim 24, wherein
(a) the first surface struts each have a first end and a second end;
(b) the first surface polygon faces in the plurality of first surface polygon faces have edges that are the first surface struts interconnected at the first ends and the second ends; and
(c) the first surface polygons faces have at least three first surface vertices, wherein the first surface vertices are interconnected by at least two of the first surface struts at one of the first end or second end of each of the at least two first surface struts.

26. The method of claim 24, wherein
(a) the tetrahedral struts of the tetrahedral arrangement each have a first end and a second end;
(b) the first surface vertices of the polygon face are interconnected to one of the tetrahedral struts of the tetrahedral arrangement at the first end of the tetrahedral strut; and
(c) the second ends of the tetrahedral struts are interconnected at the tetrahedral vertex of the tetrahedral arrangement.

27. The method of claim 24, wherein the plurality of panel materials is attached to the second surface polyhedron in a piece-wise kagome weave pattern.

28. The method of claim 24, wherein the structured material is the structured material of claim 1.

* * * * *